(12) United States Patent
Chiba

(10) Patent No.: US 7,689,697 B2
(45) Date of Patent: Mar. 30, 2010

(54) SERVER, RECONNECTION CONTROL METHOD, DEVICE, RECONNECTION METHOD, PROGRAM, AND RECORD MEDIUM

(75) Inventor: Hiroyuki Chiba, Kanagawa (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 11/695,305

(22) Filed: Apr. 2, 2007

(65) Prior Publication Data

US 2007/0255809 A1 Nov. 1, 2007

(30) Foreign Application Priority Data

| Apr. 28, 2006 | (JP) | ............................. 2006-127095 |
| May 18, 2006 | (JP) | ............................. 2006-139590 |
| Sep. 28, 2006 | (JP) | ............................. 2006-265803 |

(51) Int. Cl.
*G06F 15/16* (2006.01)

(52) U.S. Cl. .................. 709/227; 709/203; 709/228; 714/48

(58) Field of Classification Search ................ 709/227, 709/228, 203; 714/48

See application file for complete search history.

(56) References Cited

U.S. PATENT DOCUMENTS

2006/0063544 A1* 3/2006 Zhao et al. .................. 455/510

2006/0101505 A1* 5/2006 Abdo et al. ..................... 726/2

FOREIGN PATENT DOCUMENTS

| JP | 8-294172 | 11/1996 |
| JP | 9-167129 | 6/1997 |
| JP | 11-32074 | 2/1999 |
| JP | 2000-261469 | 9/2000 |
| JP | 2002-27140 | 1/2002 |
| JP | 2002-222123 | 8/2002 |
| JP | 2002-359641 | 12/2002 |
| JP | 2003-50761 | 2/2003 |
| JP | 2004-96301 | 3/2004 |
| JP | 2004-274725 | 9/2004 |
| JP | 2005-57428 | 3/2005 |
| JP | 2005-73154 | 3/2005 |
| JP | 2006-505200 | 2/2006 |

\* cited by examiner

*Primary Examiner*—Frantz B Jean
(74) *Attorney, Agent, or Firm*—Oblon, Spivak, McClelland, Maier & Neustadt, L.L.P.

(57) ABSTRACT

A server connectable to a device through a network is disclosed. The server includes a designation section and a transmission section. The designation section designates a first time interval for which the device repeatedly reconnects the server. The transmission section transmits an information corresponding to the designated first time interval to the device while the server is being connected to the device.

12 Claims, 28 Drawing Sheets

Dev-ID0001@dap.sony.com/"product code - serial number"

Bare JID — Resource

Full JID (D)

Dev-ID0001@dap.sony.com/"controlling apparatus - service management ID - 01234"

Bare JID — Resource

Full JID (D)

SERVER, RECONNECTION CONTROL METHOD, DEVICE, RECONNECTION METHOD, PROGRAM, AND RECORD MEDIUM

CROSS REFERENCES TO RELATED APPLICATIONS

The present invention contains subject matter related to Japanese Patent Applications JP 2006-127095, 2006-139590, and 2006-265803 filed in the Japanese Patent Office in Apr. 28, 2006, May 18, 2006, and Sep. 28, 2006, respectively, the entire contents of which being incorporated herein by reference.

BACKGROUND OF THE INVENTION

1. Field of the Invention

The present invention relates to a server, a reconnection control method, a device, a reconnection method, a program, and a record medium that allow a constant connection session to be established with a device connected through a network.

2. Description of the Related Art

When a controlling apparatus controls an in-home device through the Internet, the controlling apparatus accesses the in-home device using for example DDNS (Dynamic Domain Name System) or mail system.

In the DDNS, the in-home device registers its address to a DDNS server and receives a domain name and a port number from the controlling apparatus on the Internet side assigns. As a result, the controlling apparatus can access the in-home device.

As a protocol that accomplishes a real-time communication, XMPP (extensible Messaging and Presence Protocol) is known (see "Extensible Messaging and Presence Protocol (XMPP): Core", RFC3920, The Internet Engineering Task Force (IETF), October 2004, hereinafter this document is referred to as non-patent document 1). One of modes of real-time communications is instant messaging (IM) (see "Extensible Messaging and Presence Protocol (XMPP): Instant Messaging and Presence", RFC3921, The Internet Engineering Task Force (IETF), October 2004, hereinafter, this document is referred to as non-patent document 2). In the instant messaging (IM), it is determined whether or not an IM client (a member who can exchange an instant message with another member) is on line over the Internet. When the IM client is on line, it can chat and exchange a file with another IM client.

As another protocol that can invoke data and a service from another computer, SOAP (Simple Object Access Protocol) is known (see "SOAP Version 1.2", W3C Recommendation, World Wide Web Consortium (W3C), June 2003, hereinafter, this document is referred to as non-patent document 3). In a communication using the SOAP, a message of which additional information called envelop is added to an XML (extensible Markup Language) document is exchanged corresponding to a predetermined protocol for example HTTP (Hyper Text Transfer Protocol). When both a client that uses a service and a server that provides the service have a SOAP generating/parsing engine, an object can be invoked between different environments.

In addition, a system of which a session is established between a server and a client terminal and the server distributes content to the client terminal over a network and when the session is disconnected and the distribution of content is stopped, a new session is established and content is restored is known (see Japanese Patent Application Laid-Open No. 2003-050761, hereinafter, this document is referred to as patent document 1).

SUMMARY OF THE INVENTION

To allow the user of the controlling apparatus to access an in-home device over the Internet, it is necessary to correlatively register combinations of the controlling apparatus, the types of services, and the in-home device. In addition, it is necessary to connect the registered in-home device in the state that the controlling apparatus can constantly access the in-home device. Thus, it is necessary to provide a mechanism that assures such conditions.

To assure such a content connection, it is necessary to reconnect the session automatically as soon as possible when the in-home device and the server are not properly connected or the session is disconnected.

In this case, when the in-home device and the server are not connected or the session is disconnected, it can be thought that the in-home device repeatedly reconnects the session to the server. However, since there are many in-home devices over the network, the load is concentrated to the server, resulting in becoming a congestion state and a cause of a trouble of the server.

In particular, after the server and/or network are recovered from their troubles or maintenance, since many in-home devices try to reconnect their sessions to the server, resulting in a very serious problem.

In view of the foregoing, it would be desirable to provide a server, a reconnection control method, a device, a reconnection method, a program, and a record medium that prevent the load from being concentrated to the server upon an execution of an automatic reconnection.

According to an embodiment of the present invention, there is provided a server connectable to a device through a network. The server includes a designation section and a transmission section. The designation section designates a first time interval for which the device repeatedly reconnects the server. The transmission section transmits an information corresponding to the designated first time interval to the device while the server is being connected to the device. According to an embodiment of the present invention, there is provided a device connectable to a server through a network. The device includes a reception section, a storage section, and a reconnection execution section. The reception section receives an information corresponding to a first time interval for which the device repeatedly reconnects the server from the server while the device is being connected to the server. The storage section stores the information corresponding to the received first time interval. The reconnection execution section repeatedly reconnects the device to the server based on the information corresponding to the first time interval stored in the storage section.

In this embodiment, since the server side can dynamically control the first time interval corresponding to the load applied to the server, when the automatic reconnection is executed, the load can be prevented from being concentrated to the server upon an execution of an automatic reconnection.

The transmission section may transmit the information of the first timer interval, the information corresponding to the designated first time interval to the device while the device is establishing a communication session with the server.

The designation section may designate a second time interval for which the device connects the server for the first time. The transmission section may transmit an information corresponding to the designated second time interval to the device along with the information corresponding to the designated first time interval while the server is being connected to the device. In this case, it is preferred that the first time interval be longer than the second time interval.

The transmission section may transmit the information corresponding to the designated first time interval and the information corresponding to the designated second time interval to the device while the device is establishing a communication session with the server.

The device may also include a determination section. The determination section determines a predetermined time period shorter than the first time interval. The reconnection execution section may repeatedly reconnect the device to the server at the determined time period within the first time interval.

The determination section may determine the predetermined time period by a random number.

The storage section may pre-store a predetermined information corresponding to the first time interval before the device receives the information corresponding to the first time interval from the server for the first time.

The reception section may receive an information corresponding to a second time interval when the device connects the server for the first time. The storage section may store the information corresponding to the received second time interval along with the information corresponding to the received first time interval. The reconnection execution section may reconnect the device to the server for the first time based on the information corresponding to the stored second time interval.

According to embodiments of the present invention, the load can be prevented from being concentrated to the server upon an execution of an automatic reconnection.

These and other objects, features and advantages of the present invention will become more apparent in light of the following detailed description of best mode embodiments thereof, as illustrated in the accompanying drawings.

BRIEF DESCRIPTION OF DRAWINGS

The invention will become more fully understood from the following detailed description, taken in conjunction with the accompanying drawings, wherein similar reference numerals denote similar elements, in which.

DESCRIPTION OF PREFERRED EMBODIMENTS

Next, with reference to the accompanying drawings, embodiments of the present invention will be described.

Figure 1:
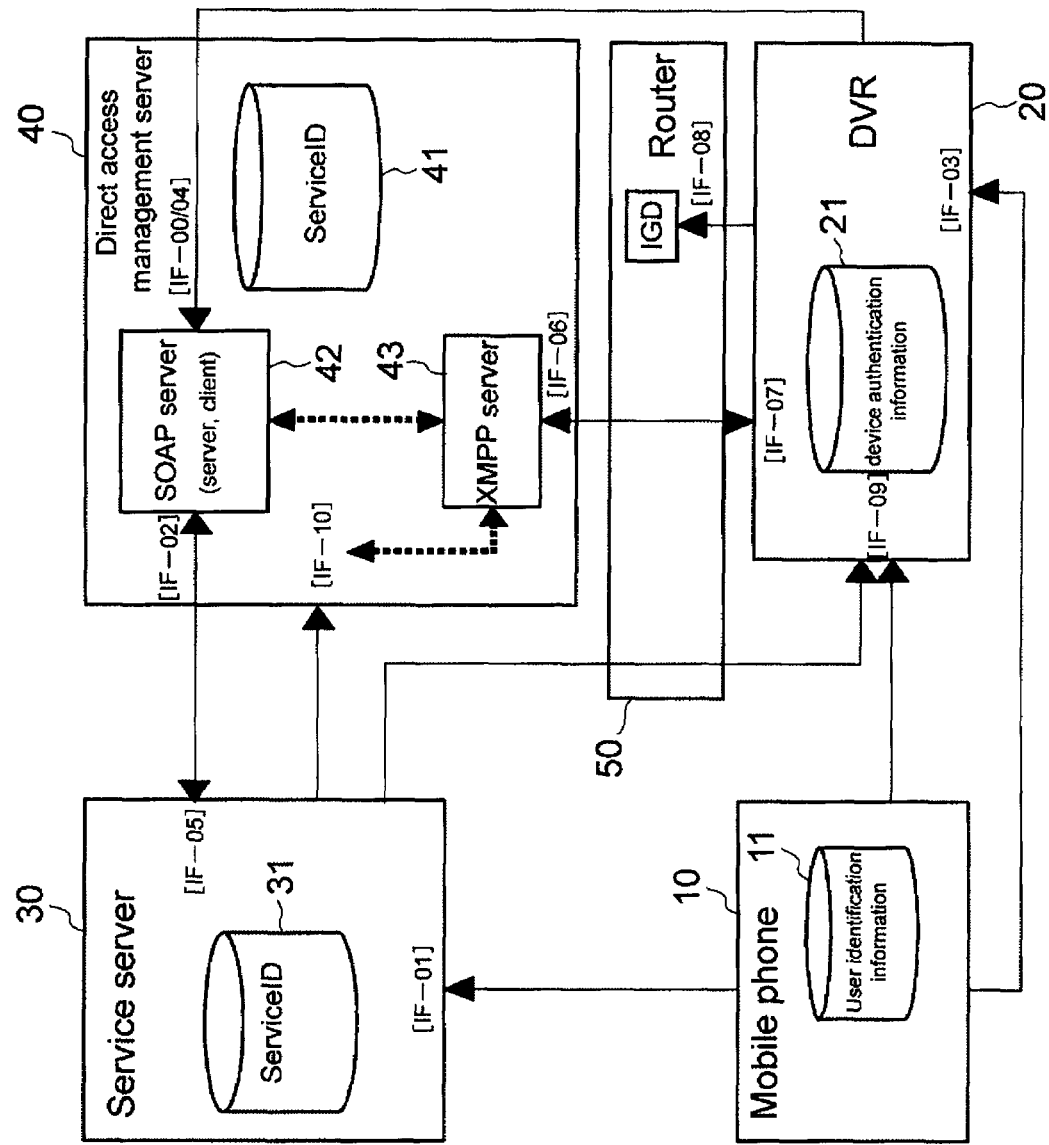
FIG. 1 is a schematic diagram showing an overall structure of a network system according to an embodiment of the present invention.

FIG. 1 is a schematic diagram showing an overall structure of a network system according to an embodiment of the present invention.

This network system includes a mobile phone 10 as a controlling apparatus, a DVR (Digital Video Recorder) 20 as a device-under-control, a service server 30, a direct access management server 40, and a router 50.

The mobile phone 10 operates as a controlling apparatus that controls the device-under-control. The controlling apparatus is not limited to the mobile phone 10 as long as the controlling apparatus can control the device-under-control. The controlling apparatus may be a PC (Personal Computer) or a PDA (Personal Digital Assistance).

In addition to a telephone function section, the mobile phone 10 includes a main memory that stores programs and so forth, a CPU (Central Processing Unit) that executes programs stored in the main memory and performs various types of arithmetic operations, a network interface section that interfaces with the network, a DVR interface section that interfaces with the DVR 20, a user interface section such a key input section and a display section, and a nonvolatile storage section 11. The storage section 11 stores user identification information registered for the mobile phone 10. The main memory stores a program that operates the telephone function section and other programs that cause the CPU to register the mobile phone 10 to the service server 30, remotely timer-record content, and acquire content from the service server 30.

The DVR 20 includes a record and reproduction function section that records content such as a broadcast program to a medium and reproduces content therefrom, a main memory that stores programs and so forth, a CPU that executes programs stored in the main memory and performs various types of arithmetic operations, a network interface section that interfaces with the network, a mobile phone interface section that interfaces with the mobile phone 10, a nonvolatile storage section 21, a remote control reception section, and a TV interface section that interfaces with a TV or the like. Device authentication information that is uniquely assigned to a device-under-control is pre-stored in the storage section 21. The main memory stores programs that control the record and reproduction function section of the DVR 20 and other programs that cause the CPU to register the device-under-control to the direct access management server 40, remotely timer-record content, and acquire content. In this embodiment, the DVR 20 is described as the device-under-control. Instead, the device-under-control is not limited to the DVR 20 as long as it has a network connection function. For example, the device-under-control may be a television set.

The service server 30 is a server that provides to the controlling apparatus such as the mobile phone 10 various types of services that access the device-under-control through the network. The service server 30 can be accomplished by a for example a stationary computer system that includes an input section having a keyboard and a mouse, a display section, a main memory that stores programs and so forth, a CPU that executes programs stored in the main memory and performs various types of arithmetic operations, a communication section that communicates with the network, and a storage section 31. The main memory stores basic programs that operate the computer system and other programs that execute services. The storage section 31 stores a ServiceID that identifies the service server 30 and a service that the service server 30 provides.

The direct access management server 40 is a server that manages correlation of the combination of the controlling apparatus and the service of the service server 30 and the devices-under-control. The direct access management server 40 is accomplished by for example a stationary computer system that includes an input section such as a keyboard and a mouse, a display section, a main memory that stores programs and so forth, a CPU that executes programs stored in the main memory and performs various types of arithmetic operations, an interface section that interfaces with the network, and a storage section 41. The main memory stores basic programs that operate the computer system and other programs that operate the computer system as the direct access management server.

The direct access management server 40 is provided with a SOAP (Simple Object Access Protocol) server 42 and an XMPP (extensible Messaging and Presence Protocol) server 43. The SOAP server 42 is a server that performs processes of registering the combination of the controlling apparatus and the service, registering the device-under-control, and exchanging information necessary for direct access to the service server. The XMPP server 43 is a server that bidirectionally establishes a constant connection session with the DVR 20 as the device-under-control. The SOAP server and the XMPP server are not limited to these examples. The SOAP server may be a server that uses another API invoking system, whereas the XMPP server may is a server that uses another IM system.

Next, the interfaces of these apparatus and devices will be described. In FIG. 1, [IF-**] represents an interface number.

The SOAP server 42 of the direct access management server 40 has an interface [IF-02] that the service server 30 accesses and an interface [IF-00, IF-04] that the DVR 20 accesses. The SOAP server 42 includes a SOAP client function that accesses an interface [IF-05] of the service server 30 side. An interface of the XMPP server 43 is accessed from an XMPP client when an XMPP session is established. In the structure of this system, the interface of the XMPP server 43 is for example an interface [IF-06] that the DVR 20 accesses. After an XMPP session is established, since messages can be exchanged through the interface [IF-06], the XMPP server 43 can also access an interface [IF-07] of the DVR 20. In addition, the direct access management server 40 has a direct access URI (Uniform Resource Identifier) interface [IF-10] with the service server 30 used for XMPP tunneling that will be described later.

The service server 30 has an interface [IF-01] that the mobile phone 10 accesses and an interface [IF-05] that the direct access management server 40 accesses.

In this system structure, the service server 30 does not directly interface with the XMPP server 43 of the direct access management server 40. Instead, the service server 30 may be structured such that it directly interfaces with the XMPP server 43.

The DVR 20 has an interface [IF-07] with which the direct access management server 40 interfaces after an XMPP session is established therebetween, an interface [IF-03] that transmits and receives data to and from the mobile phone 10 using for example infrared rays or a USB (Universal Serial Bus), and a direct access URI interface [IF-09] that the service server 30 or the mobile phone 10 accesses.

The router 50 has an interface [IF-08] that the DVR 20 accesses and that has a UPnP (Universal Plug and Play) IGD (Internet Gateway Device) function.

Next, an operation of the network system of this embodiment will be described. In the following description, <X-XX> represents a request, whereas <X-XXR> represents a response to <X-XX>.

[1. Registering Controlling Apparatus, Service, and Device-Under-Control]

First, an operation of correlating a controlling apparatus-service management ID issued for a combination of each mobile phone 10 (controlling apparatus) and a service thereof and a device-under-control management ID that is uniquely issued for each DVR 20 (device-under-control) in the direct access management server 40 will be described.

Figure 2:
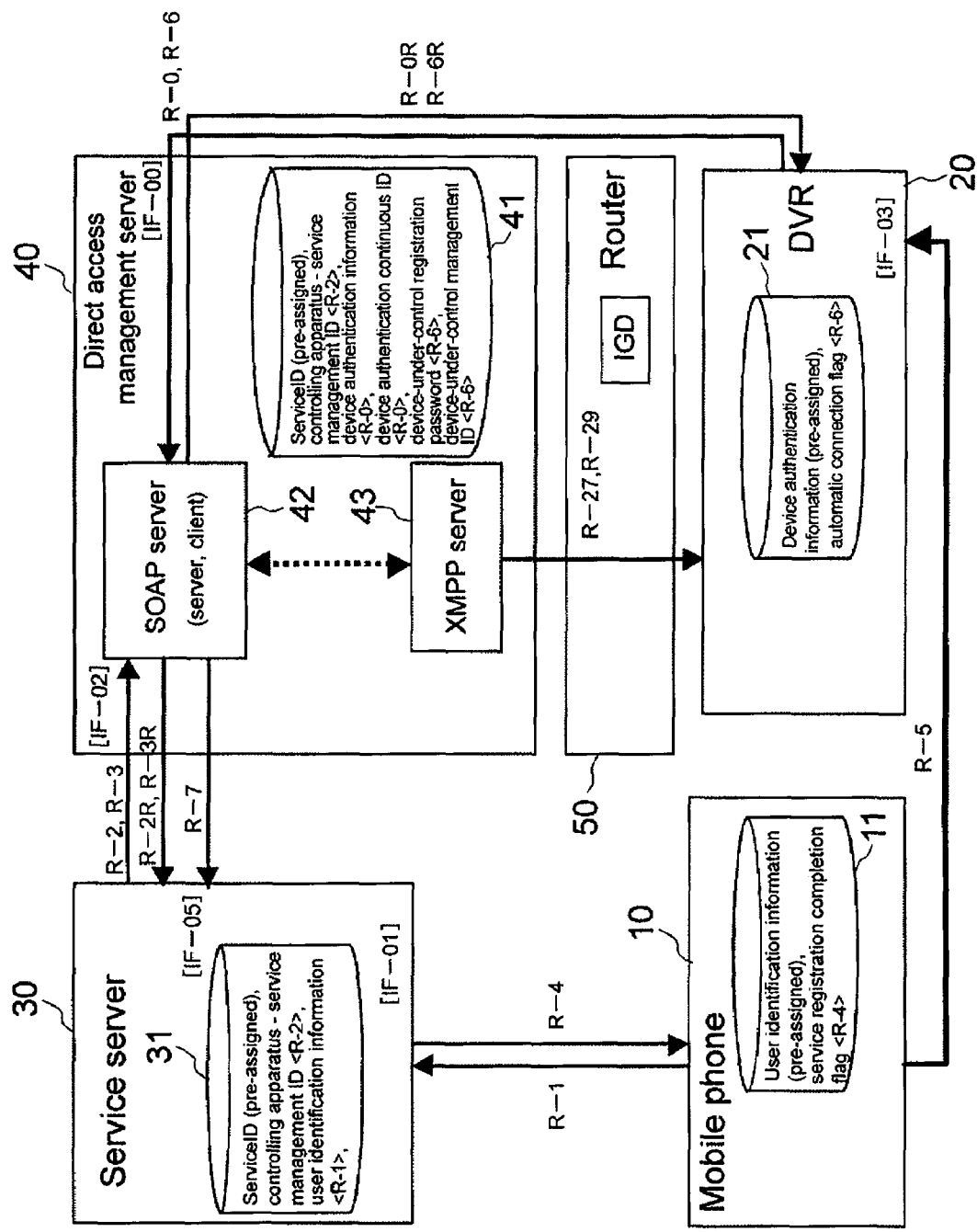
FIG. 2 is a sequence chart showing a flow of information in the case that a combination of a controlling apparatus and a service thereof has been registered and a device-under-control has been registered in the network system shown in FIG. 1.
Figure 3:
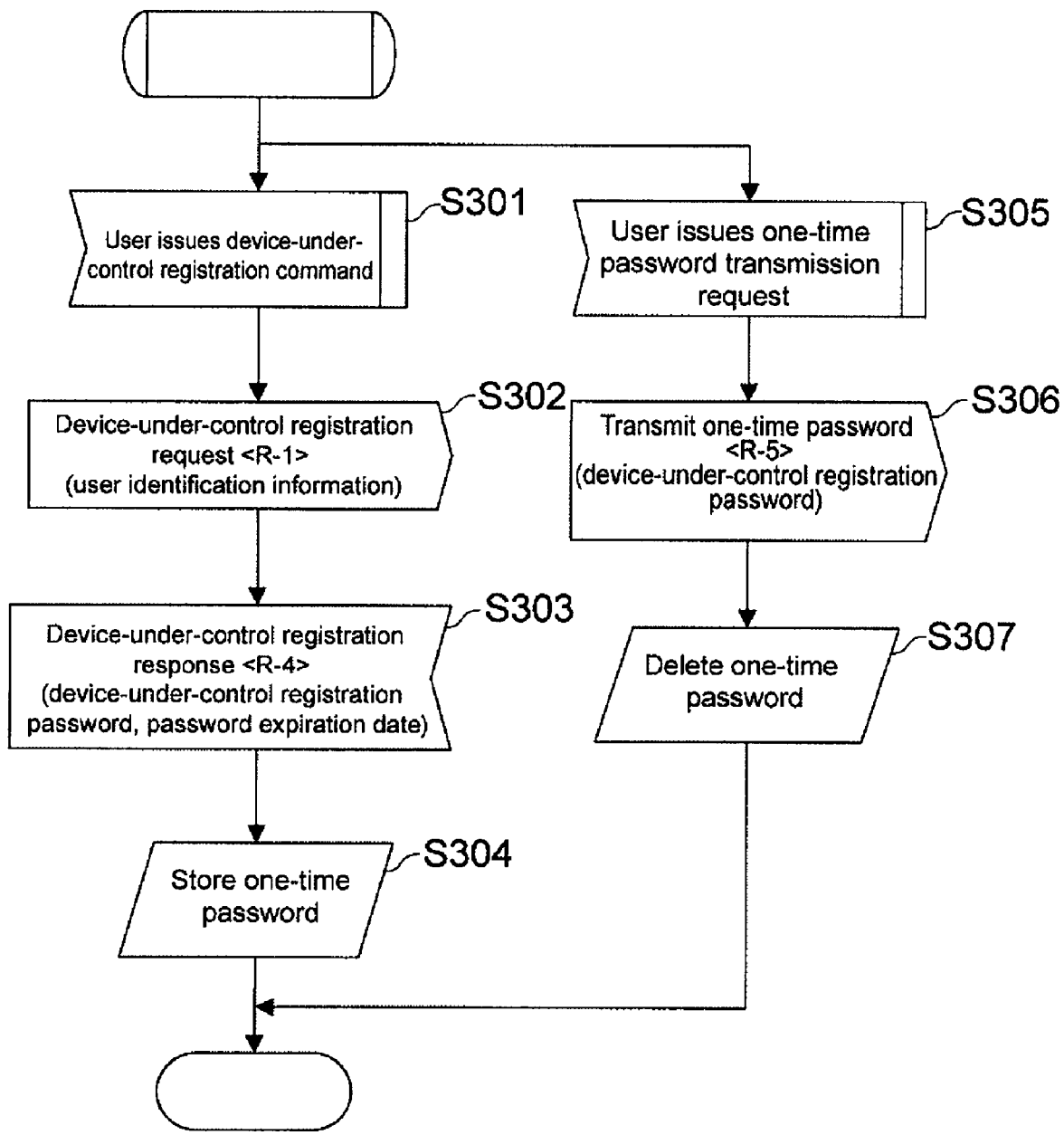
FIG. 3 is a flow chart showing an operation of a controlling apparatus upon the registration shown in FIG. 2.
Figure 4:
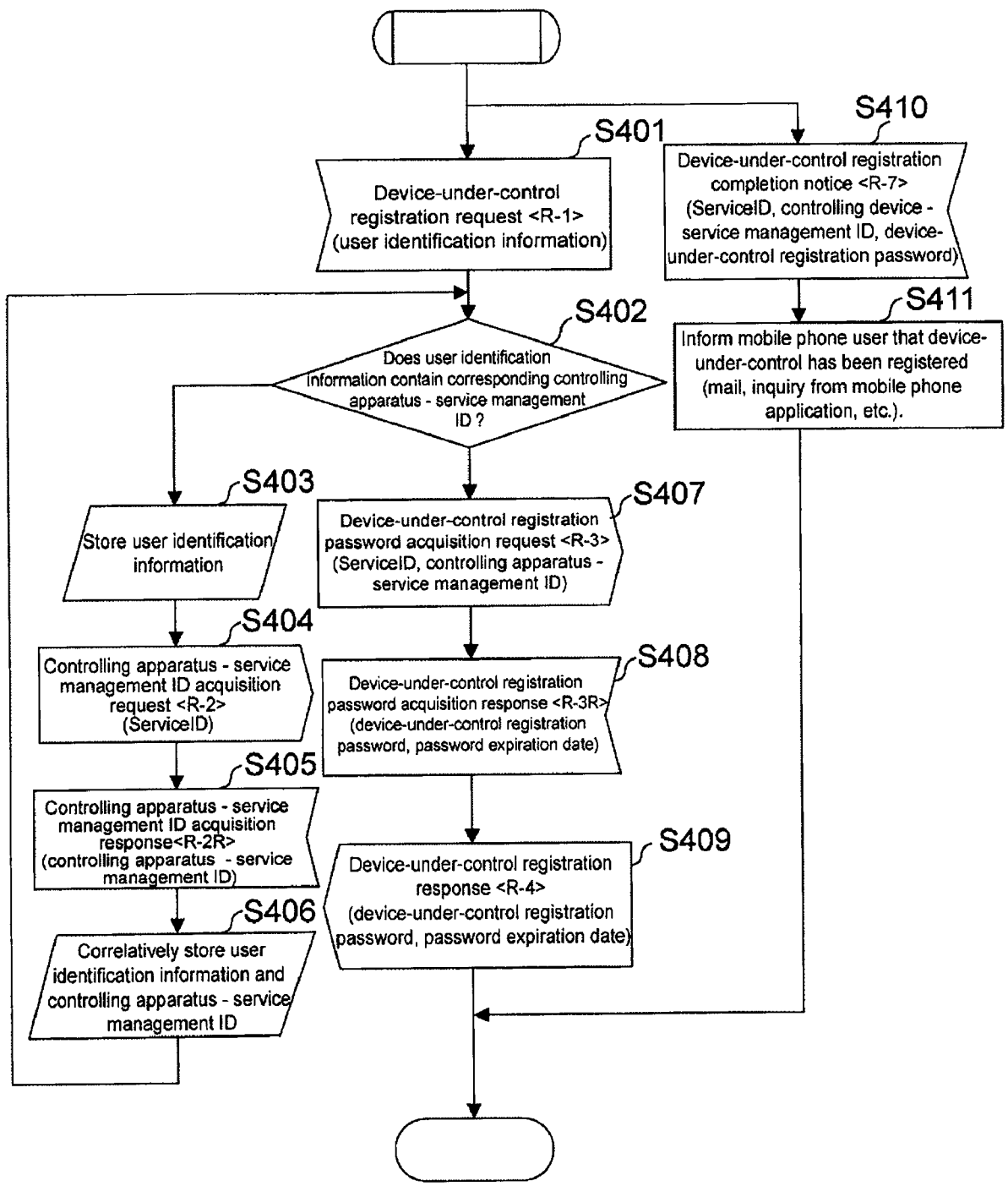
FIG. 4 is a flow chart showing an operation of a service server upon the registration shown in FIG. 2.
Figure 5:
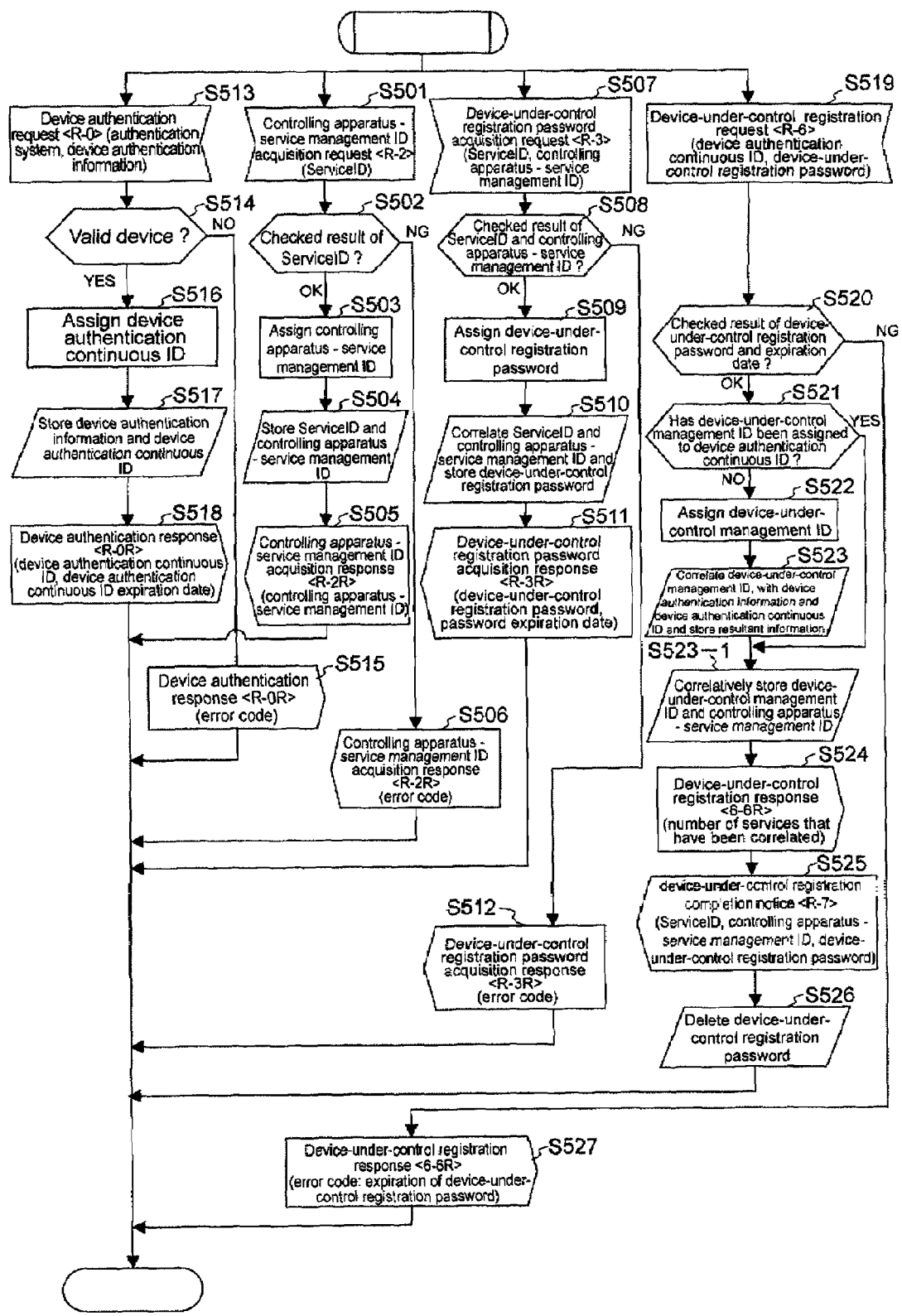
FIG. 5 is a flow chart showing an operation of a direct access management server upon the registration shown in FIG. 2.
Figure 6:
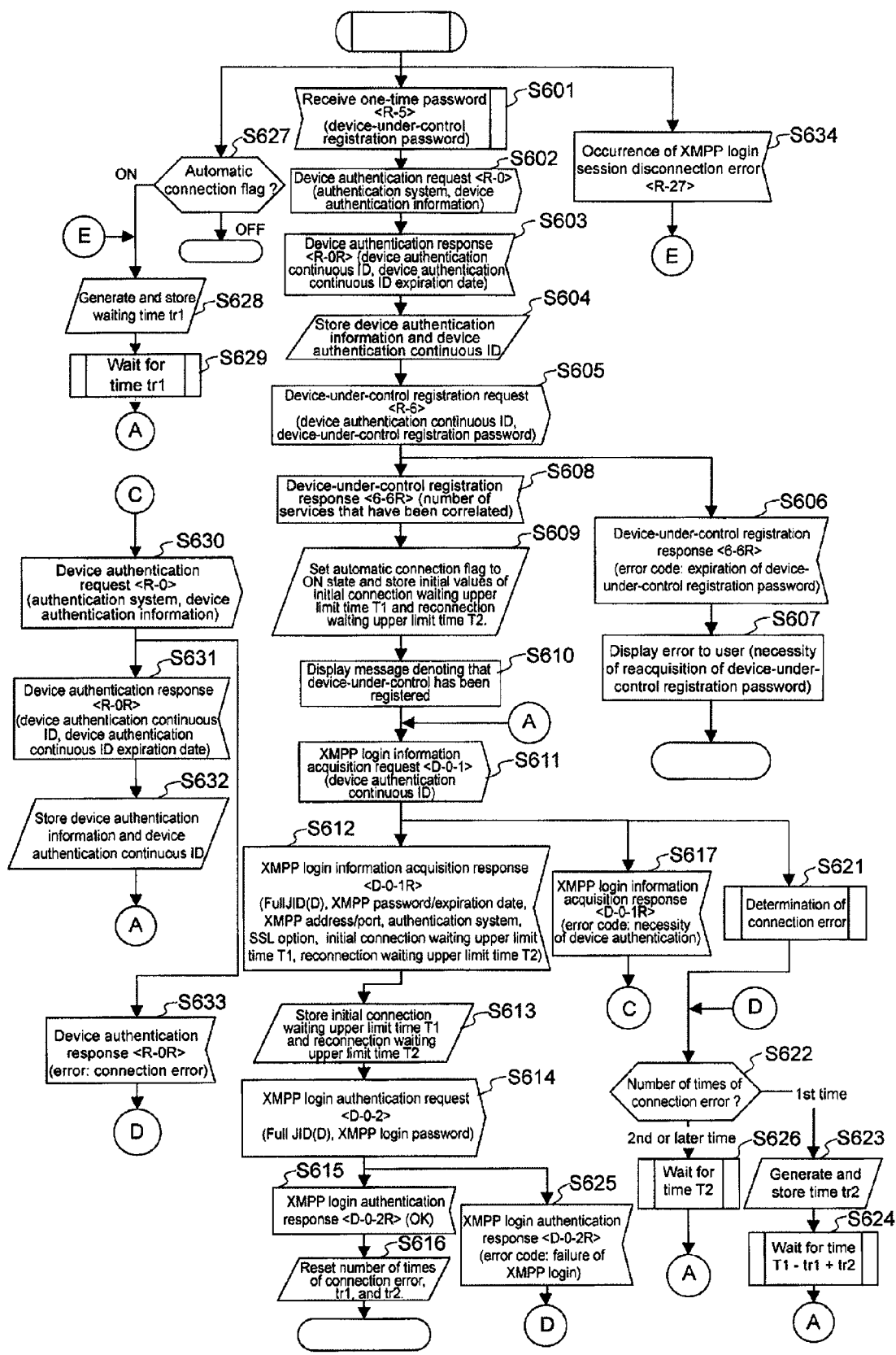
FIG. 6 is a flow chart showing an operation of a DVR upon the registration shown in FIG. 2.

FIG. 2 is a sequence chart showing a flow of information when the combination of the mobile phone 10 and a service thereof is registered and the DVR 20 is registered. FIG. 3 is a flow chart showing a process of the mobile phone 10 upon the registration. FIG. 4 is a flow chart showing a process of the service server 30 upon the registration. FIG. 5 is a flow chart showing a process of the direct access management server 40 upon the registration. FIG. 6 is a flow chart showing a process of the DVR 20 upon the registration.

[1-1. Registering Combination of Controlling Apparatus and Service]

First of all, the mobile phone 10 receives a device-under-control registration command from the user (FIG. 3, step S301). The mobile phone 10 issues a device-under-control registration request <R-1> containing user identification information to the service server 30 (FIG. 3, step S302).

When the service server 30 receives the device-under-control registration request <R-1> containing the user identification information (FIG. 4, step S401), the service server 30 determines whether or not a controlling apparatus-service management ID corresponding to the user identification information has been stored in the storage section 31 (FIG. 4, step S402).

When the controlling apparatus-service management ID corresponding to the user identification information has not been stored in the storage section 31, the service server 30 stores the user identification information in the storage section 31 (FIG. 4, step S403). Thereafter, the service server 30 issues a controlling apparatus-service management ID acquisition request <R-2> containing a ServiceID assigned to itself to the SOAP server 42 of the direct access management server 40 (FIG. 4, step S404). The controlling apparatus-service management ID is an ID uniquely assigned to a combination of a service that the service provider provides and a controlling apparatus.

When the SOAP server 42 receives the controlling apparatus-service management ID acquisition request <R-2> (FIG. 5, step S501), the SOAP server 42 checks whether or not the ServiceID contained in the controlling device-service management ID acquisition request <R-2> matches a ServiceID registered in the storage section 41 of the direct access management server 40 (FIG. 5, step S502). When they do not match, the SOAP server 42 transmits an error code that denotes that a ServiceID has not been registered to the service server 30 as a controlling apparatus-service management ID acquisition response <R-2R> to the service server 30 (FIG. 5, step S506). When they match, the SOAP server 42 issues a new controlling apparatus-service management ID (FIG. 5, step S503) and stores the relationship between the controlling apparatus-service management ID and the ServiceID in the storage section 41 (FIG. 5, step S504), and transmits the controlling device-service management ID as a controlling apparatus-service management ID acquisition response <R-2R> to the service server 30 (FIG. 5, step S505). Thus, the direct access management server 40 can identify the controlling side viewed therefrom as a combination of the mobile phone 10 as a controlling apparatus and the service of the service server 30 that the mobile phone 10 uses.

When the service server 30 receives the controlling apparatus-service management ID as the controlling apparatus-service management ID acquisition response <R-2R> (FIG. 4, step S405), the service server 30 correlatively registers the controlling apparatus-service management ID and the user identification information in the storage section 31 (FIG. 4, step S406). After the controlling apparatus-service management ID and the user identification information have been correlatively stored, when the service server 30 is accessed from the mobile phone 10, the service server 30 requests the direct access management server 40 to perform a process with the controlling apparatus-service management ID corresponding to the user identification information of the mobile phone 10. Thus, as a controlling side for the combination of the mobile phone 10 as a controlling apparatus and a service of the service server 30, the direct access management server 40 can uniquely identify a control request source.

After the service server 30 has correlatively registered the controlling apparatus-service management ID and the user identification information to the storage section 31 or when the controlling apparatus-service management ID corresponding to the user identification information contained in the device-under-control registration request <R-1> received from the mobile phone 10 has been registered in the storage section 31, the service server 30 issues a device-under-control registration password acquisition request <R-3> containing the controlling apparatus-service management ID and the ServiceID to the SOAP server 42 of the direct access management server 40 (FIG. 4, step S407).

When the SOAP server 42 of the direct access management server 40 receives the device-under-control registration password acquisition request <R-3> (FIG. 5, step S507), the SOAP server 42 determines whether or not the combination of the controlling apparatus-service management ID and the ServiceID contained in the device-under-control registration password acquisition request <R-3> has been registered to the storage section 41 (FIG. 5, step S508). When the combination has not been registered to the storage section 41, the SOAP server 42 transmits an error code denoting that the combination of the controlling apparatus-service management ID and the ServiceID has not been registered to the storage section 41 as a device-under-control registration password acquisition response <R-3R> to the service server 30 (FIG. 5, step S512). In contrast, when the combination of the controlling apparatus-service management ID and the ServiceID contained in the device under control registration password acquisition request <R-3> has been registered to the storage section 41, the SOAP server 42 newly generates a device-under-control registration password (FIG. 5, step S509), correlates the device-under-control registration password and information about an expiration date designated to the device-under-control registration password with the controlling apparatus-service management ID and the ServiceID contained in the device-under-control registration password acquisition request <R-3>, and registers the resultant information to the storage section 41 (FIG. 5, step S510). Thereafter, the SOAP server 42 transmits the device-under-control registration password and the information about the expiration date of the device-under-control registration password as the device-under-control registration password acquisition response <R-3R> to the service server 30 (FIG. 5, step S511).

When the service server 30 receives the device-under-control registration password acquisition response <R-3R> (FIG.

4, step S408), the service server 30 transmits the device-under-control registration password and the information about the expiration date of the device-under-control registration password contained in the device under control registration password acquisition response <R-3R> as a device-under-control registration response <R-4> to the mobile phone 10 (FIG. 4, step S409).

When the mobile phone 10 receives the device-under-control registration response <R-4> (FIG. 3, step S303), the mobile phone 10 stores the device-under-control registration password and the information about the expiration date of the device-under-control registration password in the storage section 11 (FIG. 3, step S304).

As a result, the controlling apparatus-service management ID registration process for the combination of the mobile phone 10 and the service thereof and the device-under-control registration password issuance process that correlates the device-under-control and the controlling apparatus have been completed.

[1-2. Registering Device-Under-Control]

Next, an operation of registering the DVR 20 as a device-under-control will be described.

First of all, the user inputs a one-time password transmission request to the mobile phone 10 (FIG. 3, step S305). When the mobile phone 10 receives the one-time password transmission request from the user, the mobile phone 10 transmits a device-under-control registration password stored in the storage section 11 as a one-time password <R-5> to the DVR 20, which is a device-under-control, through the interface [IF-03] such as infrared rays or the USB (FIG. 3, step S306). It can be thought that the device-under-control registration password is transmitted by various methods using wireless transmission such as an non-contact type IC card, Bluetooth™, or a wireless LAN. However, the device-under-control registration password may be transmitted by any method as long as it can be transmitted from the mobile phone 10, which is a controlling apparatus, to the DVR 20, which is a device-under-control. Thereafter, the mobile phone 10 deletes the device-under-control registration password from the storage section 11 (FIG. 3, step S307).

On the other hand, when the power of the DVR 20 is turned on, it checks an automatic connection flag (FIG. 6, step S627). When the DVR 20 has been registered as a device-under-control to the direct access management server 40 and the combination of the controlling apparatus and the service has been correlated with the device-under-control, the automatic connection flag is set to the ON state. Otherwise, the automatic connection flag is set to the OFF state.

When the automatic connection flag is set to the OFF state, the DVR 20 does not perform any process until it receives the device-under-control registration password <R-5> from the mobile phone 10. When the DVR 20 receives the device-under-control registration password <R-5> from the mobile phone 10 (FIG. 6, step S601), the DVR 20 transmits a device authentication request <R-0> containing information about an authentication system and device authentication information pre-assigned in the DVR 20 to the SOAP server 42 of the direct access management server 40 (FIG. 6, step S602).

When the SOAP server 42 of the direct access management server 40 receives the device authentication request <R-0> from the DVR 20 (FIG. 5, step S513), the SOAP server 42 determines whether or not the DVR 20 is a valid device based on the information about the authentication system and the device authentication information contained in the device authentication request <R-0> (FIG. 5, step S514). When the determined result denotes that the DVR 20 is an invalid device, namely information about the authentication system contained in the device authentication request <R-0> is different from the predetermined authentication system or the device authentication information contained in the device authentication request <R-0> is different from the format of the predetermined authentication system, the SOAP server 42 transmits an error code that represents a failure of the authentication of the DVR 20 as a device authentication response <R-0R> to the DVR 20 (FIG. 5, step S515). When the determined result denotes that the DVR 20 is a valid device, namely the information about the authentication system contained in the device authentication request <R-0> matches the predetermined authentication system and the device authentication information contained in the device authentication request <R-0> matches the format of the predetermined authentication system, the SOAP server 42 generates a device authentication continuous ID to be assigned to the DVR 20 (FIG. 5, step S516) and correlatively stores the device authentication continuous ID and the device authentication information contained in the device authentication request <R-0> in the storage section 41 (FIG. 5, step S517). Thereafter, the SOAP server 42 transmits the device authentication response <R-0R> that contains the generated device authentication continuous ID and information about the expiration date of the device authentication continuous ID to the DVR 20 (FIG. 5, step S518). The device authentication continuous ID is identification information assigned to a device that has been successfully authenticated by the direct access management server 40. With the identification information, the direct access management server 40 can check the authenticated state of the DVR 20, which is a device-under-control.

When the DVR 20 receives the device authentication response <R-0R> containing the device authentication continuous ID and the information about the expiration date of the device authentication continuous ID from the SOAP server 42 of the direct access management server 40 (FIG. 6, step S603), the DVR 20 correlates the device authentication continuous ID and the information of the expiration date thereof contained in the device authentication response <R-0R> with the device authentication information and stores the resultant information in the storage section 21 (FIG. 6, step S604).

Thus, the combination of the device authentication continuous ID, the information about the expiration date of the device authentication continuous ID, and the device authentication information has been stored in the storage section 21 of the DVR 20. On the other hand, the combination the device authentication continuous ID and the device authentication information has been stored in the direct access management server 40. As a result, the DVR 20, which is a device-under-control, has been registered to the direct access management server 40.

[1-3. Correlating Controlling Apparatus-Service Management ID and Device-Under-Control Management ID]

To correlatively register the controlling apparatus-service management ID and the device-under-control management ID to the direct access management server 40, the DVR 20 transmits a device-under-control registration request <R-6> containing device authentication continuous ID stored in the storage section 21 and the device-under-control registration password received from the mobile phone 10 to the SOAP server 42 of the direct access management server 40 (FIG. 6, step S605). Thus, the DVR 20 requests the direct access management server 40 to correlatively register the deviceunder-control registration password and the mobile phone 10 that has transmitted the device-under-control registration password.

When the SOAP server 42 of the direct access management server 40 receives the device-under-control registration request <R-6> from the DVR 20 (FIG. 5, step S519), the SOAP server 42 checks whether or not the device-under-control registration password contained in the device-under-control registration request <R-6> received from the DVR 20 matches the password stored in the storage section 41 and also checks the expiration date of the device-under-control registration password (FIG. 5, step S20). When the determined result is NG, namely the they do not match or the device-under-control registration password was expired, the SOAP server 42 transmits an error code denoting that the device-under-control registration password contained in the device-under-control registration request <R-6> is invalid as a device-under-control registration response <R-6R> to the DVR 20 (FIG. 5, step S527). When the DVR 20 receives the error code as the device-under-control registration response <R-6R> (FIG. 6, step S606), the DVR 20 displays an error message that represents the necessity of the reacquisition of the device-under-control registration password to the user through a screen of a television set connected to the DVR 20 (FIG. 6, step S607) and then completes the process.

When the checked result at step S20 is OK, namely the device-under-control registration password contained in the device-under-control registration request <R-6> matches the device-under-control registration password stored in the storage section 41 and the device-under-control registration password is not expired, the SOAP server 42 references information stored in the storage section 41 and determines whether or not the device authentication continuous ID contained in the device-under-control registration request <R-6> has been assigned a device-under-control management ID (FIG. 5, step S521). When the device authentication continuous ID has not been assigned a corresponding device-under-control management ID, the SOAP server 42 assigns a device-under-control management ID to the DVR 20 (FIG. 5, step S522), correlates the assigned device-under-control management ID with the device authentication information and the device authentication continuous ID of the DVR 20, and stores the resultant information in the storage section 41 (FIG. 5, step S523). In contrast, when the device authentication continuous ID contained in the device-under-control registration request <R-6> has been assigned a device-under-control management ID, the SOAP server 42 correlates the device-under-control management ID with the controlling apparatus-service management ID correlated with the device-under-control registration password and stored in the storage section 41, and stores the resultant information in the storage section 41 (FIG. 5, step S523-1). The device-under-control management ID is identification information uniquely assigned to the device-under-control in the direct access management server 40. Thus, the controlling apparatus-service management ID assigned to the combination of the controlling apparatus and the service is correlated with the device-under-control management ID assigned to the device-under-control. In this case, one controlling apparatus-service management ID may be correlated with a plurality of device-under-control management IDs. Instead, a plurality of controlling apparatus-service management IDs may be correlated with one device-under-control management ID.

Thereafter, the SOAP server 42 transmits the number of services that have been correlated as the device-under-control registration response <R-6R> to the DVR 20 (FIG. 5, step S524). Thereafter, the SOAP server 42 transmits a device-under-control registration completion notice <R-7> containing the ServiceID, the controlling apparatus-service management ID, and the device-under-control registration password stored in the storage section 41 to the service server 30 (FIG. 5, step S525). Thereafter, the SOAP server 42 deletes the device-under-control registration password from the storage section 41 (FIG. 5, step S526) and then completes the process. In addition, when the service server 30 receives the device-under-control registration completion notice <R-7> from the SOAP server 42 (FIG. 4, step S410), the service server 30 informs the mobile phone 10 that the device-under-control has been registered (FIG. 4, step S411). The service server 30 may inform the mobile phone 10 that the device-under-control has been registered by electronic mail, an application that communicates with the mobile phone 10, or the like.

When the DVR 20 receives the number of services that have been correlated as the device-under-control registration response <6-6R> from the SOAP server 42 (FIG. 6, step S608), the DVR 20 sets the automatic connection flag to the ON state (FIG. 6, step S609), reads initial values of an initial connection waiting upper limit time T1 and a reconnection waiting upper limit time T2 that were recorded as parameters of a program in the storage section 21 of the DVR 20 before shipment and stores them as registration information in the storage section 21. In this example, the initial connection waiting upper limit time T1 is a parameter used to decide a waiting time for the initial connection when the power of the DVR 20 is turned on, the DVR 20 is initially connected to the XMPP server 43, and then a constant connection session is disconnected from the XMPP server 43. The reconnection waiting upper limit time T2 is a parameter used to decide a waiting time after a constant connection session is disconnected from the XMPP server 43, if the reconnection fails.

Thereafter, the DVR 20 displays a message that denotes that the device-under-control has been registered (FIG. 6, step S610). Thereafter, to establish a constant connection session with the XMPP server 43 of the direct access management server 40, the DVR 20 transmits an XMPP login information acquirement request <D-0-1> containing the device authentication continuous ID to the SOAP server 42 of the direct access management server 40 (FIG. 6, step S611).

[2. XMPP Login of Device-Under-Control]

In the network system, the direct access management server 40 is provided with the XMPP server 43 that bidirectionally establishes a constant connection session with the device-under-control. Before the mobile phone 10, which is a controlling apparatus, accesses the DVR 20, which is a device-under-control, through the network, the DVR 20 logs in the XMPP server 43 to establish a constant connection session with the XMPP server 43. Thus, when necessary, the service server 30 and the mobile phone 10 can acquire desired information from the DVR 20. At this point, to simplify the design of the service server 30, the XMPP protocol is concealed in the direct access management server 40. With only the SOAP interface, information is exchanged between the DVR 20 and the XMPP server 43 that bidirectionally establishes a constant connection session with the DVR 20.

Figure 7:
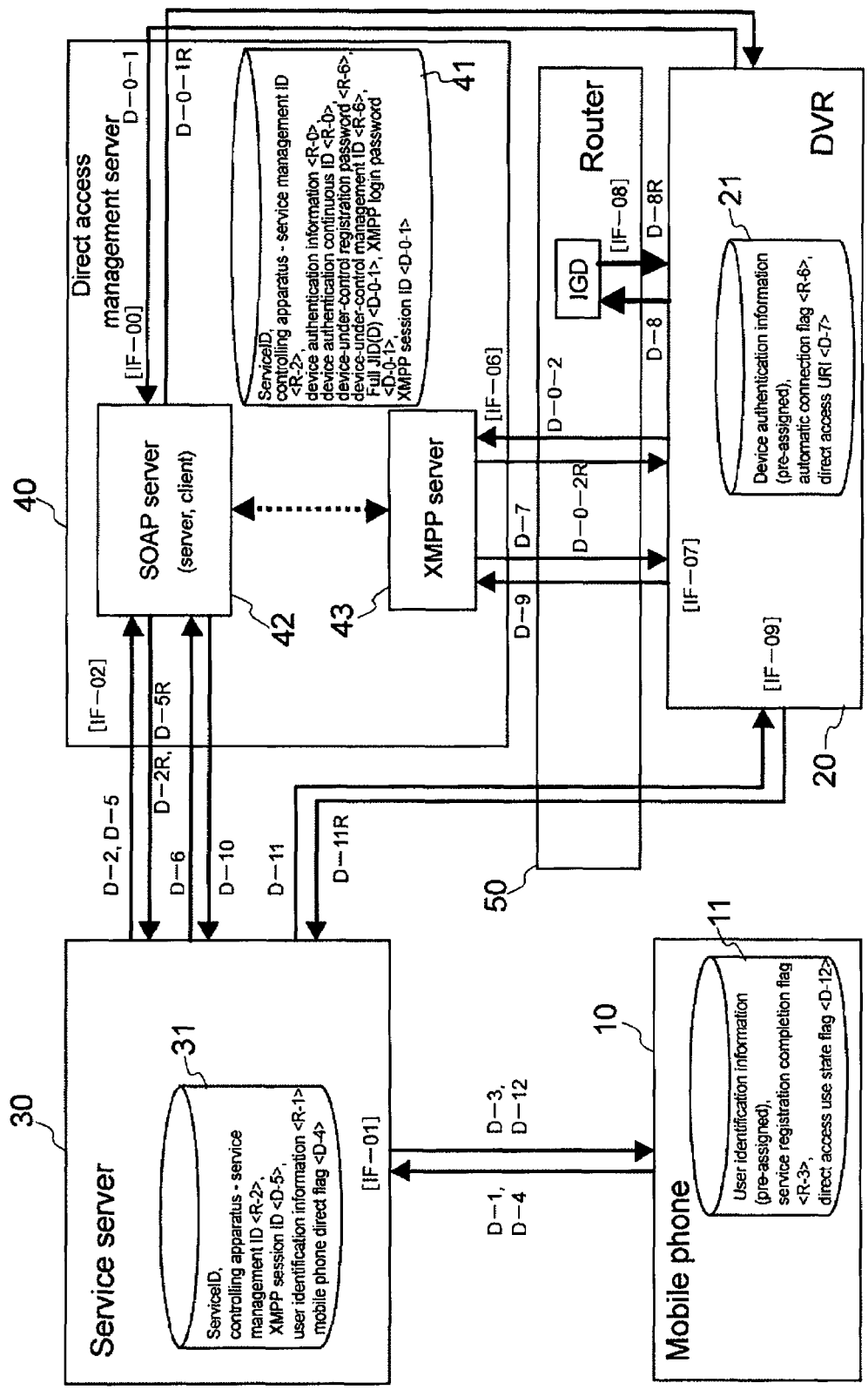
FIG. 7 is a sequence chart showing a flow of information upon an XMPP login and remote timer-recording of the device-under-control in the network system shown in FIG. 1.
Figure 10:
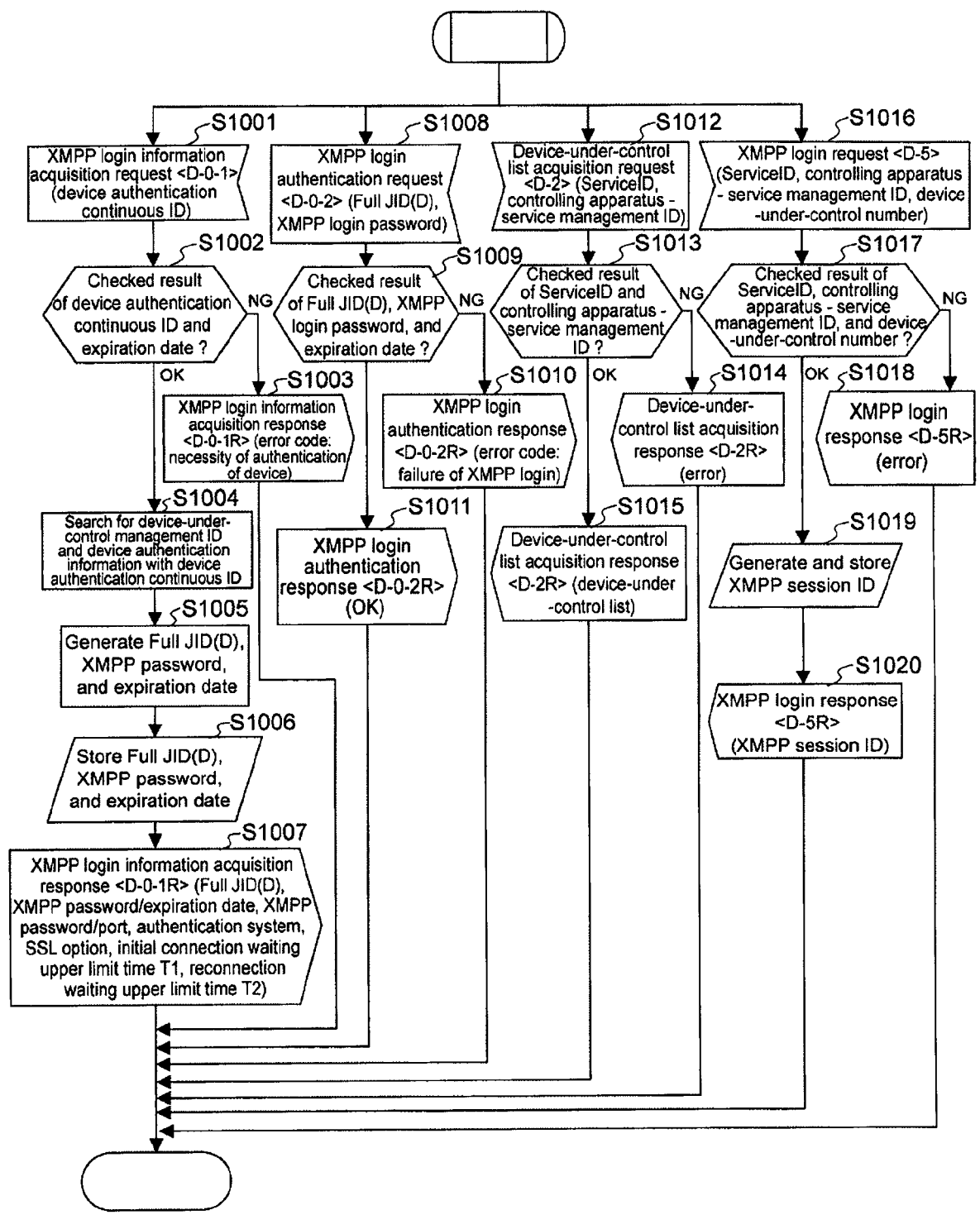
FIG. 10 is a flow chart showing an operation of the direct access management server for the XMPP login, the remote timer-recording, and content acquisition of the device-under-control.

FIG. 7 is a sequence chart partly showing a flow of information about an XMPP login of the device-under-control. FIG. 10 is a flow chart partly showing an operation of the direct access management server 40 about XMPP login of the device-under-control.

As shown in these drawings, when the direct access management server 40 receives an XMPP login information acquisition request <D-0-1> containing the device authentication continuous ID from the DVR 20 (FIG. 10, step S1001), the direct access management server 40 checks the device authentication continuous ID and the expiration date of the device authentication continuous ID contained in the XMPP login information acquisition request <D-0-1> (FIG. 10, step S1002). When the device authentication continuous ID contained in the XMPP login information acquisition request <D-0-1> does not match the information stored in the storage section 41 of the direct access management server 40 or the device authentication continuous ID was expired, since the DVR 20 has not been correctly registered to the direct access management server 40 or the device authentication continuous ID was expired, the direct access management server 40 transmits an error code representing the necessity of the authentication of the device as an XMPP login information acquisition response <D-0-1R> to the DVR 20 (FIG. 10, step S1003). When the device authentication continuous ID has been stored in the storage section 41 and the device authentication continuous ID is not expired, the direct access management server 40 searches the storage section 41 for the device-under-control management ID and the device authentication information correlated with the device authentication continuous ID (FIG. 10, step S1004). The direct access management server 40 generates a Full JID(D) that is an XMPP login ID with which the DVR 20 logs in the XMPP server 43, an XMPP login password, and information about the expiration date of the XMPP login password with the device-under-control management ID and the device authentication information (FIG. 10, step S1005) and stores them in the storage section 41 (FIG. 10, step S1006). The direct access management server 40 adds an XMPP address, a port number, information about authentication system, an SSL (Secure Socket Layer) option, an initial connection waiting upper limit time T1, and a reconnection waiting upper limit time T2 to the Full JID(D), the XMPP login password, and the information about the expiration date of the XMPP login password and transmits the resultant information as an XMPP login information acquisition response <D-0-1R> to the DVR 20 (FIG. 10, step S1007). In this example, the initial connection waiting upper limit time T1 and the reconnection waiting upper limit time T2 that are transmitted from the direct access management server 40 to the DVR 20 are values that can be dynamically changed depending on various situations for example a change of process performance such as a change of the number of devices-under-control with which the direct access management server 40 establishes a constant connection session or a change of the number of server devices that perform processes in parallel.

When the DVR 20 receives the XMPP login information acquisition response <D-0-1R> containing the Full JID(D), the XMPP login password, the initial connection waiting upper limit time T1, the reconnection waiting upper limit time T2, and so forth from the SOAP server 42 of the direct access management server 40 (FIG. 6, step S612), the DVR 20 stores the initial connection waiting upper limit time T1 and the reconnection waiting upper limit time T2 contained in the XMPP login information acquisition response <D-0-1R> in the storage section 21 (FIG. 6, step S613). In other words, the registration information of which the initial values of the initial connection waiting upper limit time T1 and the reconnection waiting upper limit time T2 recorded as parameters of the program in the storage section 21 of the DVR 20 before shipment have been read and stored in the storage section 21 at step S609 is updated with the initial connection waiting upper limit time T1 and the reconnection waiting upper limit time T2 acquired as the XMPP login information acquisition response <D-0-1R>.

Thereafter, the DVR 20 transmits an XMPP login authentication request <D-0-2> containing the Full JID(D) and the XMPP login password to the XMPP server 43 of the direct access management server 40 (FIG. 6, step S614).

When the XMPP server 43 of the direct access management server 40 receives the XMPP login authentication request <D-0-2> from the DVR 20 (FIG. 10, step S1008), the XMPP server 43 checks the Full JID(D), the XMPP login password, and the expiration date of the XMPP login password contained in the XMPP login authentication request <D-0-2> (FIG. 10, step S1009). When the Full JID(D) contained in the XMPP login authentication request <D-0-2> does not match that stored in the storage section 41, the XMPP login password contained in the XMPP login authentication request <D-0-2> does not match that stored in the storage section 41, or the XMPP login password was expired, the XMPP server 43 transmits an error code that represents a failure of the XMPP login as an XMPP login authentication response <D-0-2R> to the DVR 20 (FIG. 10, step S1010). In contrast, when the checked result of all the Full JID(D), the XMPP login password, and the expiration date is OK, the XMPP server 43 of the direct access management server 40 transmits a code that represents a permission of XMPP login as an XMPP login authentication response <D-0-2R> to the DVR 20 (FIG. 10, step S1011).

Figures 23, 24, 25:
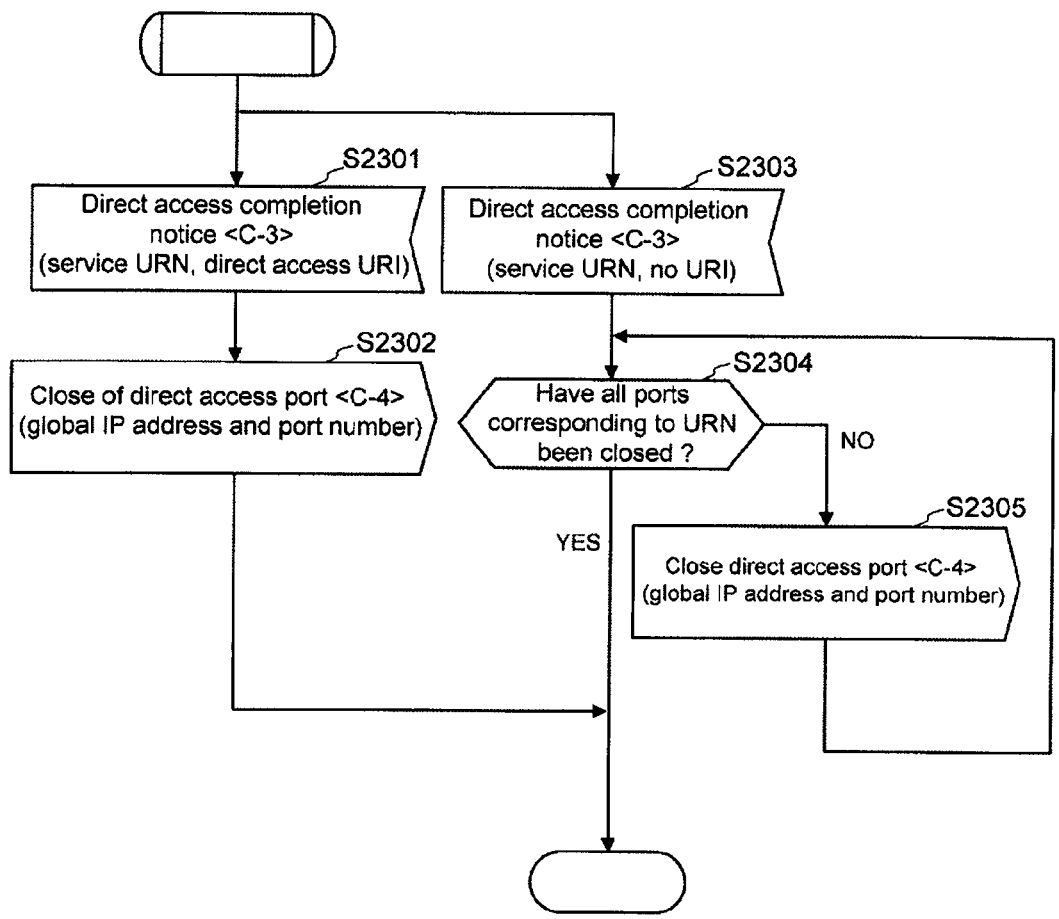
FIG. 23 is a flow chart showing an operation of the DVR upon completion of direct access.
FIG. 24 is a schematic diagram showing a structure of Full JID.
FIG. 25 is a schematic diagram showing another structure of Full JID.

In such a manner, in this network system, the direct access management server 40 generates the XMPP login ID (Full JID(D)) and the XMPP login password with which the DVR 20 logs in the XMPP server 43 and distributes them to the DVR 20. The Full JID(D) is composed of a bare JID portion and a resource portion as shown in FIG. 24. For the bare JID portion, a device-under-control management ID assigned to the device-under-control is used. For the resource portion, a product code and a serial number acquired from device authentication information are used. Instead, as shown in FIG. 25, for the source portion, a controlling apparatus-service management ID that identifies a combination of a controlling apparatus and a service may be used.

When the DVR 20 receives a code that represents a permission of the XMPP login as an XMPP login authentication response <D-0-2R> from the XMPP server 43 of the direct access management server 40 (FIG. 6, step S615), the DVR 20 resets the number of times of a connection error (described later) that has been recorded and waiting time tr1 and time tr2 stored in the storage section 21 (FIG. 6, step S616) and then completes the XMPP login process.

After the DVR 20 transmits the XMPP login information acquisition request <D-0-1> to the XMPP server 43 of the direct access management server 40, if the XMPP server 43 does not transmit any response to the DVR 20 in a predetermined time period, the DVR 20 determines that a connection error occur (FIG. 6, step S621). Instead, after the DVR 20 transmits the XMPP login authentication request <D-0-2> to the SOAP server 42 of the direct access management server 40, if the DVR 20 receives the error code that represents a failure of the XMPP login as the XMPP login authentication response <D-0-2R> or does not receive any response in a predetermined time period, the DVR 20 determines that a connection error occur (FIG. 6. step S625). In these cases, the DVR 20 checks the number of times of the connection error that has occurred and that has been recorded (FIG. 6, step S622).

When the connection error occurred the first time, the DVR 20 calculates the time tr2 based on the reconnection waiting upper limit time T2 and stores the time tr2 in the storage section 21 (FIG. 6, step S623). It is assumed that the time tr2 is a uniform random number time of which the waiting upper limit time of the reconnection is the upper limit. Thereafter, the DVR 20 calculates the time T1−tr1+tr2 based on the initial connection waiting upper limit time T1, the waiting time tr1, and the time tr2 stored in the storage section 21 and waits for the calculated time (FIG. 6, step S624). Thereafter, the DVR 20 transmits the XMPP login information acquisition request <D-0-1> again (FIG. 6, step S611). In addition, the DVR 20 stores the number of times of the connection error. When the waiting time tr1 has not been stored in the storage section 21, for example, the value of T1 is substituted into tr1.

When the initial values of the initial connection waiting upper limit time T1 and the reconnection waiting upper limit time T2 have been registered at step S609 and the XMPP login information has not been acquired at step S612, the initial connection waiting upper limit time T1 and the reconnection waiting upper limit time T2 have not been acquired from the direct access management server 40. Thus, in this case, the DVR 20 calculates the waiting time tr1 and the time tr2 with the initial connection waiting upper limit time T1 and the reconnection waiting upper limit time T2 recorded in the storage section 21 of the DVR 20 upon shipment. Once the XMPP login information has been acquired after the initial connection waiting upper limit time T1 and the reconnection waiting upper limit time T2 have been registered, the initial connection waiting upper limit time T1 and the reconnection waiting upper limit time T2 acquired from the direct access management server 40 have been stored in the storage section 21 of the DVR 20. In this case, the DVR 20 calculates the waiting time tr1 and the time tr2 with the initial connection waiting upper limit time T1 and the reconnection waiting upper limit time T2 acquired from the direct access management server 40.

Thereafter, when the DVR 20 receives the error code that represents the connection error as the XMPP login information acquisition response <D-0-1R> from the XMPP server 43 of the direct access management server 40 again (FIG. 6, step S621) or when the DVR 20 receives the error code that represents a failure of the XMPP login as the XMPP login authentication response <D-0-2R> from the XMPP server 43 (FIG. 6, step S625), the DVR 20 checks the number of times of the connection error and determines that the connection error occurred the second time (FIG. 6, step S622). In this case, the DVR 20 uses the reconnection waiting upper limit time T2 stored in the storage section 21 as the waiting time and waits for the reconnection waiting upper limit time T2 (FIG. 6, step S626). After the reconnection waiting upper limit time T2 elapses, the DVR 20 transmits the XMPP login information acquisition request <D-0-1> to the SOAP server 42 again (FIG. 6, step S611).

Thereafter, the DVR 20 transmits the XMPP login information acquisition request <D-0-1> again (FIG. 6, step S611) and waits for the waiting upper limit time T2 until the DVR 20 receives the code that represents a permission of the XMPP login as the XMPP login authentication response <D-0-2R> from the XMPP server 43 of the direct access management server 40 at step S615, namely until the DVR 20 successfully logs in the XMPP server 43, whenever the DVR 20 receives the error code that represents the connection error as the XMPP login information acquisition response <D-0-1R> from the SOAP server 42 of the direct access management server 40 or receives the error code that represents a failure of the XMPP login as the XMPP login authentication response <D-0-2R> from the XMPP server 43 of the direct access management server 40.

After the DVR 20 transmits the XMPP login information acquisition request <D-0-1> to the SOAP server 42 of the direct access management server 40, when the DVR 20 receives an error code that represents the necessity of the authentication of the device as the XMPP login information acquisition response <D-0-1R> from the SOAP server 42 (FIG. 6, step S617), since there is a possibility that the DVR 20 has not been registered as a device-under-control to the direct access management server 40 or the device authentication continuous ID was expired, the DVR 20 transmits the device authentication request <R-0> containing the information about the authentication system and the device authentication information pre-assigned in the DVR 20 to the SOAP server 42 of the direct access management server 40 so that the SOAP server 42 re-authenticates the DVR 20 (FIG. 6, step S630). When the DVR 20 receives the device authentication response <R-0R> containing the device authentication continuous ID and the information about the expiration date of the device authentication continuous ID from the SOAP server 42 of the direct access management server 40 (FIG. 6, step S631), the DVR 20 correlates the device authentication continuous ID and the information about the expiration date of the device authentication continuous ID contained in the device authentication response <R-0R> with the device authentication information and stores the resultant information in the storage section 21 (FIG. 6, step S632). The DVR 20 re-transmits the XMPP login information acquisition request <D-0-1> containing the stored device authentication continuous ID to the SOAP server 42 of the direct access management server 40 (FIG. 6, step S611). Thereafter, the flow returns to step S611.

After the DVR 20 transmits the device authentication request <R-0> to the SOAP server 42 of the direct access management server 40, when the DVR 20 receives the error code representing the connection error as the device authentication response <R-0R> (FIG. 6, step S633), the DVR 20 checks the number of times of the connection error that has been recorded (FIG. 6, step S622). Thereafter, the DVR 20 calculates the waiting time. After the waiting time elapses, the DVR 20 transmits the XMPP login information acquisition request <D-0-1> to the SOAP server 42 again (FIG. 6, step S611).

Next, an operation of the DVR 20 in the case that immediately after the power of the DVR 20 is turned on, the automatic connection flag has been set to the ON state will be described.

In this case, the DVR 20 calculates the uniform random number time of which the initial connection waiting upper limit time T1 stored in the storage section 21 is the upper limit and stores the calculated time as the waiting time tr1 (FIG. 6, step S628). After the time tr1 elapses (FIG. 6, step S629), the DVR 20 transmits the XMPP login information acquisition request <D-0-1> to the SOAP server 42 again (FIG. 6, step S611).

Thus, when the DVR 20 is reconnected, the DVR 20 can perform the XMPP login process, skipping the process of acquiring the device-under-control registration password from the mobile phone 10 and the process of registering the device-under-control. Thus, when the DVR 20 is reconnected, only by performing the XMPP login process, a connection session can be established between the DVR 20 and the XMPP server 43.

When a disconnection error of which the constant connection session is unexpectedly disconnected between the DVR 20 and the XMPP server 43 occurs (FIG. 6, step S634), the DVR 20 performs the same operation as the case that when the power of the DVR 20 is turned on, the automatic connection flag has been set to the ON state.

Figure 27:
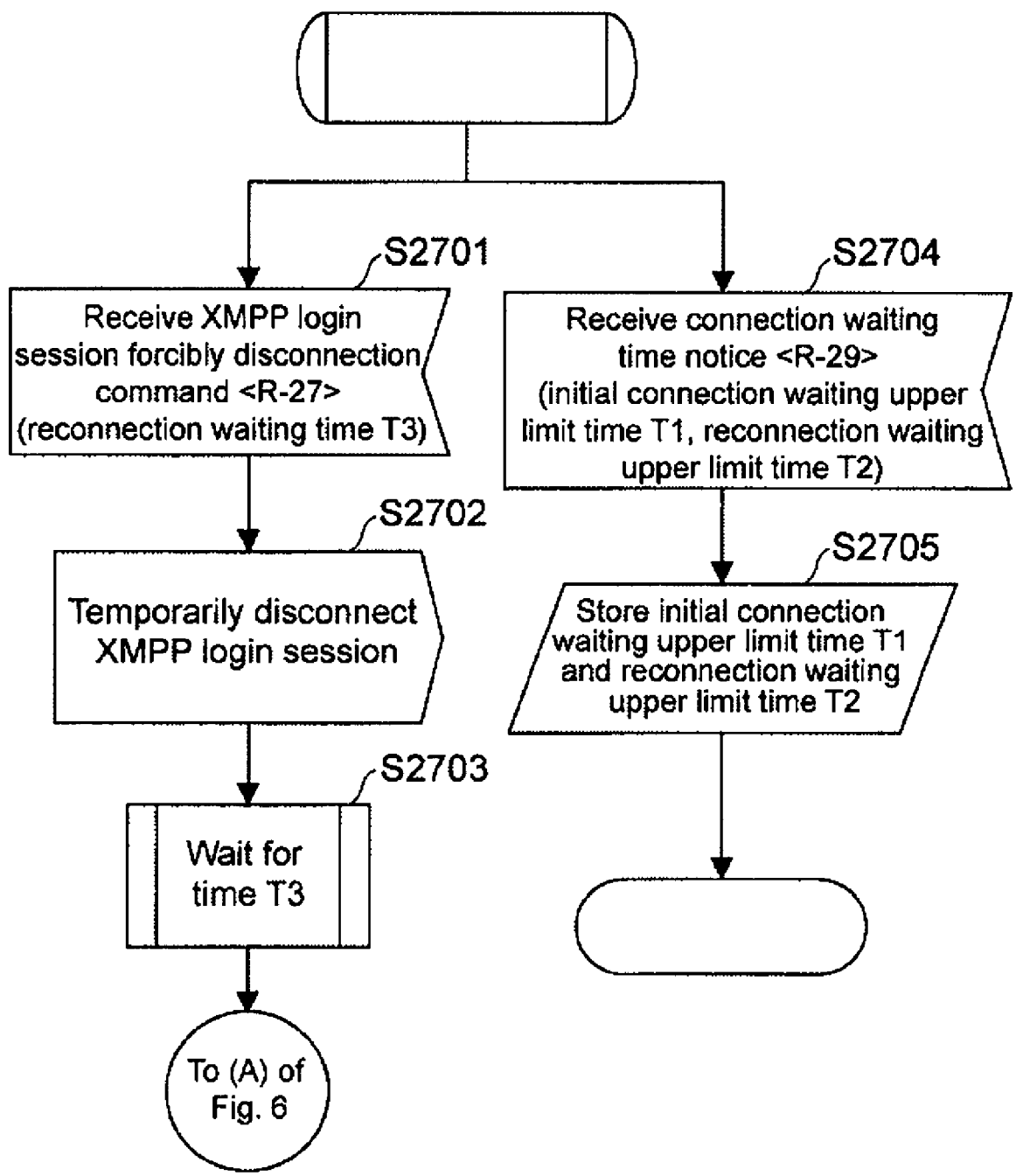
FIG. 27 is a flow chart showing a part of an operation of the DVR during a constant connection session with an XMPP server.

FIG. 27 is a flow chart partly showing the operation of the DVR 20 in the state that a constant connection session is established between the DVR 20 and the XMPP server 43.

When a maintenance work is performed for the direct access management server 40, it transmits an XMPP login session forcibly disconnection command <R-27> containing a message that represents a forcible disconnection of a constant connection session with the XMPP server 43 and a reconnection waiting time T3 to the DVR 20. When the DVR 20 receives the XMPP login session forcibly disconnection command <R-27> from the direct access management server 40 (FIG. 27, step S2701), the DVR 20 performs a process of disconnecting the constant connection session with the XMPP server 43 (FIG. 27, step S2702) and waits for the reconnection waiting time T3 contained in the XMPP login session forcibly disconnection command <R-27> (FIG. 27, step S2703). Thereafter, the flow returns to step S611. At step S611, the DVR 20 transmits the XMPP login information acquirement request <D-0-1> to the SOAP server 42. The reconnection waiting time T3 is a value that can be dynamically changed depending on various situations such as a change of process performance for example a change of the number of devices-under-control with which the direct access management server 40 establishes a constant connection session, and the number of server devices that operate.

When the initial connection waiting upper limit time T1 and the reconnection waiting upper limit time T2 that are transmitted to the DVR 20 are dynamically changed corresponding to the load applied to the direct access management server 40, the load applied to the direct access management server 40 can be more optimally and temporally distributed. Thus, depending on various situations such as a change of process performance for example a change of the number of devices-under-control with which the direct access management server 40 establishes a constant connection session and the number of server devices that perform processes in parallel, the direct access management server 40 updates the initial connection waiting upper limit time T1 and the reconnection waiting upper limit time T2 to their optimal values and transmits a connection waiting time notice <R-29> containing the updated initial connection waiting upper limit time T1 and reconnection waiting upper limit time T2 to the DVR 20. When the DVR 20 receives the connection waiting time notice <R-29> (FIG. 27, step S2703), the DVR 20 stores the initial connection waiting upper limit time T1 and the reconnection waiting upper limit time T2 contained in the connection waiting time notice <R-29> in the storage section 21 (FIG. 27, step S2704). At this point, if the initial connection waiting upper limit time T1 and the reconnection waiting upper limit time T2 have been stored in the storage section 21, the DVR 20 rewrites them with information of the newly acquired initial connection waiting upper limit time T1 and reconnection waiting upper limit time T2.

As examples of operations of the DVR 20 that establishes a constant connection session with the XMPP server 43 of the direct access management server 40 using the initial connection waiting upper limit time T1 and the reconnection waiting upper limit time T2, the cases that the power of the DVR 20 is turned off and then turned on while a constant connection session is being established between the DVR 20 and the XMPP server 43 (reconnection state) and the constant connection session established between the DVR 20 and the XMPP server 43 is disconnected due to any cause that occurs on the direct access management server 40 side. Next, operations of the DVR 20 in such cases will be described.

Figure 28:
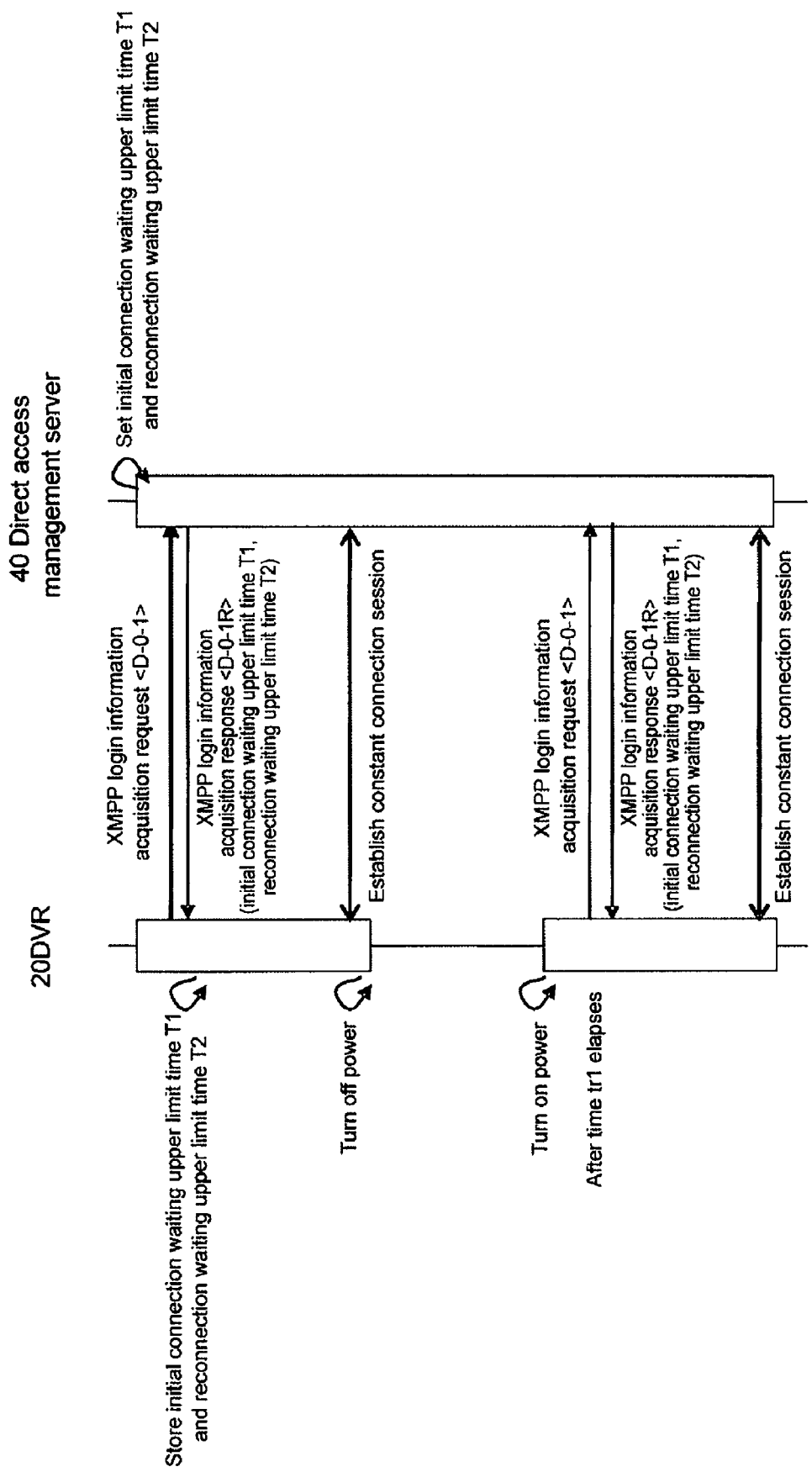
FIG. 28 is a schematic diagram showing an operation of reconnection of a constant connection session in the case that the power of the DVR is turned off during a constant connection session established with the XMPP server and then the power of the DVR is turns on again.

First, the reconnection operation of the DVR 20 in the case that the power of the DVR 20 is turned off and then turned on while a constant connection session is being established between the DVR 20 and the XMPP server 43 will be described with reference to FIG. 28.

After the DVR 20 has been registered to the direct access management server 40, the DVR 20 transmits the XMPP login information acquirement request <D-0-1> to the direct access management server 40. When the DVR 20 receives the XMPP login information acquisition response <D-0-1R> containing the information necessary for the XMPP login, the initial connection waiting upper limit time T1, and the reconnection waiting upper limit time T2 from the direct access management server 40, the DVR 20 stores the information necessary for the XMPP login, the initial connection waiting upper limit time T1, and the reconnection waiting upper limit time T2 contained in the XMPP login information acquisition response <D-0-1R> in the storage section 21. Thereafter, the DVR 20 establishes a constant connection session with the XMPP server 43 of the direct access management server 40 using the information necessary for the XMPP login stored in the storage section 21. When the power of the DVR 20 is turned off, the constant connection session established with the XMPP server 43 is disconnected. Thereafter, when the power of the DVR 20 is turned on, the DVR 20 checks the automatic connection flag, calculates the waiting time tr1 based on the initial connection waiting upper limit time T1 stored in the storage section 21, waits for the waiting time tr1, transmits the XMPP login information acquirement request <D-0-1> again, and reestablishes a constant connection session with the XMPP server 43 of the direct access management server 40.

In this example, it is assumed that the initial connection waiting upper limit time T1 is as short as around 60 seconds taking into account of user's convenience. The DVR 20 waits for the waiting time tr1 as the uniform random number time of which the initial connection waiting upper limit time T1 is the upper limit. Thus, viewed from the direct access management server 40, the load is distributed at time intervals of 0 to T1.

When the power of the DVR 20 is turned on and then turned off, when the DVR 20 transmits the XMPP login information acquirement request <D-0-1> to the XMPP server 43 nearly one time, the constant connection session is established between the DVR 20 and the XMPP server 43. However, if the constant connection session established between the DVR 20 and the XMPP server 43 is disconnected due to any cause that occurs on the direct access management server 40 side, even if the DVR 20 repeatedly transmits the XMPP login information acquirement request <D-0-1> to the XMPP server 43, the connection error may repeatedly occur.

Figure 29:
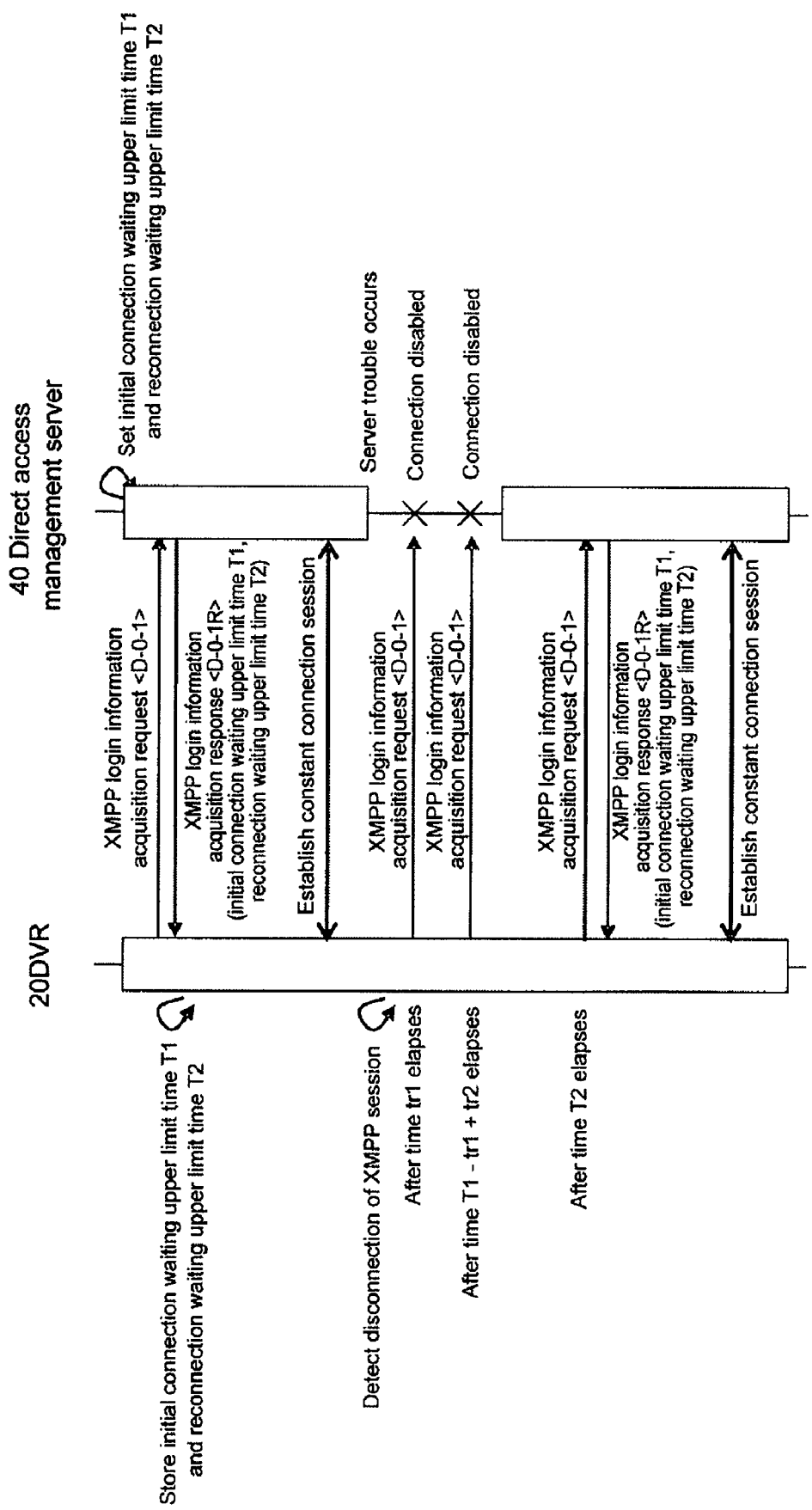
FIG. 29 is a schematic diagram showing an example of information exchanged between the DVR and the direct access management server in the case that an XMPP session disconnection error occurs and a constant connection session is re-established.

FIG. 29 is a schematic diagram showing an example of which information is exchanged between the DVR 20 and the direct access management server 40 in the case that the connection error repeatedly occurs.

In this case, the DVR 20 waits for the waiting time tr1, which is the uniform random number time of the initial connection waiting upper limit time T1, and transmits the XMPP login information acquirement request <D-0-1> to the direct access management server 40. If the connection error occurs, the DVR 20 calculates the time tr2, which is the uniform random number time of the reconnection waiting upper limit time T2, calculates the time T1−tr1+tr2 with the time tr2, the initial connection waiting upper limit time T1, and the waiting time tr1, waits for the time T1−tr1+tr2, and transmits the XMPP login information acquirement request <D-0-1>. In this example, the reconnection waiting upper limit time T2 is for example around 600 seconds, which is longer than the initial connection waiting upper limit time T1. Although the initial connection waiting upper limit time T1 is a time decided taking into account of user's convenience, the reconnection waiting upper limit time T2 is a time taking into account of temporarily distributing the load applied to the direct access management server 40. In other words, the connection error due to problems of the direct access management server 40 and the network side concurrently occurs in a plurality of devices-under-control. As a result, these devices-under-control may transmit the XMPP login information acquirement request <D-0-1> to the direct access management server 40 nearly at the same timings. Instead, according to this embodiment, the load applied to the direct access management server 40 can be prevented from being temporarily distributed.

In addition, after the connection error occurs the second time, the DVR 20 waits for the reconnection waiting upper limit time T2 and repeatedly transmits the XMPP login information acquirement request <D-0-1> to the XMPP server 43 until a constant connection session is established between the DVR 20 and the direct access management server 40. In other words, once the DVR 20 waits for the time T1−tr1+tr2, even if the DVR 20 repeatedly transmits the XMPP login information acquirement request <D-0-1> to the direct access management server 40 at the same time intervals, the load is not concentrated to the direct access management server 40.

Figure 30:
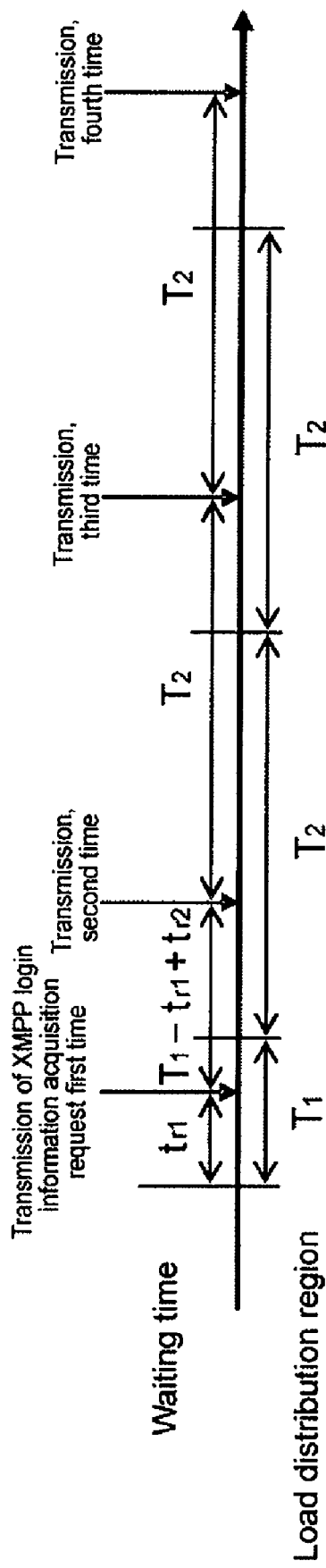
FIG. 30 is a schematic diagram showing a relationship between waiting time and load distributed region of the direct access management server.

FIG. 30 is a schematic diagram showing the relationship between the waiting times and the load distribution region of the direct access management server 40. Thus, the initial connection waiting upper limit time T1 is a relatively short time taking into account of user's convenience. The uniform random number time of which the initial connection waiting upper limit time T1 is the upper limit becomes the waiting time tr1 for which the DVR 20 waits until it transmits the XMPP login information acquirement request <D-0-1>. In contrast, since the reconnection waiting upper limit time T2 is a time decided taking into account of temporarily distributing the load applied to the direct access management server 40, it is preferred that the reconnection waiting upper limit time T2 be sufficiently longer than the initial connection waiting upper limit time T1. The time T1−tr1+tr2 becomes a real waiting time for which the DVR 20 waits until it transmits the XMPP login information acquirement request <D-0-1> the second time. In this case, tr2 is a uniform random number time of which the reconnection waiting upper limit time T2 is the upper limit. The DVR 20 transmits the XMPP login information acquirement request <D-0-1> the third time or later at intervals of the reconnection waiting upper limit time T2. The waiting time for which the DVR 20 waits until it transmits the XMPP login information acquirement request <D-0-1> the second time is the time T1−tr1+tr2 so that it is assured that the DVR 20 transmits the XMPP login information acquirement request <D-0-1> the second time in the first T2 region. If the DVR 20 is permitted to transmit the XMPP login information acquirement request <D-0-1> the second time in the T1 region, since the XMPP login information acquirement request <D-0-1> transmitted the first time and the XMPP login information acquirement request <D-0-1> transmitted the second time coexist in the T1 region, resulting in a risk of which the load applied to the direct access management server 40 increases in the T1 region.

In addition, the direct access management server 40 dynamically updates the initial connection waiting upper limit time T1 and the reconnection waiting upper limit time T2 depending on various situations such as a change of process performance for example a change of the number of devices-under-control with which a constant connection session is established and a change of the number of server devices that perform processes in parallel and newly transmits the XMPP login information acquisition request <D-0-1> to the DVR 20 with which a session is newly established. Thus, the initial connection waiting upper limit time T1 and the reconnection waiting upper limit time T2 that allow the load applied to the direct access management server 40 to be optimally distributed can be supplied to the DVR 20. As a result, the availability of the direct access management server 40 can be improved.

Next, a specific process of which the mobile phone 10, which is a controlling apparatus, controls the DVR 20, which is a device-under-control, correlated with the mobile phone 10 will be described.

[3. Remote Timer-Recording]

Next, a remote timer-recording operation for the DVR 20 will be described.

Figure 8:
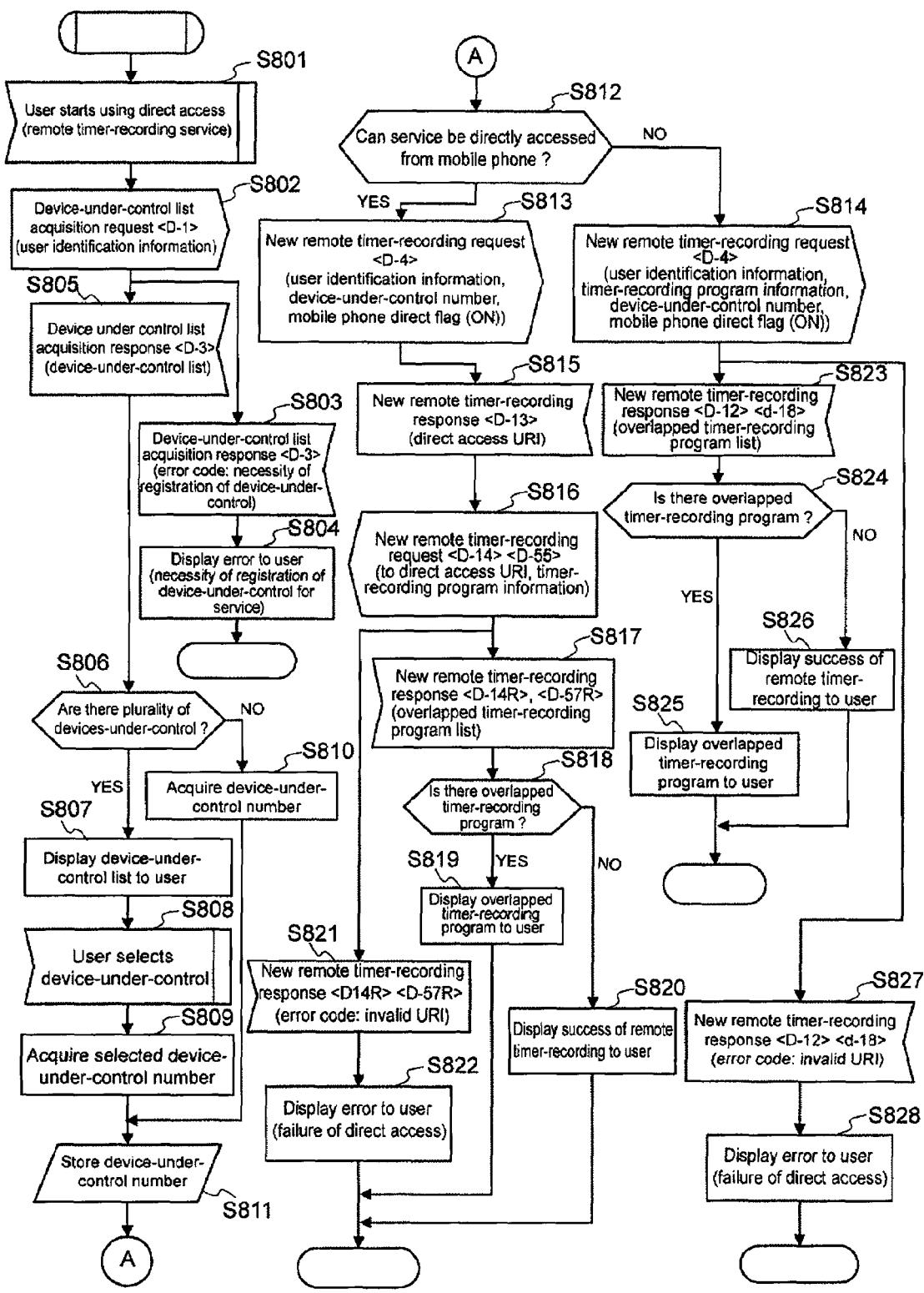
FIG. 8 is a flow chart showing an operation of the mobile phone for the remote timer-recording.
Figure 9:
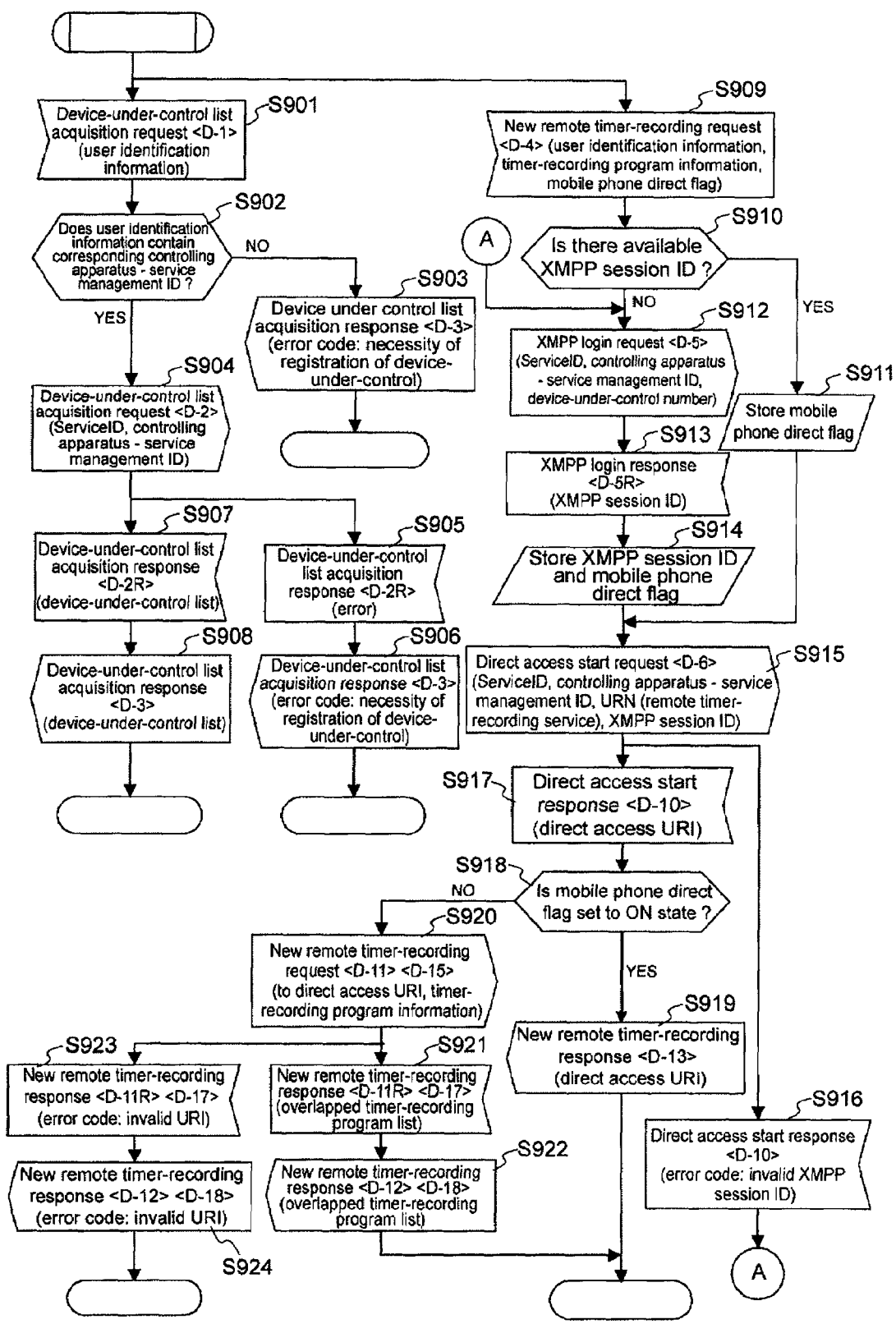
FIG. 9 is a flow chart showing an operation of the service server for the remote timer-recording.
Figure 11:
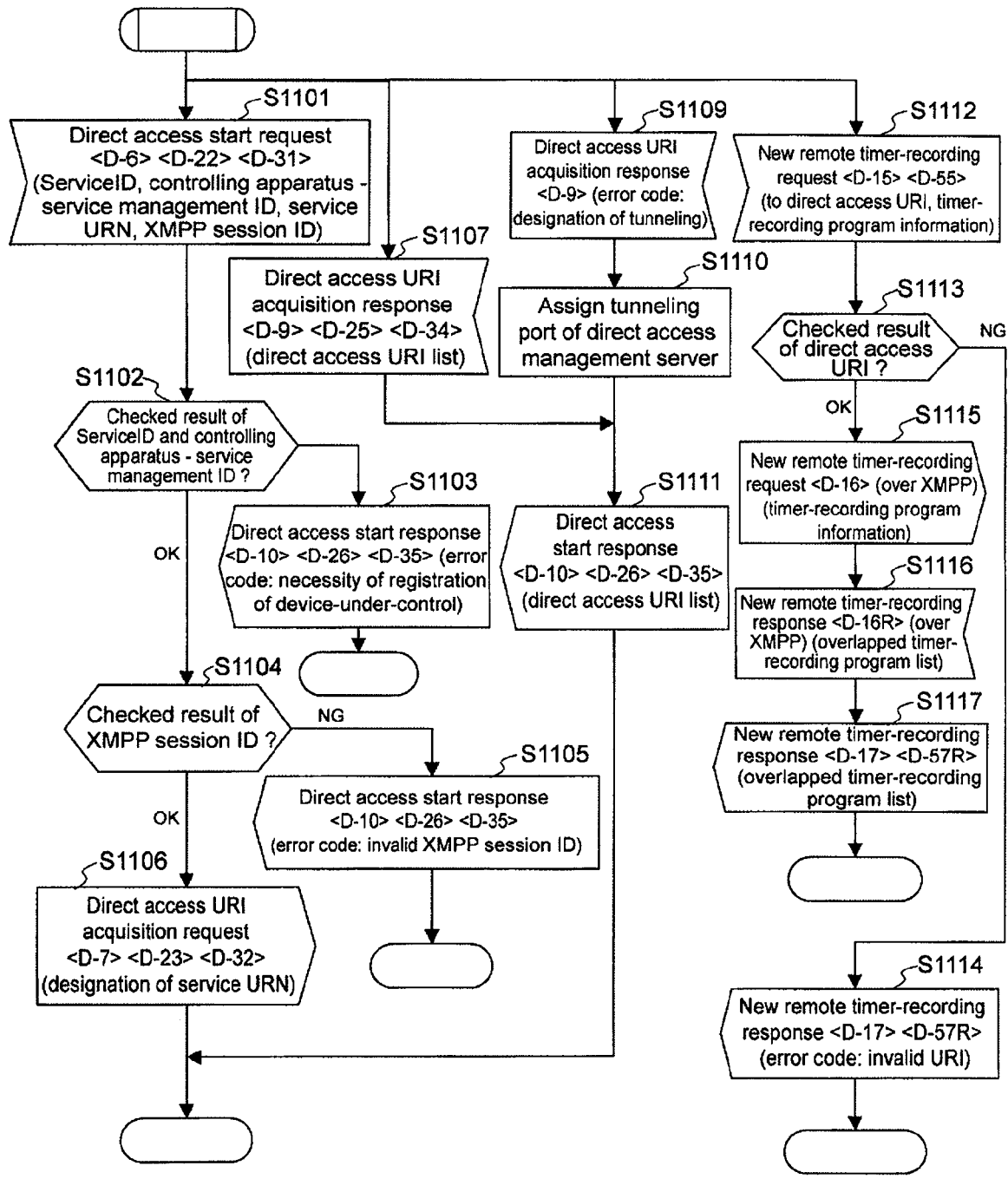
FIG. 11 is a flow chart showing an operation of the direct access management server for the remote timer-recording and the content acquisition.
Figure 12:
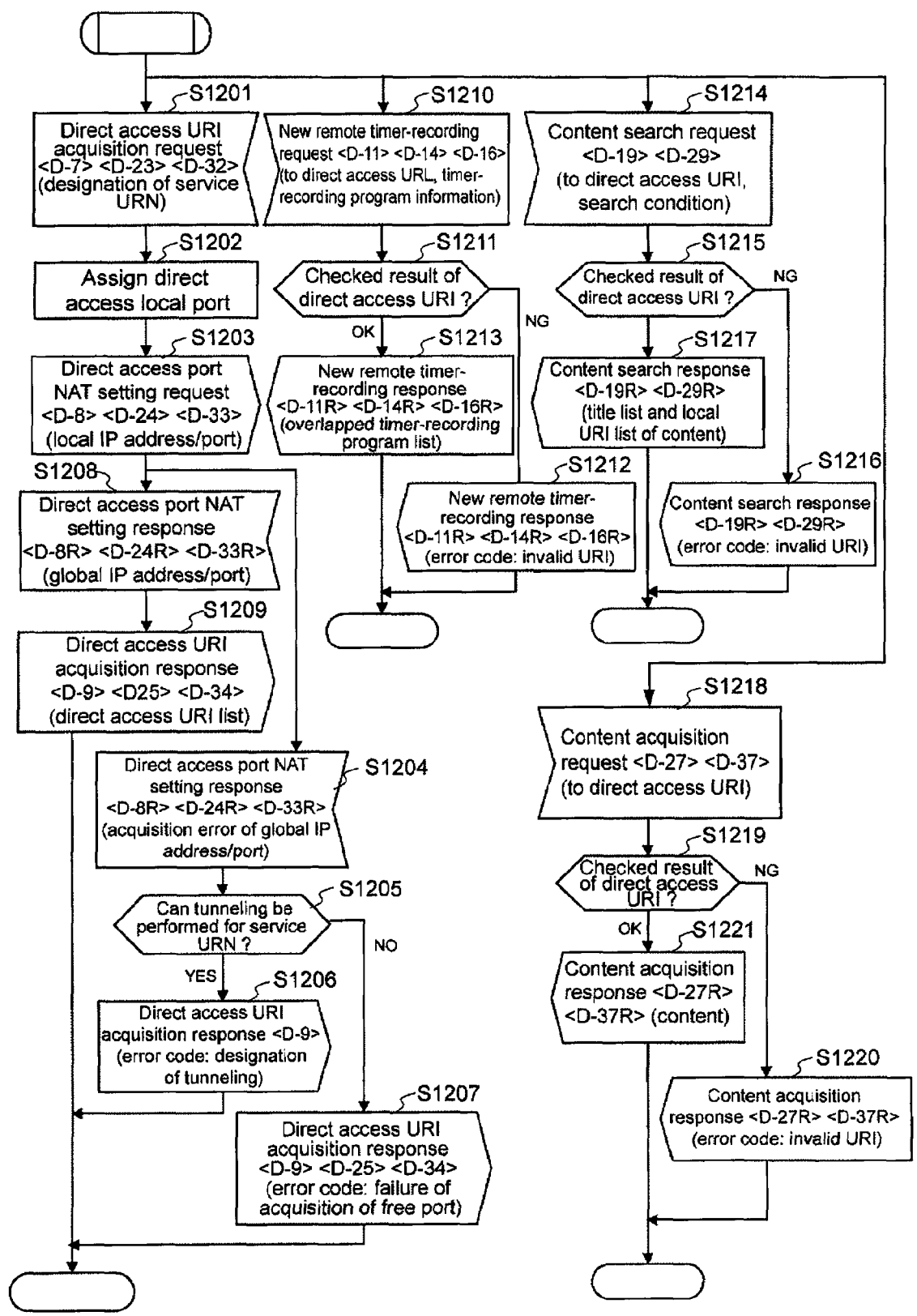
FIG. 12 is a flow chart showing an operation of the DVR for the remote timer-recording and the content acquisition.

FIG. 7 is a sequence chart partly showing a flow of information upon remote timer-recording. FIG. 8 is a flow chart showing an operation of the mobile phone 10 for the remote timer-recording. FIG. 9 is a flow chart showing an operation of the service server 30 for the remote timer-recording. FIG. 10 and FIG. 11 are flow charts showing an operation of the direct access management server 40 for the remote timer-recording and content acquisition. FIG. 12 is a flow chart showing an operation of the DVR 20 for the remote timer-recording and content acquisition.

To receive a remote timer-recording service, the user of the mobile phone 10 issues a direct access start command to the mobile phone 10 (FIG. 8, step S801). When the mobile phone 10 receives the command, the mobile phone 10 transmits a device-under-control list acquisition request <D-1> containing user identification information pre-assigned in the mobile phone 10 to the service server 30 (FIG. 8, step S802).

When the service server 30 receives the device-under-control list acquisition request <D-1> from the mobile phone 10 (FIG. 9, step S901), the service server 30 determines whether or not a controlling apparatus-service management ID corresponding to the user identification information contained in the device-under-control list acquisition request <D-1> has been stored in the storage section 31 (FIG. 9, step S902). When the controlling apparatus-service management ID corresponding to the user identification information has not been stored in the storage section 31, the service server 30 transmits an error code that represents the necessity of the registration of the device-under-control as a device-under-control list acquisition response <D-3> to the mobile phone 10 (FIG. 9, step S903). When the controlling apparatus-service management ID corresponding to the user identification information has been stored in the storage section 31, the service server 30 transmits a device-under-control list acquisition request <D-2> containing a ServiceID, which identifies a service, and a controlling apparatus-service management ID to the direct access management server 40 to acquire a list of a device-under-control correlated with the controlling apparatus-service management ID managed by the direct access management server 40 (FIG. 9, step S904).

When the direct access management server 40 receives the device-under-control list acquisition request <D-2> from the service server 30 (FIG. 10, step S1012), the direct access management server 40 determines whether or not the combination of the ServiceID and the controlling apparatus-service management ID contained in the device-under-control list acquisition request <D-2> has been stored in the storage section 41 (FIG. 10, step S1013). When the combination has not been stored in the storage section 41, the direct access management server 40 transmits an error code that denotes that the device-under-control has not been registered as a device-under-control list acquisition response <D-2R> to the service server 30 (FIG. 10, step S1014). When the service server 30 receives the error code that denotes that the device-under-control has not been registered as the device-under-control list acquisition response <D-2R> from the direct access management server 40 (FIG. 9, step S905), the service server 30 transmits an error code that represents the necessity of the registration of the device-under-control as the device-under-control list acquisition response <D-3> to the mobile phone 10 (FIG. 9, step S906). When the mobile phone 10 receives the error code as the device-under-control list acquisition response <D-3> from the service server 30 (FIG. 8, step S803), the mobile phone 10 displays an error message that represents the necessity of the registration of the device-under-control for the service to the user through the display section (FIG. 8, step S804).

When the determined result at step S1013 denotes that the combination of the ServiceID and the controlling apparatus-service management ID contained in the device-under-control list acquisition request <D-2> has been stored in the storage section 41, the direct access management server 40 generates a list of a renumbered device-under-control management ID of the devices-under-control that can be controlled by the mobile phone 10, a device name, and so forth contained in the device authentication information of the devices-under-control as a device-under-control list corresponding to the controlling apparatus-service management ID and the device-under-control ID correlatively stored in the storage section 41, correlatively stores the device-under-control list and the controlling apparatus-service management ID in the storage section 41, and transmits the device-under-control list acquisition response <D-2R> containing the device-under-control list to the service server 30 (FIG. 10, step S1015). When the service server 30 receives the device-under-control list acquisition response <D-2R> containing the device-under-control list from the direct access management server 40 (FIG. 9, step S907), the service server 30 transmits the device-under-control list acquisition response <D-3> containing the device-under-control list to the mobile phone 10 (FIG. 9, step S908).

When the mobile phone 10 receives the device-under-control list acquisition response <D-3> containing the device-under-control list (FIG. 8, step S806), the mobile phone 10 determines whether or not the device-under-control list contains a plurality of device-under-control numbers (FIG. 8, step S806). When the device-under-control list contains a plurality of device-under-control numbers, the mobile phone 10 displays the contents of the device-under-control list on the display section (FIG. 8, step S807), prompts the user to select one of them (FIG. 8, step S808), and stores the selected device-under-control number in the storage section 11 (FIG. 8, step S809, step S811). When the device-under-control list does not contain a plurality of device-under-control numbers, the mobile phone 10 stores one device-under-control number in the storage section 11 (FIG. 8, step S810, step S811).

Thereafter, the mobile phone 10 determines whether or not the service that it is using (remote timer-recording) is a service that it can directly access the device-under-control (FIG. 8, step S812). When the mobile phone 10 uses a service that it can directly access, the mobile phone 10 transmits a new remote timer-recording request <D-4> containing user identification information, a device-under-control number, and a mobile phone direct flag (ON) stored in the storage section 11 to the service server 30 (FIG. 8, step S813). When the mobile phone 10 uses a service that it can directly access, the mobile phone direct flag is set to the ON state. When the mobile phone 10 uses a service that it is not able to directly access, the mobile phone direct flag is set to the OFF state. Thus, when the mobile phone 10 uses a service that it can directly access, the mobile phone 10 transmits the new remote timer-recording request <D-4> containing the user identification information, timer-recording program information, the device-under-control number, and the mobile phone direct flag (OFF) to the service server 30 (FIG. 8, step S814). The timer-recording program information is composed of information including for example a record start time, a program duration, a broadcast type, a channel, and a forcible reservation flag.

When the service server 30 receives the new remote timer-recording request <D-4> from the mobile phone 10 (FIG. 9, step S909), the service server 30 determines whether or not an available XMPP session ID, namely an ID that identifies a connection session established with the XMPP server 43, has been correlated with the user identification information of the mobile phone 10 contained in the new remote timer-recording request <D-4> and stored in the storage section 31 (FIG. 9, step S910). When an available XMPP session ID has not been stored in the storage section 31, the service server 30 transmits an XMPP login request <D-5> containing the ServiceID, the controlling device-service management ID, and the device-under-control number to the direct access management server 40 to establish an XMPP session with the XMPP server 43 (FIG. 9, step S912).

When the direct access management server 40 receives the XMPP login request <D-5> from the service server 30 (FIG. 10, step S1016), the direct access management server 40 determines whether or not the combination of the ServiceID, the controlling apparatus-service management ID, and the device-under-control number contained in the XMPP login request <D-5> has been stored in the storage section 41 (FIG. 10, step S1017). When the combination has not been stored in the storage section 41, the direct access management server 40 transmits an error code that denotes that a device-under-control for the corresponding service has not been stored in the storage section 41 as an XMPP login response <D-5R> to the service server 30 (FIG. 10, step S1018). Thereafter, the direct access management server 40 completes the operation. When a device-under-control for the corresponding service has been stored in the storage section 41, the direct access management server 40 generates an XMPP session ID, correlatives the XMPP session ID with the ServiceID, the controlling device-service management ID, and the device-under-control number, stores the resultant information in the storage section 41 (FIG. 10, step S1019), and transmits the XMPP login response <D-5R> containing the XMPP session ID to the service server 30 (FIG. 10, step S1020).

When the service server 30 receives the XMPP login response <D-5R> containing the XMPP session ID from the direct access management server 40 (FIG. 9, step S913), the service server 30 correlates the XMPP session ID contained in the XMPP login response <D-5R> and the value of the mobile phone direct flag contained in the new remote timer-recording request <D-4> at step S909 with the ServiceID, the controlling device-service management ID, and the device-under-control list number and stores the resultant information in the storage section 31 (FIG. 9, step S914).

When the determined result at step S910 denotes that a valid XMPP session ID has been stored in the storage section 31, the service server 30 correlates the value of the mobile phone direct flag contained in the new remote timer-recording request <D-4> with the ServiceID, the controlling apparatus-service management ID, and the device-under-control number, and stores the resultant information in the storage section 31 (FIG. 9, step S911).

After the service server 30 stores the mobile phone direct flag at step S911 or step S914, the service server 30 transmits a direct access start request <D-6> containing the ServiceID, the controlling apparatus-service management ID, a service URN (Uniform Resource Name), and an XMPP session ID to the direct access management server 40 (FIG. 9, step S915). In this example, the service URN is information that designates one of services (applications) that the device-under-control can provide. In this example, since the mobile phone 10 is performing the remote timer-recording for the DVR 20, the service URN is information that designates the remote timer-recording service.

When the direct access management server 40 receives the direct access start request <D-6> from the service server 30 (FIG. 11, step S1101), the direct access management server 40 determines whether or not the combination of the ServiceID and the controlling apparatus-service management ID contained in the direct access start request <D-6> has been stored in the storage section 41 (FIG. 11, step S1102). When the combination has not been stored in the storage section 41, the direct access management server 40 transmits an error code that represents the necessity of the registration of the device-under-control as a direct access start response <D-10> to the service server 30 (FIG. 11, step S1102). When the combination of the ServiceID and the controlling apparatus-service management ID contained in the direct access start request <D-6> has been stored in the storage section 41, the direct access management server 40 determines whether or not the XMPP session ID contained in the direct access start request <D-6> has been correlated with the combination of the ServiceID and the controlling apparatus-service management ID contained in the direct access start request <D-6> and stored in storage section 41 (FIG. 11, step S1104). When the XMPP session ID contained in the direct access start request <D-6> has not been stored in the storage section 41, the direct access management server 40 transmits an error code that denotes that the XMPP session ID is invalid as a direct access start response <D-10> to the service server 30 (FIG. 11, step S1105). When the service server 30 receives an error code that denotes that the XMPP session ID is invalid as the direct access start response <D-10> from the direct access management server 40 (FIG. 9, step S916). Thereafter, the service server 30 transmits the XMPP login request <D-5> to the direct access management server 40 to reestablish the XMPP session with the direct access management server 40 again (FIG. 9, step S912).

When the determined result at step S1104 denotes that the XMPP session ID contained in the direct access start request <D-6> has been correlated with the combination of the ServiceID and the controlling apparatus-service management ID contained in the direct access start request <D-6> and stored in the storage section 41, the direct access management server 40 transmits a direct access URI acquisition request <D-7> containing the information that designates the service URN as the information that identifies the service designated by the direct access start request <D-6> through a constant connection session established between the XMPP server 43 and the DVR 20 as a device-under-control (FIG. 11, step S1106).

When the DVR 20 receives the direct access URI acquisition request <D-7> containing the information that designates the service URN from the direct access management server 40 (FIG. 12, step S1201), the DVR 20 assigns a direct access local port (FIG. 12, step S1202). Thereafter, the DVR 20 transmits a direct access port NAT (Network Address Translation) setting request <D-8> containing a local IP address and a direct access local port number pre-assigned to the DVR 20 to the router 50 and requests the router 50 to map the local IP address and port number with global IP address and port number that can be accessed from the Internet with. For example, the DVR 20 accesses the router 50 by for example UPnP IGD DCP (Device Control Protocol) or the like to assign a direct access URI and pre-assign a global IP address and a port number that can be accessed from the Internet.

When the DVR 20 receives the global IP address and the port number correlated with the local IP address and the port number of the DVR 20 as a direct access port NAT setting response <D-8R> from the router 50 in response to the direct access port NAT setting request <D-8> at step S1203 (FIG. 12, step S1208), the DVR 20 creates a direct access URI list with the global IP address and the port number and transmits the direct access URI list as a direct access URI acquisition response <D-9> to the direct access management server 40 (FIG. 12, step S1209). The direct access URI list is a URI list with which the service server 30 or the mobile phone 10 directly accesses the device through the network.

When the XMPP server 43 of the direct access management server 40 receives the direct access URI list as the direct access URI acquisition response <D-9> (FIG. 11, step S1107), the XMPP server 43 transmits the direct access URI list as a direct access start response <D-10> to the service server 30 (FIG. 11, step S1111).

In contrast, when the DVR 20 receives an acquisition error of the global IP address and the port number as the direct access port NAT setting response <D-8R> from the router 50 (FIG. 12, step S1204), the DVR 20 determines whether or not tunneling can be performed for the service URN based on the information designating the service URN acquired at step S1201 (FIG. 12, step S1205). In this example, some services of provided services are pre-designated as a service for which tunneling can be performed. For example, a service such as a remote-timer recording service whose communication data amount is small is pre-designated as a service for which tunneling can be performed. In contrast, a service whose communication data amount is relative large, such as a content acquisition service, is pre-designated as a service for which tunneling is not able to be performed. Thus, when the determined results denotes that the information designating the service URN contained in the direct access URI acquisition request <D-7> is a new remote timer-recording service, the DVR 20 transmits an error code that designates tunneling as a direct access URI acquisition response <D-9> to the direct access management server 40 (FIG. 12, step S1206). The tunneling is designated by filling the address portion of the direct access URI with all "0's".

When the XMPP server 43 of the direct access management server 40 receives the error code representing the necessity of tunneling as the direct access URI acquisition response <D-9> (FIG. 11, step S1109), the XMPP server 43 assigns a tunneling port of the direct access management server 40 (FIG. 11, step S1110), creates a direct access URI list with the assigned tunneling port number of the direct access management server 40 and the global IP address of the direct access management server 40, and transmits a direct access start response <D-10> containing the direct access URI list to the service server 30 (FIG. 11, step S1111). Thus, the service server 30 and the mobile phone 10 can access the DVR 20 without being aware of tunneling.

When the determined result at step S1205 denotes that the information designating the service URN contained in the direct access URI acquisition request <D-7> is a service URN for which tunneling is not able to be performed, the DVR 20 transmits an error code that represents a failure of the acquisition of a free port as the direct access URI acquisition response <D-9> to the direct access management server 40 (FIG. 12, step S1207).

When the service server 30 receives the direct access start response <D-10> containing the direct access URI list from the direct access management server 40 (FIG. 9, step S917), the service server 30 determines whether the mobile phone direct flag has been set to the ON state or the OFF state (FIG. 9, step S918). When the mobile phone direct flag has been set to the ON state, the service server 30 transmits a new remote timer-recording response <D-13> containing the direct access URI to the mobile phone 10 to allow it to directly access the device designated by the direct access URI (FIG. 9, step S919). When the mobile phone direct flag has been set to the OFF state, the service server 30 transmits a new remote timer-recording request containing the direct access URI and the timer-recording program information acquired from the mobile phone 10 with the new remote timer-recording request <D-4> to the direct access URI (FIG. 9, step S920).

Next, several specific examples of which the mobile phone 10 issues a timer-recording request to the DVR 20 will be described.

[3-1. Remote Timer-Recording by Proxy Access in Service Server 30: FIG. 7]

Next, an operation of the service server 30 that performs remote timer-recording for the DVR 20 by proxy of the mobile phone 10 will be described. FIG. 7 is a schematic diagram partly showing a flow of information in the case that the service server 30 performs remote timer-recording for the DVR 20 by proxy of the mobile phone 10.

In a flow of information among the mobile phone 10, the DVR 20, the service server 30, the direct access management server 40, and the router 50, they perform the foregoing processes until they receive the direct access start response <D-10>.

When the determined result at step S918 denotes that the mobile phone direct flag has been set to the OFF state and the direct access start response <D-10> that the service server 30 received at step S917 contains the URI that the DVR 20 transmitted as the direct access URI acquisition response <D-9> at step S1209, the service server 30 performs remote timer-recording for the DVR 20 by proxy of the mobile phone 10. As described above, since the service server 30 only accesses the direct access URI received as the direct access start response <D-10>, it is not necessary to cause the service server 30 to determine whether the direct access URI corresponds to the DVR 20 or tunneling of the direct access management server 40.

The service server 30 accesses the address of the DVR 20 contained in the direct access URI received at step S917 as the direct access start response <D-10> and transmits a new remote timer-recording request <D-11> containing the timer-recording program information acquired with the new remote timer-recording request <D-4> from the mobile phone 10 (FIG. 9, step S920).

When the DVR 20 receives the new remote timer-recording request <D-11> from the service server 30 (FIG. 12, step S1210), the DVR 20 checks whether or not the direct access URI contained in the new remote timer-recording request <D-11> is valid (FIG. 12, step S1211). When the URI is invalid, the DVR 20 transmits an error code that denotes that the URI is invalid as a new remote timer-recording response <D-11R> to the service server 30 (FIG. 12, step S1212). The validity of the direct access URI is checked for example by adding a random number that is not easily imitated to the direct access URI to be issued and then determining whether or not the random number is contained in the direct access URI of the new remote timer-recording request <D-11>. When the URI is valid, the DVR 20 determines whether or not the date and time of the timer-recording request issued from the service server 30 overlaps with those of a scheduled timer-recording request based on the timer-recording program information. When there is no overlapped timer-recording, the DVR 20 performs the timer-recording based on the timer-recording program information and creates an overlapped timer-recording program list that represents no overlapped timer-recording. When there is overlapped timer-recording, the DVR 20 creates an overlapped timer-recording program list containing overlapped timer-recording date and time, a channel, a program title, and so forth. Thereafter, the DVR 20 transmits a new remote timer-recording response <D-11R> containing the overlapped timer-recording program list to the service server 30 (FIG. 12, step S1213).

When the service server 30 receives the new remote timer-recording response <D-11R> (FIG. 9, step S921), the service server 30 transmits the overlapped timer-recording program list contained in the new remote timer-recording response <D-11R> as a new remote timer-recording response <D-12> to the mobile phone 10 (FIG. 9, step S922). When the service server 30 receives an error code that denotes that the URI is invalid as the new remote timer-recording response <D-11R> (FIG. 9, step S923), the service server 30 transmits the error code as the new remote timer-recording response <D-12> to the mobile phone 10 (FIG. 9, step S924).

When the mobile phone 10 receives the new remote timer-recording response <D-12> containing the overlapped timer-recording program list from the service server 30 (FIG. 8, step S823), the mobile phone 10 determines whether or not there is an overlapped timer-recording program based on the overlapped timer-recording program list (FIG. 8, step S824). When there is an overlapped timer-recording program, the mobile phone 10 displays information about the overlapped timer-recording program to the user through the display section (FIG. 8, step S825). When there is no overlapped timer-recording program, the mobile phone 10 displays a message that represents a success of the remote timer-recording to the user through the display section (FIG. 8, step S826).

When the mobile phone 10 receives an error code that denotes that the URI is invalid as the new remote timer-recording response <D-12> from the service server 30 (FIG. 8, step S827), the mobile phone 10 displays an error message representing a failure of the direct access to the user through the display section (FIG. 8, step S828).

Figure 13:
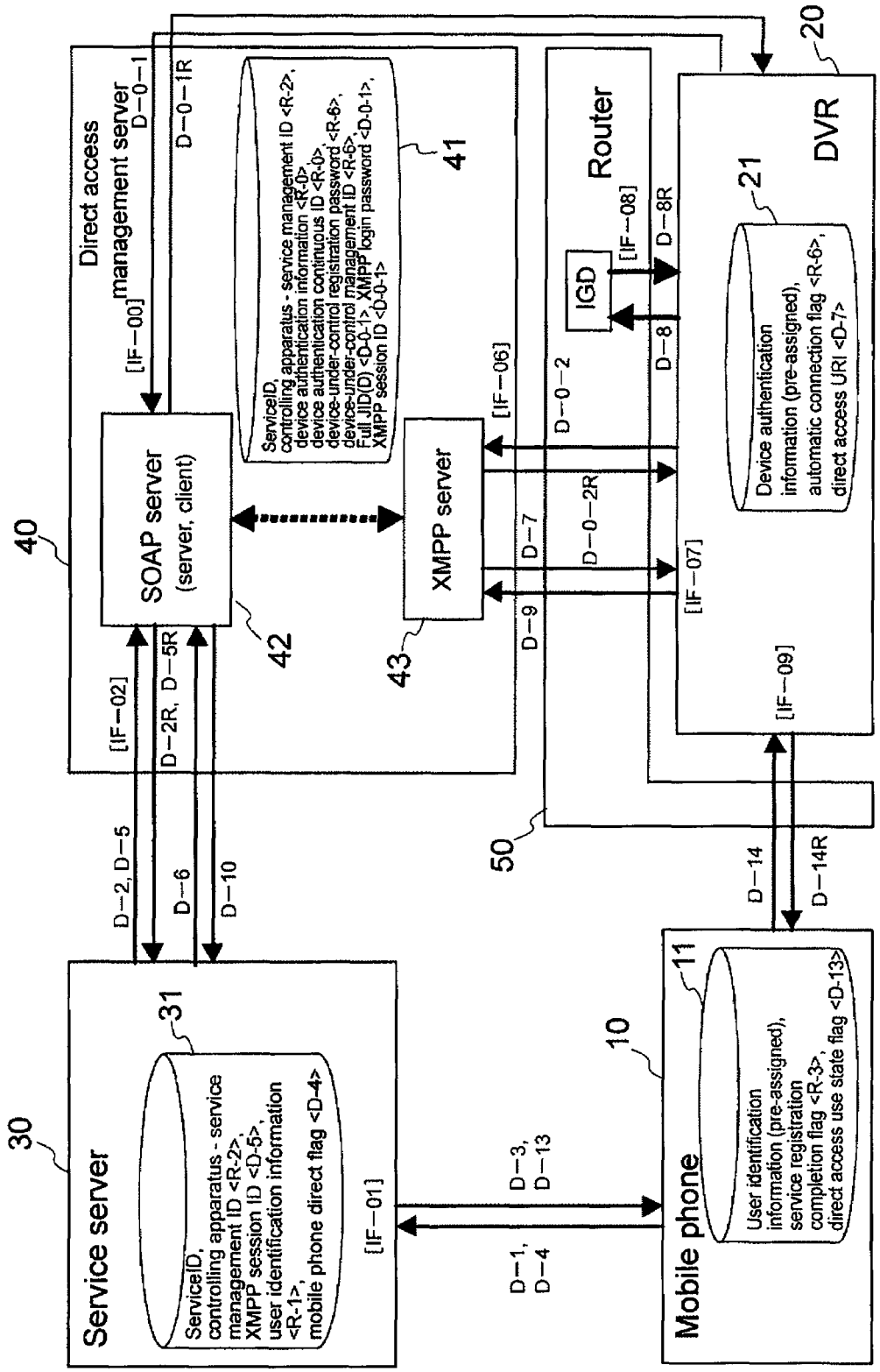
FIG. 13 is a sequence chart showing a flow of information in the case that the remote timer-recording is performed directly from the mobile phone in the network system shown in FIG. 1.

[3-2. Remote Timer-Recording Directly from Mobile Phone 10: FIG. 13]

Next, an operation of the mobile phone 10 that directly performs remote timer-recording for the DVR 20 not through the service server 30 will be described. FIG. 13 is a sequence chart showing a flow of information in the case that the mobile phone 10 directly performs timer recording for the DVR 20.

In a flow of information among the mobile phone 10, the DVR 20, the service server 30, the direct access management server 40, and the router 50 shown in FIG. 13, since the processes they perform until they receive the direct access start response <D-10> are the same as those shown in FIG. 7, their description will be omitted.

When the determined result at step S918 denotes that the mobile phone direct flag has been set to the ON state and the new remote timer-recording response <D-13> transmitted at step S919 from the service server 30 to the mobile phone 10 contains the URI transmitted at step S1209 from the DVR 20 as the direct access URI acquisition response <D-9>, the mobile phone 10 directly performs remote timer-recording for the DVR 20. As described above, since the mobile phone 10 only accesses the direct access URI received as the new remote timer-recording response <D-13>, it is not necessary to cause the mobile phone 10 to determine whether the direct access URI corresponds to the DVR 20 or tunneling of the direct access management server 40.

When the mobile phone 10 receives the new remote timer-recording response <D-13> containing the direct access URI from the service server 30 (FIG. 8, step S815), the mobile phone 10 accesses the address of the DVR 20 contained in the direct access URI and transmits a new remote timer-recording request <D-14> containing the direct access URI and the timer-recording program information to the DVR 20 (FIG. 8, step S816).

When the DVR 20 receives the new remote timer-recording request <D-14> from the mobile phone 10 (FIG. 12, step S1210), the DVR 20 checks whether or not the direct access URI contained in the new remote timer-recording request <D-14> is valid (FIG. 12, step S1211). When the URI is invalid, the DVR 20 transmits an error code that denotes that the URI is invalid as a new remote timer-recording response <D-14R> to the mobile phone 10 (FIG. 12, step S1212). The validity of the direct access URI is checked for example by adding a random number that is not easily imitated to the direct access URI to be issued and then determining whether or not the random number is contained in the direct access URI of the new remote timer-recording request <D-14>. When the URI is valid, the DVR 20 determines whether or not the date and time of the timer-recording request issued from the mobile phone 10 overlaps with those of a scheduled timer-recording request based on the timer-recording program information. When there is no overlapped timer-recording, the DVR 20 performs the timer-recording based on the timer-recording program information and creates an overlapped timer-recording program list that represents no overlapped timer-recording. When there is overlapped timer-recording, the DVR 20 creates an overlapped timer-recording program list containing overlapped timer-recording date and time, a channel, a program title, and so forth. Thereafter, the DVR 20 transmits a new remote timer-recording response <D-14R> containing the overlapped timer-recording program list to the mobile phone 10 (FIG. 12, step S1213).

When the mobile phone 10 receives the new remote timer-recording response <D-14R> (FIG. 8, step S817), the mobile phone 10 determines whether or not there is an overlapped timer-recording program based on the overlapped timer-recording program list (FIG. 8, step S818). When there is an overlapped timer-recording program, the mobile phone 10 displays information about the overlapped timer-recording program to the user through the display section (FIG. 8, step S819). When there is no overlapped timer-recording program, the mobile phone 10 displays a message that represents a success of the remote timer-recording to the user through the display section (FIG. 8, step S820).

When the mobile phone 10 receives an error code that denotes that the URI is invalid as the new remote timer-recording response <D-14R> (FIG. 8, step S821), the mobile phone 10 displays an error message representing a failure of the direct access to the user through the display section (FIG. 8, step S822).

Figure 14:
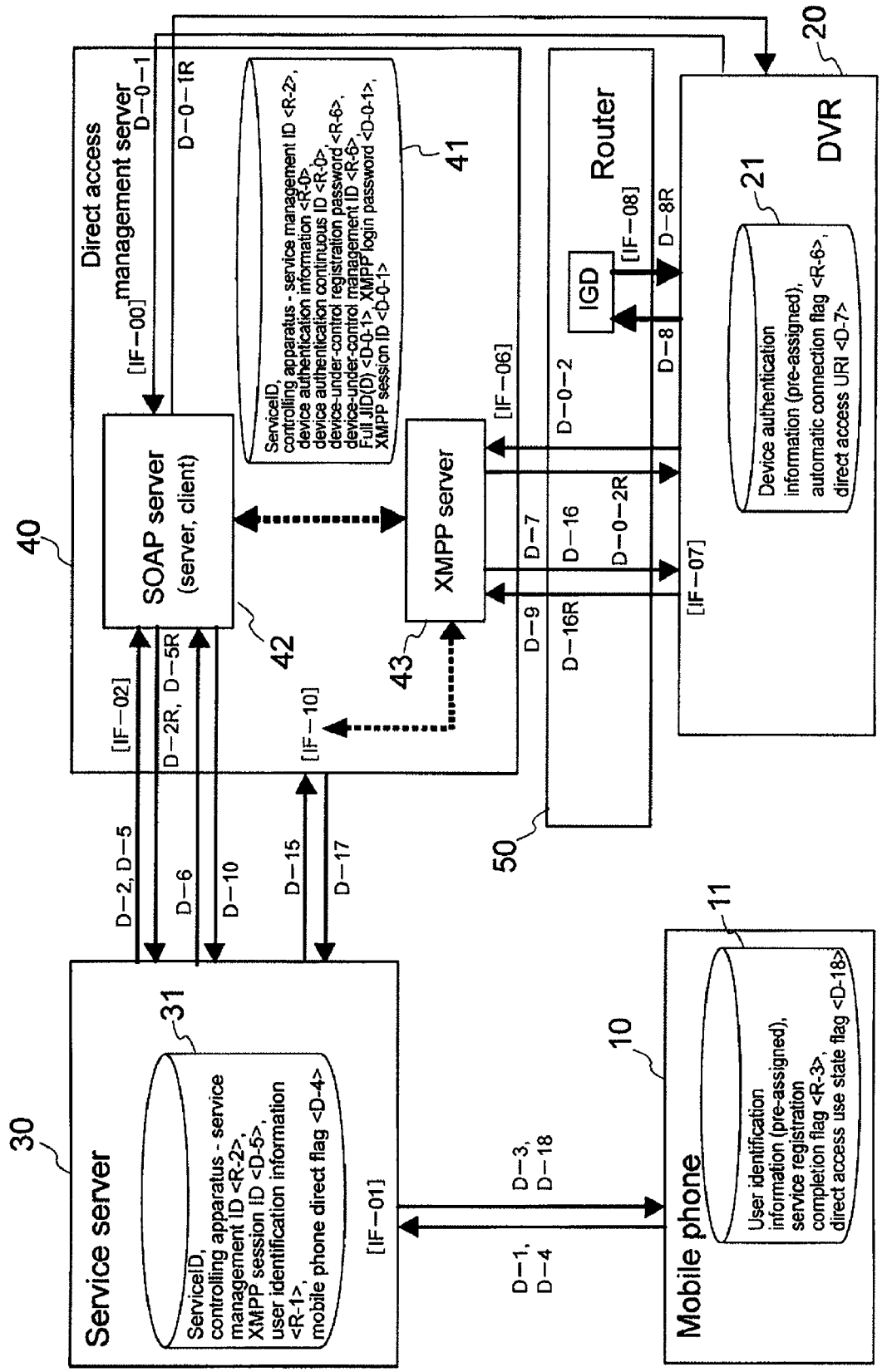
FIG. 14 is a sequence chart showing a flow of information in the case that the remote timer-recording is performed by tunneling from the mobile phone in the network system shown in FIG. 1.

[3-3. Remote Timer-Recording by Tunneling from Service Server 30: FIG. 14]

Next, an operation of the mobile phone 10 that performs remote timer-recording for the DVR 20 by tunneling of the XMPP server 43 of the direct access management server 40 corresponding to a predetermined command issued from the mobile phone 10 will be described. FIG. 14 is a sequence chart showing a flow of information in the case that the service server 30 performs remote timer-recording for the DVR 20 by tunneling of the XMPP server 43 corresponding to a predetermined command issued from the mobile phone 10.

In a flow of information among the mobile phone 10, the DVR 20, the service server 30, the direct access management server 40, and the router 50 shown in FIG. 14, since the processes they perform until they receive the direct access start response <D-10> are the same as those shown in FIG. 7, their description will be omitted.

When the determined result at step S918 denotes that the mobile phone direct flag has been set to the OFF state and the direct access start response <D-10> received that the service server 30 received at step S917 contains the URI that the direct access management server 40 assigned for tunneling at step S1110, the service server 30 performs remote timer-recording for the DVR 20 by tunneling of the XMPP server 43 corresponding to a predetermined command issued from the mobile phone 10. As described above, since the service server 30 only accesses the direct access URI received as the direct access start response <D-10>, it is not necessary to cause the service server 30 to determine whether the direct access URI corresponds to the DVR 20 or tunneling of the direct access management server 40.

The service server 30 accesses the address of the direct access management server 40 contained in the direct access URI received at step S917 as the direct access start response <D-10> and transmits a new remote timer-recording request <D-15> containing the direct access URI and the timer-recording program information acquired from the mobile phone 10 with the new remote timer-recording request <D-4> (FIG. 9, step S920).

When the direct access management server 40 receives the new remote timer-recording request <D-15> containing the direct access URI and the timer-recording program information (FIG. 11, step S1112), the direct access management server 40 checks whether or not the direct access URI contained in the new remote timer-recording request <D-15> is valid (FIG. 11, step S1113). When the direct access URI is invalid, the direct access management server 40 transmits an error code that denotes that the URI is invalid as a new remote timer-recording response <D-17> to the service server 30 (FIG. 11, step S1114). When the direct access URI is valid, the direct access management server 40 transmits a new remote timer-recording request <D-16> containing the timer-recording program information to the DVR 20 through the XMPP server 43 (FIG. 11, step S1115). At this point, for example, the address portion of the direct access URI is filled with all "0's" so that the DVR 20 knows that it is accessed by tunneling through the XMPP server 43 of the direct access management server 40.

When the DVR 20 receives the new remote timer-recording request <D-16> from the direct access management server 40 (FIG. 12, step S1210), the DVR 20 checks whether or not the direct access URI contained in the new remote timer-recording request <D-16> is valid (FIG. 12, step S1211). When the direct access URI is invalid, the DVR 20 transmits an error code that denotes that the direct access URI is invalid as a new remote timer-recording response <D-16R> to the direct access management server 40 (FIG. 12, step S1212). When the direct access URI is valid, the DVR 20 transmits information containing an overlapped timer-recording program list as a new remote timer-recording response <D-16R> to the direct access management server 40 (FIG. 12, step S1213).

When the direct access management server 40 receives the new remote timer-recording response <D-16R> containing the overlapped timer-recording program list from the DVR 20 (FIG. 11, step S1116), the direct access management server 40 transmits a new remote timer-recording response <D-17> containing the overlapped timer-recording program list to the service server 30 (FIG. 11, step S1117).

When the service server 30 receives the new remote timer-recording response <D-17> containing the overlapped timer-recording program list (FIG. 9, step S921), the service server 30 transmits a new remote timer-recording response <D-18> containing the overlapped timer-recording program list to the mobile phone 10 (FIG. 9, step S922). When the service server 30 receives an error code as the new remote timer-recording response <D-17> from the direct access management server 40 (FIG. 9, step S923), the service server 30 transmits the error code as a new remote timer-recording response <D-18> to the mobile phone 10 (FIG. 9, step S924). Thereafter, the service server 30 and the mobile phone 10 perform the foregoing processes.

Figure 26:
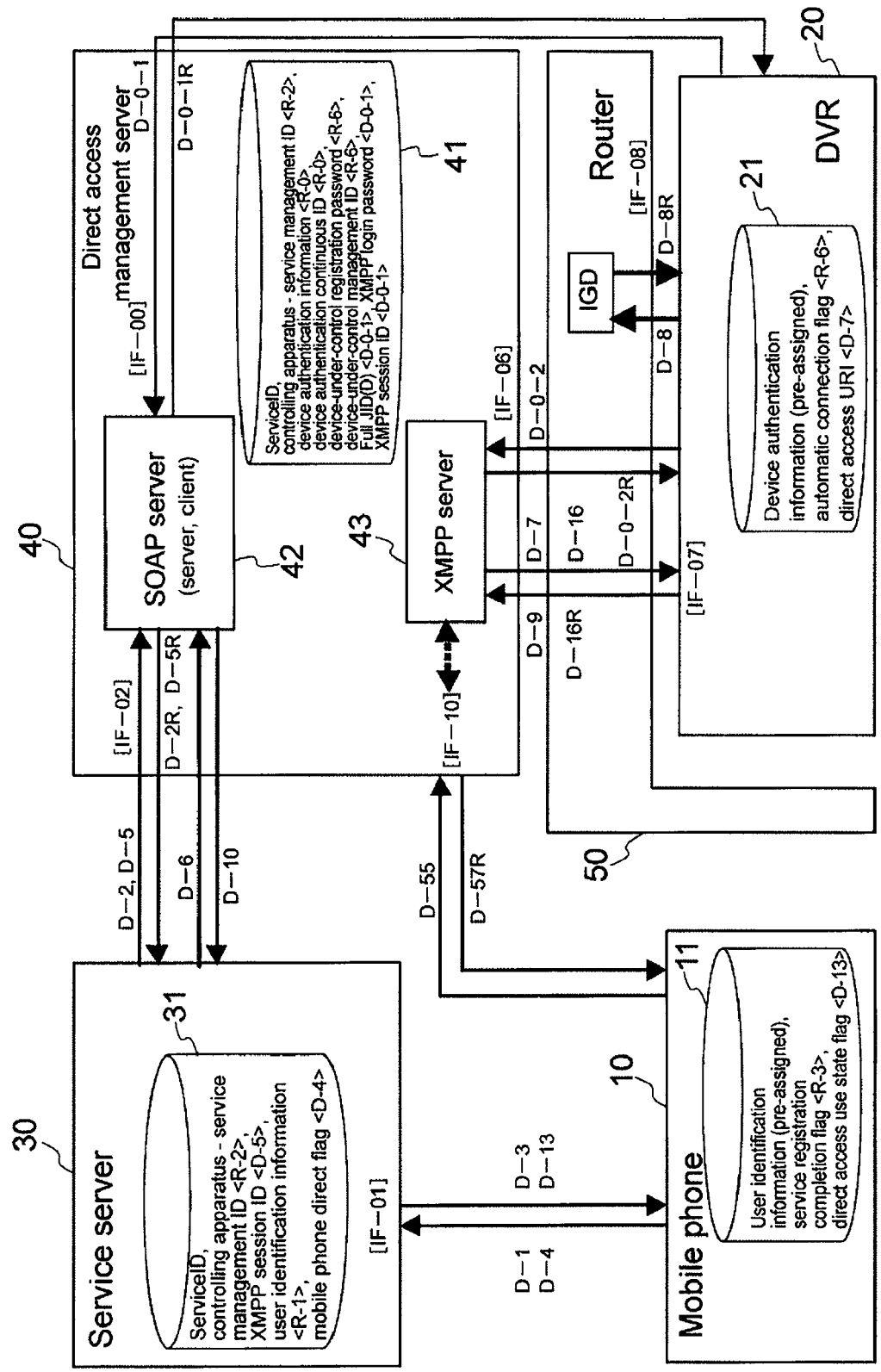
FIG. 26 is a sequence chart showing a flow of information in the case that the remote timer-recording is performed by tunneling from the mobile phone not through the service server.

[3-4. Remote Timer-Recording by Tunneling from Mobile Phone: FIG. 26]

Next, an operation of the mobile phone 10 that performs remote timer-recording for the DVR 20 by tunneling of the XMPP server 43 of the direct access management server 40 not through the service server 30 will be described. FIG. 26 is a schematic diagram showing a flow of information in the case that the mobile phone 10 performs remote timer-recording for the DVR 20 by tunneling of the XMPP server 43 not through the service server 30.

In a flow of information among the mobile phone 10, the DVR 20, the service server 30, the direct access management server 40, and the router 50 shown in FIG. 26, since the processes they perform until they receive the direct access start response <D-10> are the same as those shown in FIG. 7, their description will be omitted.

When the determined result at step S918 denotes that the mobile phone direct flag has been set to the ON state and the new remote timer-recording response <D-13> transmitted from the service server 30 to the mobile phone 10 at step S918 contains a URI for tunneling assigned at step S1110 by the direct access management server 40, the mobile phone 10 performs remote timer-recording for the DVR 20 by tunneling of XMPP server 43 not through the service server 30. As described above, since the mobile phone 10 only accesses the direct access URI received as the new remote timer-recording response <D-13>, it is not necessary to cause the mobile phone 10 to determine whether the direct access URI corresponds to the DVR 20 or tunneling of the direct access management server 40.

When the mobile phone 10 receives the new remote timer-recording response <D-13> containing the direct access URI from the service server 30 (FIG. 8, step S815), the mobile phone 10 accesses the address of the direct access management server 40 contained in the direct access URI and transmits a new remote timer-recording request <D-55> containing the direct access URI and the timer-recording program information to the direct access management server 40 (FIG. 8, step S816).

When the direct access management server 40 receives the new remote timer-recording request <D-55> from the mobile phone 10 (FIG. 11, step S1112), the direct access management server 40 checks whether or not the direct access URI contained in the new remote timer-recording request <D-55> is valid (FIG. 11, step S1113). When the direct access URI is invalid, the direct access management server 40 transmits an error code that denotes that the direct access URI is invalid as a new remote timer-recording response <D-57R> to the mobile phone 10 (FIG. 11, step S1114). When the direct access URI is valid, the direct access management server 40 transmits a new remote timer-recording request <D-16> containing the timer-recording program information to the DVR 20 through the XMPP server 43 (FIG. 11, step S1115). At this point, for example, the address portion of the direct access URI is filled with all "0's" so that the DVR 20 knows that it is accessed by tunneling through the XMPP server 43 of the direct access management server 40.

When the DVR 20 receives the new remote timer-recording request <D-16> from the direct access management server 40 (FIG. 12, step S1210), the DVR 20 checks whether or not the direct access URI contained in the new remote timer-recording request <D-16> is valid (FIG. 12, step S1211). When the direct access URI is invalid, the DVR 20 transmits an error code that denotes that the direct access URI is invalid as the new remote timer-recording response <D-16R> to the direct access management server 40 (FIG. 12, step S1212). When the direct access URI is valid, the DVR 20 transmits information containing an overlapped timer-recording program list as the new remote timer-recording response <D-16R> to the direct access management server 40 (FIG. 12, step S1213).

When the direct access management server 40 receives the new remote timer-recording response <D-16R> containing the overlapped timer-recording program list from the DVR 20 (FIG. 11, step S1116), the direct access management server 40 transmits the new remote timer-recording response <D-57R> containing the overlapped timer-recording program list to the mobile phone 10 (FIG. 11, step S1117). When the direct access management server 40 receives an error code as the new remote timer-recording response <D-16R> from the DVR 20, the direct access management server 40 transmits the error code as the new remote timer-recording response <D-57R> to the mobile phone 10. Thereafter, the mobile phone 10 performs the foregoing process.

As described above, the mobile phone 10 can execute the timer-recording process for the DVR 20 using not only the direct access to the DVR 20, but also the proxy access by the service server 30 and the tunneling using XMPP by the direct access management server 40.

[4. Acquisition of Content]

Figure 15:
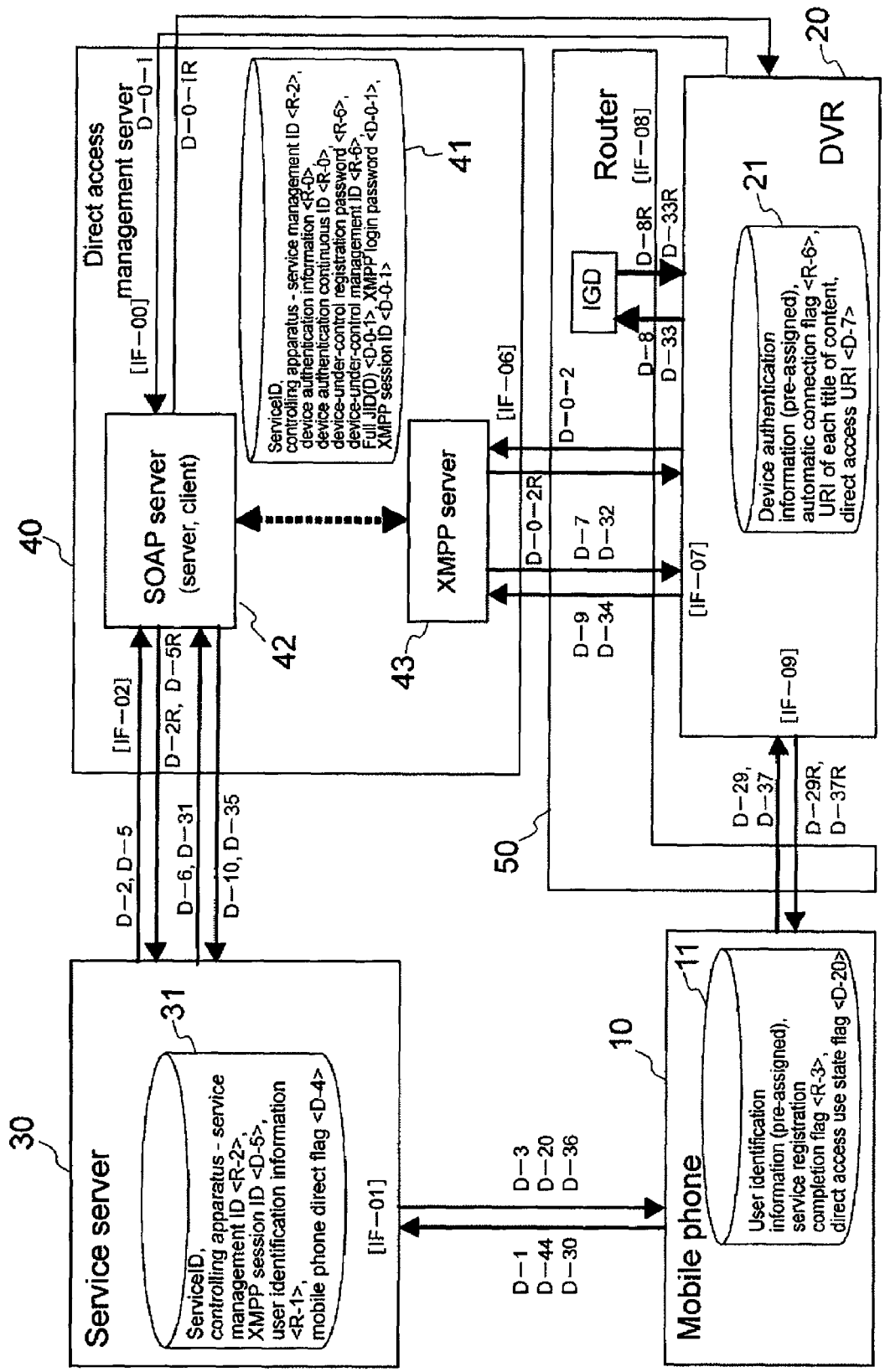
FIG. 15 is a sequence chart showing a flow of information upon the content acquisition by direct access from the mobile phone in the network system shown in FIG. 1.
Figure 17:
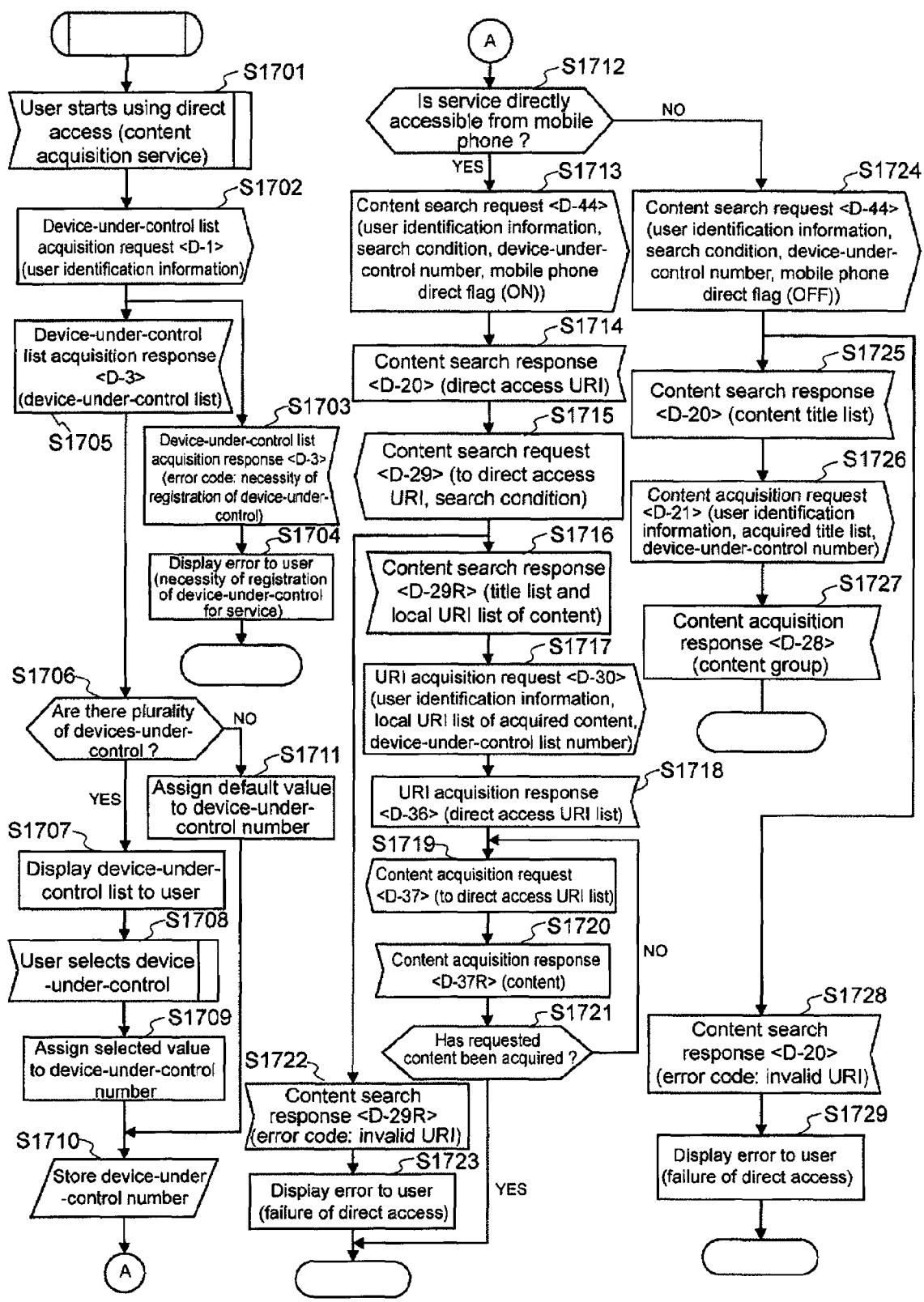
FIG. 17 is a flow chart showing an operation of the mobile phone upon the content acquisition.
Figure 18:
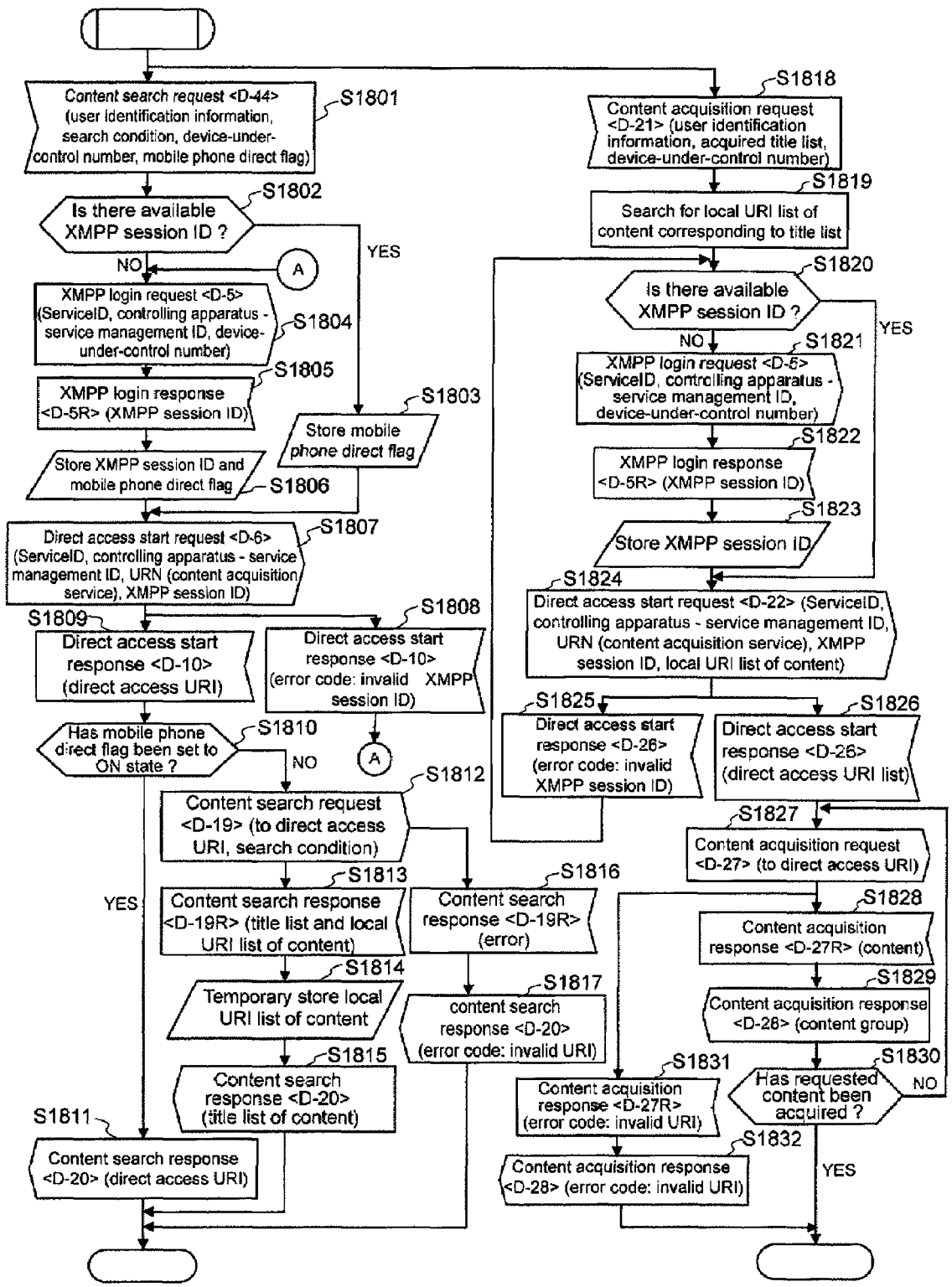
FIG. 18 is a flow chart showing an operation of the service server upon the content acquisition.
Figure 19:
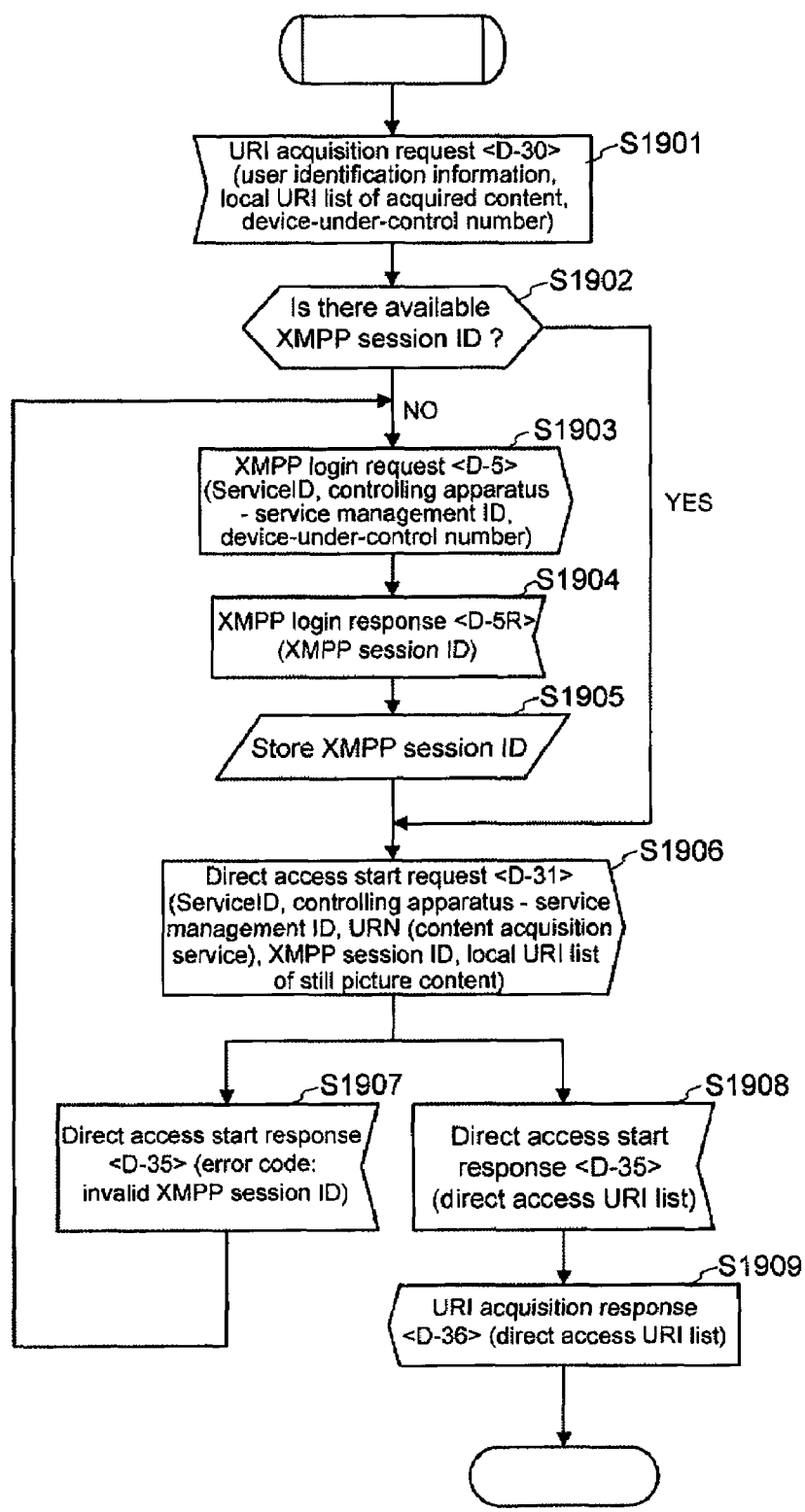
FIG. 19 is a flow chart showing an operation of the service server upon the content acquisition.

Next, an operation of the mobile phone 10 that acquires content from the DVR 20 will be described. FIG. 15 is a sequence chart showing a flow of information in the case that the mobile phone 10 directly accesses the DVR 20 to acquire content therefrom. FIG. 17 is a flow chart showing an operation of the mobile phone 10 upon acquisition of content. FIG. 18 and FIG. 19 are flow charts showing an operation of the service server 30 upon acquisition of content.

To receive a content acquisition service, the user inputs a direct access start command to the mobile phone 10 (FIG. 17, step S1701). When the mobile phone 10 receives the command, the mobile phone 10 transmits a device-under-control list acquisition request <D-1> containing user identification information pre-assigned to the mobile phone 10 to the service server 30 (FIG. 17, step S1702).

When the service server 30 receives the device-under-control list acquisition request <D-1> from the mobile phone 10 (FIG. 9, step S901), the service server 30 determines whether or not a controlling apparatus-service management ID corresponding to the user identification information contained in the device-under-control list acquisition request <D-1> has been stored in the storage section 31 (FIG. 9, step S902). When the controlling apparatus-service management ID corresponding to the user identification information has not been stored in the storage section 31, the service server 30 transmits an error code that represents the necessity of the registration of the device-under-control for the service as a device-under-control list acquisition response <D-3> to the mobile phone 10 (FIG. 9, step S903). When the controlling apparatus-service management ID corresponding to the user identification information has been stored in the storage section 31, the service server 30 transmits a device-under-control list acquisition request <D-2> containing a ServiceID that is information that identifies the service and the controlling apparatus-service management ID to the direct access management server 40 to acquire a list of a device-under-control correlated with the controlling apparatus-service management ID managed by the direct access management server 40 (FIG. 9, step S904).

When the direct access management server 40 receives the device-under-control list acquisition request <D-2> from the service server 30 (FIG. 10, step S1012), the direct access management server 40 determines whether or not the combination of the ServiceID and the controlling apparatus-service management ID contained in the device-under-control list acquisition request <D-2> matches the combination stored in the storage section 41 (FIG. 10, step S1013). When the combination has not been stored in the storage section 41, the direct access management server 40 transmits an error code that denotes that the combination has not been registered as a device-under-control list acquisition response <D-2R> to the service server 30 (FIG. 10, step S1014). When the determined result denotes that the combination of the ServiceID and the controlling apparatus-service management ID contained in the device-under-control list acquisition request <D-2> has been stored in the storage section 41, the direct access management server 40 generates a list of a renumbered device-under-control management ID of the device-under-control that can be controlled by the mobile phone 10, a device name, and so forth contained in the device authentication information of the device-under-control as a device-under-control list corresponding to the controlling apparatus-service management ID and the device-under-control management ID correlatively stored in the storage section 41, correlates the device-under-control list with the controlling apparatus-service management ID, stores the resultant information in the storage section 41, and transmits the device-under-control list acquisition response <D-2R> containing the device-under-control list to the service server 30 (FIG. 10, step S1015).

When the service server 30 receives the error code denoting that the combination has not been registered as the device-under-control list acquisition response <D-2R> from the direct access management server 40 (FIG. 9, step S905), the service server 30 transmits an error code that represents the necessity of the registration of the device-under-control as the device-under-control list acquisition response <D-3> to the mobile phone 10 (FIG. 9, step S906). When the service server 30 receives the device-under-control list acquisition response <D-2R> containing the device-under-control list from the direct access management server 40 (FIG. 9, step S907), the service server 30 transmits the device-under-control list acquisition response <D-3> containing the device-under-control list to the mobile phone 10 (FIG. 9, step S908).

When the mobile phone 10 receives the error code as the device-under-control list acquisition response <D-3> from the service server 30 (FIG. 17, step S1703), the mobile phone 10 displays an error message that represents the necessity of the registration of the device-under-control to the user through the display section (FIG. 17, step S1704). In contrast, when the mobile phone 10 receives the device-under-control list acquisition response <D-3> containing the device-under-control list (FIG. 17, step S1705), the mobile phone 10 determines whether or not the device-under-control list contains a plurality of device-under-control numbers (FIG. 17, step S1706). When the device-under-control list contains a plurality of devices-under-control, the mobile phone 10 displays the contents of the device-under-control list on the display section (FIG. 17, step S1707), prompts the user to select one of the device-under-control numbers (FIG. 17, step S1708), and stores the selected device-under-control number in the storage section 11 (FIG. 17, step S1709, step S1710). When the device-under-control list does not contain a plurality of device-under-control numbers, the mobile phone 10 stores one device-under-control number in the storage section 11 (FIG. 17, step S1711, S1710).

Thereafter, the mobile phone 10 directly accesses the content acquisition service of the DVR 20 or accesses it through the service server 30 based on the mobile phone direct flag that has been set in the mobile phone 10 (FIG. 17, step S1712).

When the mobile phone 10 directly accesses the content acquisition service of the DVR 20, the mobile phone 10 transmits a content search request <D-44> containing user identification information, a search condition, a device-under-control number, and the mobile phone direct flag (ON) to the service server 30 (FIG. 17, step S1713). In contrast, when the mobile phone 10 acquires content through the service server 30, the mobile phone 10 transmits the content search request <D-44> containing user identification information, a search condition, a device-under-control number, and the mobile phone direct flag (OFF) to the service server 30 (FIG. 17, step S1724). In this example, the search condition is a condition in which the DVR 20 is searched for content. For example, the search condition is a condition of which the DVR 20 is searched for still picture data as content or information that denotes that content is recorded as picture data. As a search condition, an item such as date, data size, the like may be added as a detailed search condition.

When the service server 30 receives the content search request <D-44> from the mobile phone 10 (FIG. 18, step S1801), the service server 30 determines whether or not an available XMPP session ID has been stored in the storage section 31 (FIG. 18, step S1802). When an available XMPP session ID has been stored in the storage section 31, the service server 30 correlates the value of the mobile phone direct flag contained in the content search request <D-44> with the ServiceID, the controlling apparatus-service management ID, and the device-under-control number, and stores the resultant information in the storage section 31 (FIG. 18, step S1803). When an available XMPP session ID has not been stored in the storage section 31, the service server 30 transmits the XMPP login request <D-5> containing the ServiceID, the controlling apparatus-service management ID, and the device-under-control number to the direct access management server 40 to establish an XMPP session with the XMPP server 43 (FIG. 18, step S1804).

When the direct access management server 40 receives the XMPP login request <D-5> from the service server 30 (FIG. 10, step S1016), the direct access management server 40 determines whether or not the combination of the ServiceID, the controlling apparatus-service management ID, and the device-under-control number contained in the XMPP login request <D-5> has been stored in the storage section 41 (FIG.

10, step S1017). When the combination has not been stored in the storage section 41, the direct access management server 40 transmits an error code that denotes that there is no device-under-control for the corresponding service as the XMPP login response <D-5R> to the service server 30 (FIG. 10, step S1018). When the combination has been stored in the storage section 41, the direct access management server 40 generates and stores an XMPP session ID (FIG. 10, step S1019) and transmits the XMPP login response <D-5R> containing the XMPP session ID to the service server 30 (FIG. 10, step S1020).

When the service server 30 receives the XMPP login response <D-5R> containing the XMPP session ID from the direct access management server 40 (FIG. 18, step S1805), the service server 30 correlates the XMPP session ID contained in the XMPP login response <D-5R> and the value of the mobile phone direct flag contained in the content search request <D-44> received at step S1801 with the ServiceID, the controlling apparatus-service management ID, and the device-under-control list number, and stores the resultant information in the storage section 31 (FIG. 18, step S1806).

After the mobile phone direct flag is stored at step S1803 or step S1806, the service server 30 transmits the direct access start request <D-6> containing the ServiceID, the controlling apparatus-service management ID, the service URN, and the XMPP session ID to the direct access management server 40 (FIG. 18, step S1807). In this example, since the mobile phone 10 acquires content from the DVR 20, the service URN is information that designates the content acquisition service.

When the direct access management server 40 receives the direct access start request <D-6> from the service server 30 (FIG. 11, step S1101), the direct access management server 40 determines whether or not the combination of the ServiceID and the controlling apparatus-service management ID contained in the direct access start request <D-6> has been stored in the storage section 41 (FIG. 11, step S1102). When the combination has not been stored in the storage section 41, the direct access management server 40 transmits an error code that represents the necessity of the registration of the device-under-control as a direct access start response <D-10> to the service server 30 (FIG. 11, step S1103). When the combination of the ServiceID and the controlling apparatus-service management ID contained in the direct access start request <D-6> has been stored in the storage section 41, the direct access management server 40 determines whether or not the XMPP session ID contained in the direct access start request <D-6> has been correlated with the combination of the ServiceID and the controlling apparatus-service management ID contained in the direct access start request <D-6> and stored in the storage section 41 (FIG. 11, step S1104). When the XMPP session ID has not been stored in the storage section 41, the direct access management server 40 transmits an error code that denotes that the XMPP session ID is invalid as the direct access start response <D-10> to the service server 30 (FIG. 11, step S1105). When the XMPP session ID contained in the direct access start request <D-6> has been correlated with the combination of the ServiceID and the controlling apparatus-service management ID contained in the direct access start request <D-6> and stored in the storage section 41, the direct access management server 40 transmits the direct access URI acquisition request <D-7> containing the information that designates the service URN designated with the direct access start request <D-6> to the DVR 20 through the XMPP server 43 of the direct access management server 40 (FIG. 11, step S1106).

When the service server 30 receives an error code that denotes that the XMPP session ID is invalid as the direct access start response <D-10> from the direct access management server 40 (FIG. 18, step S1808), the service server 30 transmits the XMPP login request <D-5> to the direct access management server 40 to establish the XMPP session with the direct access management server 40 again (FIG. 18, step S1804).

When the DVR 20 receives the direct access URI acquisition request <D-7> containing the information designating the service URN from the direct access management server 40 (FIG. 12, step S1201), the DVR 20 assigns a direct access local port (FIG. 12, step S1201). Thereafter, the DVR 20 transmits the direct access port NAT setting request <D-8> containing the local IP address and the direct access local port number pre-assigned to the DVR 20 to the router 50 to request the router 50 to map the local IP address and port number with global IP address and port number that can be accessed from the Internet with.

When the DVR 20 receives an acquisition error for the global IP address and the port number as the direct access port NAT setting response <D-8R> from the router 50 in response to the direct access port NAT setting request <D-8> transmitted at step S1203 (FIG. 12, step S1204), the DVR 20 determines whether or not tunneling can be performed for the service URN based on the information designating the service URN acquired at step S1201 (FIG. 12, step S1205). When the determined result denotes that the service URN contained in the direct access URI acquisition request <D-7> is a service URN for which tunneling can be performed, the DVR 20 transmits an error code that designates tunneling as the direct access URI acquisition response <D-9> to the direct access management server 40 (FIG. 12, step S1206). When the information designating the service URN contained in the direct access URI acquisition request <D-7> is not a service URN for which tunneling can be performed, the DVR 20 transmits an error code that represents a failure of the acquisition of a free port as the direct access URI acquisition response <D-9> to the direct access management server 40 (FIG. 12, step S1207). In this case, since the data transmission amount of the content acquisition service is larger than that of the remote timer-recording service, the content acquisition service is a service URN for which tunneling is not able to be performed. Instead, the service provider can designate availability of tunneling depending on the performance of the direct access management server 40.

When the DVR 20 receives the global IP address and the port number correlated with the local IP address and the port number of the DVR 20 as the NAT setting response <D-8R> in response to the direct access port NAT setting request <D-8> from the router 50 (FIG. 12, step S1208), the DVR 20 creates a direct access URI list with the global IP address and the port number and transmits the direct access URI list as the direct access URI acquisition response <D-9> to the direct access management server 40 (FIG. 12, step S1209).

When the XMPP server 43 of the direct access management server 40 receives the direct access URI list as the direct access URI acquisition response <D-9> (FIG. 11, step S1107), the XMPP server 43 transmits the direct access URI list as the direct access start response <D-10> to the service server 30 (FIG. 11, step S1111).

When the direct access management server 40 receives an error code that represents the necessity of the acquisition of content by tunneling as the direct access URI acquisition response <D-9> (FIG. 11, step S1109), the direct access management server 40 assigns a tunneling port of the direct access management server 40 (FIG. 11, step S1109), creates a direct access URI list with the assigned tunneling port number of the direct access management server 40 and the global IP address of the direct access management server 40, and transmits the direct access start response <D-10> containing the direct access URI list to the service server 30 (FIG. 11, step S1111).

When the service server 30 receives the direct access start response <D-10> from the direct access management server 40 (FIG. 18, step S1809), the service server 30 determines whether the mobile phone direct flag has been set to the ON state or the OFF state (FIG. 18, step S1810). When the mobile phone direct flag has been set to the ON state, the service server 30 transmits a content search response <D-20> containing the direct access URI to the mobile phone 10 (FIG. 18, step S1811) so that the service server 30 directly accesses the device designated by the direct access URI. When the mobile phone direct flag has been set to the OFF state, the service server 30 transmits a content search request <D-19> containing the direct access URI and the search condition acquired in response to the content search request <D-44> to the DVR 20 (FIG. 18, step S1812).

Next, several specific examples in the case that the mobile phone 10 requests the DVR 20 to acquire content will be described.

[4-1. Direct Access from Mobile Phone 10: FIG. 15]

Next, an operation of the mobile phone 10 that directly acquires content from the DVR 20 not through the service server 30 will be described. FIG. 15 is a sequence chart showing a flow of information in the case that the mobile phone 10 directly acquires content from the DVR 20.

In a flow of information among the mobile phone 10, the DVR 20, the service server 30, the direct access management server 40, and the router 50 shown in FIG. 15, they perform the foregoing processes until they receive the direct access start response <D-10>.

When the determined result at step S1810 denotes that the mobile phone direct flag has been set to the ON state and tunneling of the direct access management server 40 is not performed, the mobile phone 10 directly acquires content from the DVR 20.

First, a flow of a process of which the mobile phone 10 directly requests the DVR 20 to search for content and acquires a title list of content that matches a search condition from the DVR 20 will be described.

When the mobile phone 10 receives the content search response <D-20> containing a direct access URI from the service server 30 (FIG. 17, step S1714), the mobile phone 10 accesses the address of the DVR 20 contained in the direct access URI and transmits a content search request <D-29> containing the direct access URI and a search condition to the DVR 20 (FIG. 17, step S1715).

When the DVR 20 receives the content search request <D-29> containing the direct access URI and the search condition from the mobile phone 10 (FIG. 12, step S1214), the DVR 20 checks whether or not the direct access URI contained in the content search request <D-29> is valid (FIG. 12, step S1215). When the direct access URI is invalid, the DVR 20 transmits an error code that denotes that the direct access URI is invalid as a content search response <D-29R> to the mobile phone 10 (FIG. 12, step S1216). When the direct access URI is valid, the DVR 20 searches the storage section 21 for content that matches the search condition contained in the content search request <D-29> and generates a title list and a local URI list of content as the searched result. Thereafter, the DVR 20 transmits the generated title list and local URI list as the content search response <D-29R> to the mobile phone 10 (FIG. 12, step S1217). In this example, the local URI is information (URI) that represents a local storage location of content. For example, the local URI may be information that represents a storage location in the storage section 21 of the DVR 20 and that is identified by a local designation method. Instead, the local URI may be information that represents a storage location in an in-home network and that is identified by a local address of the in-home network to which the DVR 20 is connected.

When the mobile phone 10 receives an error code that denotes that the URI is invalid as the content search response <D-29R> from the DVR 20 (FIG. 17, step S1722), the mobile phone 10 displays a message representing a failure of the direct access to the user through the display section (FIG. 17, step S1723).

When the mobile phone 10 receives the content search response <D-29R> containing the title list and local URI list of content from the DVR 20 (FIG. 17, step S1716), the mobile phone 10 performs a process of acquiring content.

Next, a flow of a process of which the mobile phone 10 directly acquires content from the DVR 20 will be described.

When the mobile phone 10 receives the content search response <D-29R> containing the title list and local URI list of content from the DVR 20 (FIG. 17, step S1716), the mobile phone 10 displays the received content title list on the display section, extracts a local URI corresponding to the content that the user selected from the displayed titles, and creates a local URI list of content that the mobile phone 10 requests. Thereafter, the mobile phone 10 transmits a URI acquisition request <D-30> containing the user identification information, the local URI list of the selected content, and the device-under-control number to the service server 30 (FIG. 17, step S1717). In this example, since the local URI acquired at step S1716 represents a location that is not able to be directly accessed through the Internet, the mobile phone 10 acquires a direct access URI for the DVR 20 again.

When the service server 30 receives the URI acquisition request <D-30> (FIG. 19, step S1901), the service server 30 checks whether or not an available XMPP session ID has been stored in the storage section 31 (FIG. 19, step S1902). When an available XMPP session ID has not been stored in the storage section 31, the service server 30 transmits the XMPP login request <D-5> to the direct access management server 40 (FIG. 19, step S1903). The service server 30 receives the XMPP login response <D-5R> from the direct access management server 40 (FIG. 19, step S1904) and stores the XMPP session ID contained in the received XMPP login response <D-5R> in the storage section 31 (FIG. 19, step S1905). Thereafter, the service server 30 transmits a direct access start request <D-31> containing a ServiceID, a controlling apparatus-service management ID, a service URN, an XMPP session ID, and the local URI list of content to the direct access management server 40 (FIG. 19, step S1906). Likewise, when an available XMPP session ID has been stored in the storage section 31, the service server 30 transmits the direct access start request <D-31> to the direct access management server 40 (FIG. 19, step S1906). In this example, since the mobile phone 10 acquires content from the DVR 20, the service URN is information designating the content acquisition service.

When the direct access management server 40 receives the direct access start request <D-31> (FIG. 11, step S1101), the direct access management server 40 determines whether or not the combination of the ServiceID and the controlling apparatus-service management ID contained in the direct access start request <D-31> has been stored in the storage section 41 (FIG. 11, step S1102). When the combination has not been stored in the storage section 41, the direct access management server 40 transmits an error code that represents the necessity of the registration of the device-under-control as a direct access start response <D-35> to the service server 30 (FIG. 11, step S1103). When the combination of the ServiceID and the controlling apparatus-service management ID has been stored in the storage section 41, the direct access management server 40 determines whether or not the XMPP session ID contained in the direct access start request <D-31> has been correlated with the combination of the ServiceID and the controlling apparatus-service management ID contained in the direct access start request <D-31> and stored in the storage section 41 (FIG. 11, step S1104). When the XMPP session ID has not been stored in the storage section 41, the direct access management server 40 transmits an error code that denotes the XMPP session ID is invalid as a direct access start response <D-35> to the service server 30 (FIG. 11, step S1105). When the XMPP session ID has been correlated with the combination of the ServiceID and the controlling apparatus-service management ID and stored in the storage section 41, the direct access management server 40 transmits a direct access URI acquisition request <D-32> containing the service URN and the local URI list designated by the direct access start request <D-31> to the DVR 20 (FIG. 11, step S1106).

When the service server 30 receives an error code that denotes that the XMPP session ID is invalid as the direct access start response <D-35> from the direct access management server 40 (FIG. 19, step S1907), the service server 30 transmits the XMPP login request <D-5> to the direct access management server 40 again (FIG. 19, step S1903). Thereafter, the service server 30 receives the XMPP login response <D-5R> from the direct access management server 40 (FIG. 19, step S1904) and stores the XMPP session ID contained in the XMPP login response <D-5R> in the storage section 41 (FIG. 19, step S1905).

When the DVR 20 receives the direct access URI acquisition request <D-32> from the direct access management server 40 (FIG. 12, step S1201), the DVR 20 assigns a direct access local port (FIG. 12, step S1202). Thereafter, the DVR 20 transmits a direct access port NAT setting request <D-33> containing the local IP address and the direct access local port number to the router 50 (FIG. 12, step S1203).

When the DVR 20 receives an acquisition error of the global IP address and the port number as an NAT setting response <D-33R> from the router 50 (FIG. 12, step S1204), the DVR 20 determines whether or not tunneling can be performed for the service URN based on the information that designates the service URN acquired at step S1201 (FIG. 12, step S1205). When the determined result denotes that tunneling can be performed for the service URN, the DVR 20 transmits an error code that designates tunneling as a direct access URI acquisition response <D-34> to the direct access management server 40 (FIG. 12, step S1206). When the information designating the service URN does not represent a service URN for which tunneling can be performed, the DVR 20 transmits an error code that represents a failure of the acquisition of a free port as the direct access URI acquisition response <D-34> to the direct access management server 40 (FIG. 12, step S1207).

When the DVR 20 receives the global IP address and the port number correlated with the local IP address and the port number of the DVR 20 as an NAT setting response <D-33R> from the router 50 in response to the direct access port NAT setting request <D-33> (FIG. 12, step S1208), the DVR 20 creates a direct access URI list with the global IP address and the port number and transmits the direct access URI list as the direct access URI acquisition response <D-34> to the direct access management server 40 (FIG. 12, step S1209).

When the XMPP server 43 of the direct access management server 40 receives the direct access URI list as the direct access URI acquisition response <D-34> (FIG. 11, step S1107), the XMPP server 43 transmits the direct access URI list as the direct access start response <D-35> to the service server 30 (FIG. 11, step S1111).

When the direct access management server 40 receives an error code that represents the necessity of acquisition of content by tunneling as the direct access URI acquisition response <D-34> (FIG. 11, step S1109), the direct access management server 40 assigns a tunneling port of the direct access management server 40 (FIG. 11, step S1110), creates a direct access URI list with the assigned tunneling port number and the global IP address of the direct access management server 40 and transmits the direct access start response <D-35> containing the direct access URI list to the service server 30 (FIG. 11, step S1111).

When the service server 30 receives the direct access start response <D-35> containing the direct access URI list from the direct access management server 40 (FIG. 19, step S1908), the service server 30 transmits a URI acquisition response <D-36> containing the direct access URI list to the mobile phone 10 (FIG. 19, step S1909).

Thus, since the mobile phone 10 has acquired the direct access URI necessary to directly acquire content from the DVR 20, the mobile phone 10 starts a process of acquiring selected content from the DVR 20. In this example, the direct access URI list that the mobile phone 10 has received as the URI acquisition response <D-36> has stored direct access URIs corresponding to content titles that the user has selected.

When the mobile phone 10 receives the URI acquisition response <D-36> containing the direct access URI list (FIG. 17, step S1718), the mobile phone 10 selects a direct access URI of content acquired from the direct access URI list and directly transmits a content acquisition request <D-37> containing the direct access URI to the DVR 20 (FIG. 17, step S1719).

When the DVR 20 receives the content acquisition request <D-37> containing the direct access URI from the mobile phone 10 (FIG. 12, step S1218), the DVR 20 checks whether or not the direct access URI contained in the content acquisition request <D-37> is valid (FIG. 12, step S1219). When the direct access URI is invalid, the DVR 20 transmits an error code denoting that the direct access URI is invalid as a content acquisition response <D-37R> to the mobile phone 10 (FIG. 12, step S1220). When the direct access URI is valid, the DVR 20 transmits content designated by the direct access URI as the content acquisition response <D-37R> to the mobile phone 10 (FIG. 12, step S1221).

When the mobile phone 10 receives content as the content acquisition response <D-37R> from the DVR 20 (FIG. 17, step S1720), the mobile phone 10 repeatedly transmits the content acquisition request <D-37> to the DVR 20 (FIG. 17, step S1719) until all content titles stored in the direct access URI list have been acquired (FIG. 17, step S1721). When the mobile phone 10 receives an error code that denotes that the direct access URI is invalid as the content acquisition response <D-37R> from the DVR 20, the mobile phone 10 displays a message that represents a failure of the direct access to the user through the display section.

Figure 16:
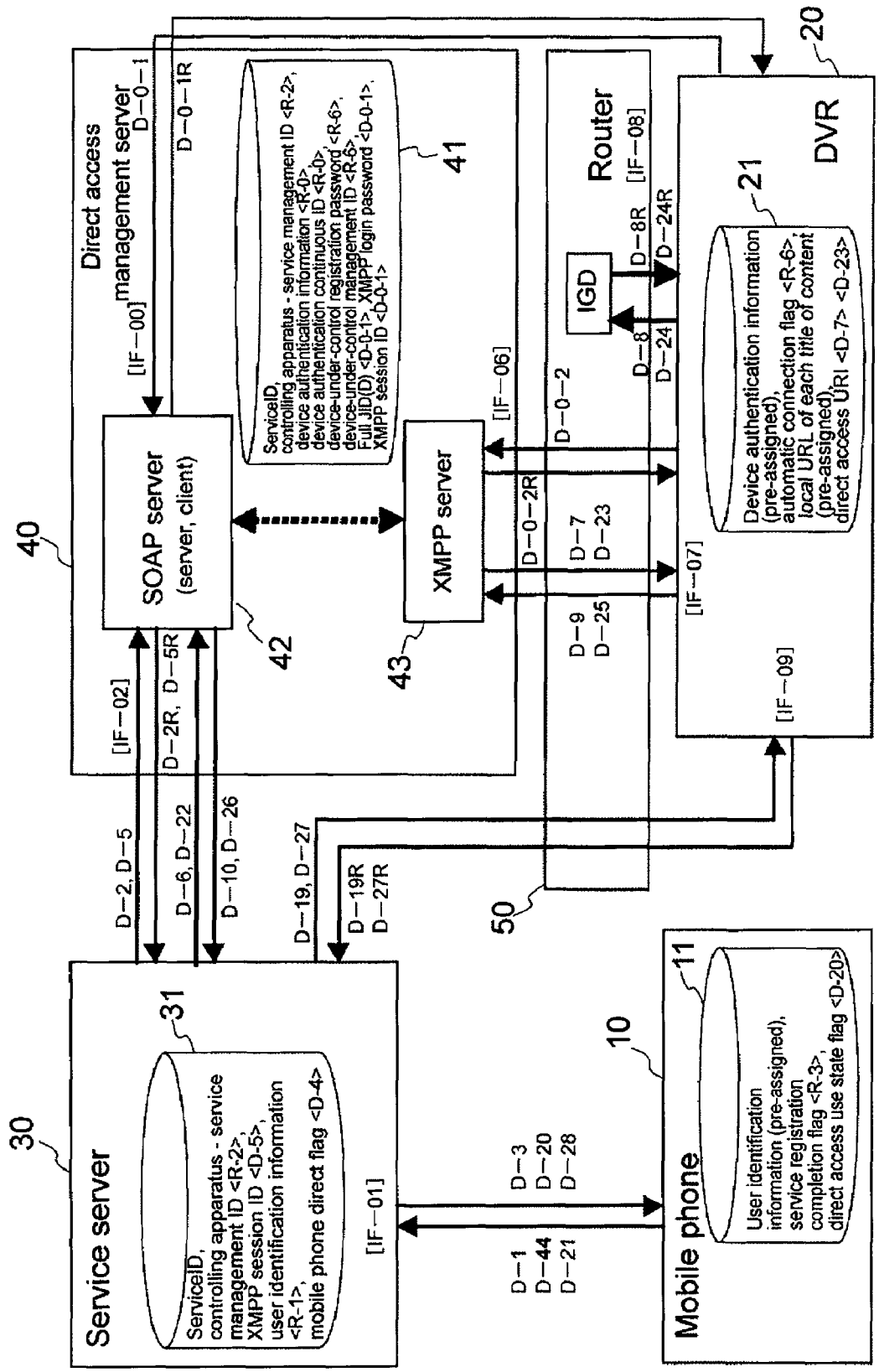
FIG. 16 is a sequence chart showing a flow of information upon the content acquisition by direct access from the service server in the network system shown in FIG. 1.

[4-2. Acquisition of Content Through Service Server 30: FIG. 16]

Next, an operation of the mobile phone 10 that acquires content from the DVR 20 through the service server 30 will be described. FIG. 16 is a sequence chart showing a flow of information in the case that the content is acquired from the service server 30 to the DVR 20 by direct access.

In a flow of information among the mobile phone 10, the DVR 20, the service server 30, the direct access management server 40, and the router 50 shown in FIG. 16, since the processes they perform until they receive the direct access start response <D-10> are the same as those shown in FIG. 15, their description will be omitted.

When the determined result at step S1810 denotes that the mobile phone direct flag has been set to the OFF state and that tunneling of the direct access management server 40 is not performed, the mobile phone 10 acquires content from the DVR 20 through the service server 30.

First, a flow of a process of which the mobile phone 10 directly requests the DVR 20 to search for content through the service server 30 and acquires a title list of content that matches a search condition will be described.

When the DVR 20 receives the content search request <D-19> containing a direct access URI and a search condition from the service server 30 (FIG. 12, step S1214), the DVR 20 checks whether or not the direct access URI contained in the content search request <D-19> is valid (FIG. 12, step S1215). When the direct access URI is invalid, the DVR 20 transmits an error code that denotes that the direct access URI is invalid as a content search response <D-19R> to the service server 30 (FIG. 12, step S1216). When the direct access URI is valid, the DVR 20 searches the storage section 21 for content that matches the search condition contained in the content search request <D-19> and generates a title list and a local URI list of content as the searched result. Thereafter, the DVR 20 transmits the generated title list and local URI list as the content search response <D-19R> to the service server 30 (FIG. 12, step S1217).

When the service server 30 receives the title list and local URI list of content as the content search response <D-19R> from the DVR 20 (FIG. 18, step S1813), the service server 30 temporarily stores the local URI list of content (FIG. 18, step S1813) and transmits the content search response <D-20> containing the title list of content to the mobile phone 10 (FIG. 18, step S1815).

When the service server 30 receives an error code that denotes that the direct access URI is invalid as the content search response <D-19R> from the DVR 20 (FIG. 18, step S1816), the service server 30 transmits the error code as the content search response <D-20> to the mobile phone 10 (FIG. 18, step S1817).

When the mobile phone 10 receives an error code that denotes that the direct access URI is invalid as the content search response <D-20> from the service server 30 (FIG. 17, step S1728), the mobile phone 10 displays a message that represents a failure of the direct access to the user through the display section (FIG. 17, step S1729). When the mobile phone 10 receives the title list of content as the content search response <D-20> from the service server 30 (FIG. 17, step S1725), the mobile phone 10 performs a process of acquiring content.

Next, a flow of a process of which the mobile phone 10 acquires content from the DVR 20 through the service server 30 will be described.

When the mobile phone 10 receives the content search response <D-20> containing the title list of content from the service server 30 (FIG. 17, step S1725), the mobile phone 10 displays the received title list of content on the display section, extracts a title from the displayed titles corresponding to the title that the user selected, and creates an acquisition title list of content to be acquired.

Thereafter, the mobile phone 10 transmits a content acquisition request <D-21> containing the user identification information, the title list of the selected content (acquisition title list), and the device-under-control number to the service server 30 (FIG. 17, step S1726). When the service server 30 receives the content acquisition request <D-21> (FIG. 18, step S1818), the service server 30 searches the storage section 31 for a local URI list of content corresponding to the title list contained in the content acquisition request <D-21> (FIG. 18, step S1819), extracts a local URI corresponding to the title of content that the user selected from the local URI list stored in the storage section 31, and creates a local URI list.

Thereafter, the service server 30 checks whether or not an available XMPP session ID has been stored in the storage section 31 (FIG. 18, step S1820). When an available XMPP session has not been stored in the storage section 31, the service server 30 transmits the XMPP login request <D-5> to the direct access management server (FIG. 18, step S1821). When the service server 30 receives the XMPP login response <D-5R> from the direct access management server (FIG. 18, step S1822), the service server 30 stores the XMPP session ID contained in the XMPP login response <D-5R> in the storage section 31 (FIG. 18, step S1823). Thereafter, the service server 30 transmits a direct access start request <D-22> that contains the ServiceID, the controlling apparatus-service management ID, the service URN, the XMPP session ID, and the local URI list of content to the direct access management server 40 (FIG. 18, step S1824). Likewise, when an available XMPP session ID has been stored in the storage section 31, the service server 30 transmits the direct access start request <D-22> to the direct access management server 40 (FIG. 18, step S1824). In this example, since content is acquired from the DVR 20, the service URN is information that designates the content acquisition service.

When the direct access management server 40 receives the direct access start request <D-22> (FIG. 11, step S1101), the direct access management server 40 determines whether or not the combination of the ServiceID and the controlling apparatus-service management ID contained in the direct access start request <D-22> has been stored in the storage section 41 (FIG. 11, step S1102). When the combination has not been stored in the storage section 41, the direct access management server 40 transmits an error code that represents the necessity of the registration of the device-under-control as a direct access start response <D-26> to the service server 30 (FIG. 11, step S1103). When the combination of the ServiceID and the controlling apparatus-service management ID has been stored in the storage section 41, the direct access management server 40 determines whether or not the XMPP session ID contained in the direct access start request <D-22> has been correlated with the combination of the ServiceID and the controlling apparatus-service management ID contained in the direct access start request <D-22> and stored in the storage section 41 (FIG. 11, step S1104). When the XMPP session ID has not been stored in the storage section 41, the direct access management server 40 transmits an error code that denotes that the XMPP session ID is invalid as a direct access start response <D-26> to the service server 30 (FIG. 11, step S1105). When the XMPP session ID has been correlated with the combination of the ServiceID and the controlling apparatus-service management ID and stored in the storage section 41, the direct access management server 40 transmits a direct access URI acquisition request <D-23> containing the service URN and the local URI list designated with the direct access start request <D-31> to the DVR 20 (FIG. 11, step S1106).

When the service server 30 receives an error code that denotes that the XMPP session ID is invalid as a direct access start response <D-26> from the direct access management server 40 (FIG. 18, step S1825), the service server 30 checks whether or not an available XMPP session ID has been stored in the storage section 31 again (FIG. 18, step S1825).

When the DVR 20 receives the direct access URI acquisition request <D-23> from the direct access management server 40 (FIG. 12, step S1201), the DVR 20 assigns a direct access local port (FIG. 12, step S1201). Thereafter, the DVR 20 transmits a direct access port NAT setting request <D-24> containing a local IP address and a direct access local port number to the router 50 (FIG. 12, step S1203).

When the DVR 20 receives an acquisition error of a global IP address and a port number from the router 50 as an NAT setting response <D-24R> from the service server 30 (FIG. 12, step S1204), the DVR 20 determines whether or not tunneling can be performed for the service URN based on information that designates the service URN acquired at step S1201 (FIG. 12, step S1205). When the determined result denotes that tunneling can be performed for the service URN, the DVR 20 transmits an error code that designates tunneling as a direct access URI acquisition response <D-25> to the direct access management server 40 (FIG. 12, step S1206). When the information designating the service URN represents a service URN for which tunneling is not able to be performed, the DVR 20 transmits an error code that represents a failure of the acquisition of a free port as the direct access URI acquisition response <D-25> to the direct access management server 40 (FIG. 12, step S1207).

When the DVR 20 receives a global IP address and a port number correlated with the local IP address and the port number of the DVR 20 as an NAT setting response <D-24R> in response to the direct access port NAT setting request <D-24> from the router 50 (FIG. 12, step S1208), the DVR 20 creates a direct access URI list with the global IP address and the port number and transmits the direct access URI list as the direct access URI acquisition response <D-25> to the direct access management server 40 (FIG. 12, step S1209).

When the XMPP server 43 of the direct access management server 40 receives the direct access URI list as the direct access URI acquisition response <D-25> (FIG. 11, step S1107), the XMPP server 43 transmits the direct access URI list as the direct access start response <D-26> to the service server 30 (FIG. 11, step S111).

When the direct access management server 40 receives an error code that represents the necessity of acquisition of content by tunneling as the direct access URI acquisition response <D-25> (FIG. 11, step S1109), the direct access management server 40 assigns a tunneling port of the direct access management server 40 (FIG. 11, step S1110), creates a direct access URI list with the tunneling port number and the global IP address of the direct access management server 40, and transmits the direct access start response <D-26> containing the direct access URI list to the service server 30 (FIG. 11, step S1111).

Thus, since the service server 30 has acquired the direct access URI with which content is directly acquired from the DVR 20, the service server 30 starts a process of acquiring selected content from the DVR 20. In this example, the direct access URI list that the service server 30 has received as the direct access start response <D-26> has stored direct access URIs corresponding to titles of content that the user has selected.

When the service server 30 receives the direct access start response <D-26> containing the direct access URI list (FIG. 18, step S1826), the service server 30 selects a direct access URI corresponding to content to be acquired from the direct access URI list and transmits a content acquisition request <D-27> containing the direct access URI to the DVR 20 (FIG. 18, step S1827). When the DVR 20 receives the content acquisition request <D-27> from the service server 30 (FIG. 12, S1218), the DVR 20 checks whether or not the direct access URI contained in the content acquisition request <D-27> is valid (FIG. 12, step S1219). When the direct access URI is invalid, the DVR 20 transmits an error code that denotes that the direct access URI is invalid as a content acquisition response <D-27R> to the service server 30 (FIG. 12, step S1220). When the direct access URI is valid, the DVR 20 transmits content designated by the direct access URI as the content acquisition response <D-27R> to the service server 30 (FIG. 12, step S1221).

When the service server 30 receives content as the content acquisition response <D-27R> from the DVR 20 (FIG. 18, step S1828), the service server 30 transmits the content as a content acquisition response <D-28> to the mobile phone 10 (FIG. 18, step S1829) and repeatedly transmits the content acquisition request <D-27> (FIG. 18, step S1827) to the DVR 20 until all the titles of content stored in the direct access URI list have been transmitted to the DVR 20 (FIG. 18, step S1830). When the mobile phone 10 receives the content acquisition response <D-28> containing content (FIG. 18, step S1827), the mobile phone 10 displays the received content to the user through the display section.

When the service server 30 receives an error code that denotes that the direct access URI is invalid as the content acquisition response <D-27R> from the DVR 20 (FIG. 18, step S1831), the service server 30 transmits the error code as the content acquisition response <D-28> to the mobile phone 10 (FIG. 18, step S1832).

As described above, the mobile phone 10 can acquire content from the DVR 20 by directly accessing the DVR 20 or by using proxy access of the service server 30. In the foregoing example, the content acquisition service was described as a service for which tunneling is not able to be performed. However, when the tunneling process described in the remote timer-recording service is applied to the content acquisition service, in the content acquisition service, content can be acquired from the DVR 20 using the tunneling process through the XMPP server 43 of the direct access management server 40.

[5. Completion of Direct Access]

Figure 20:
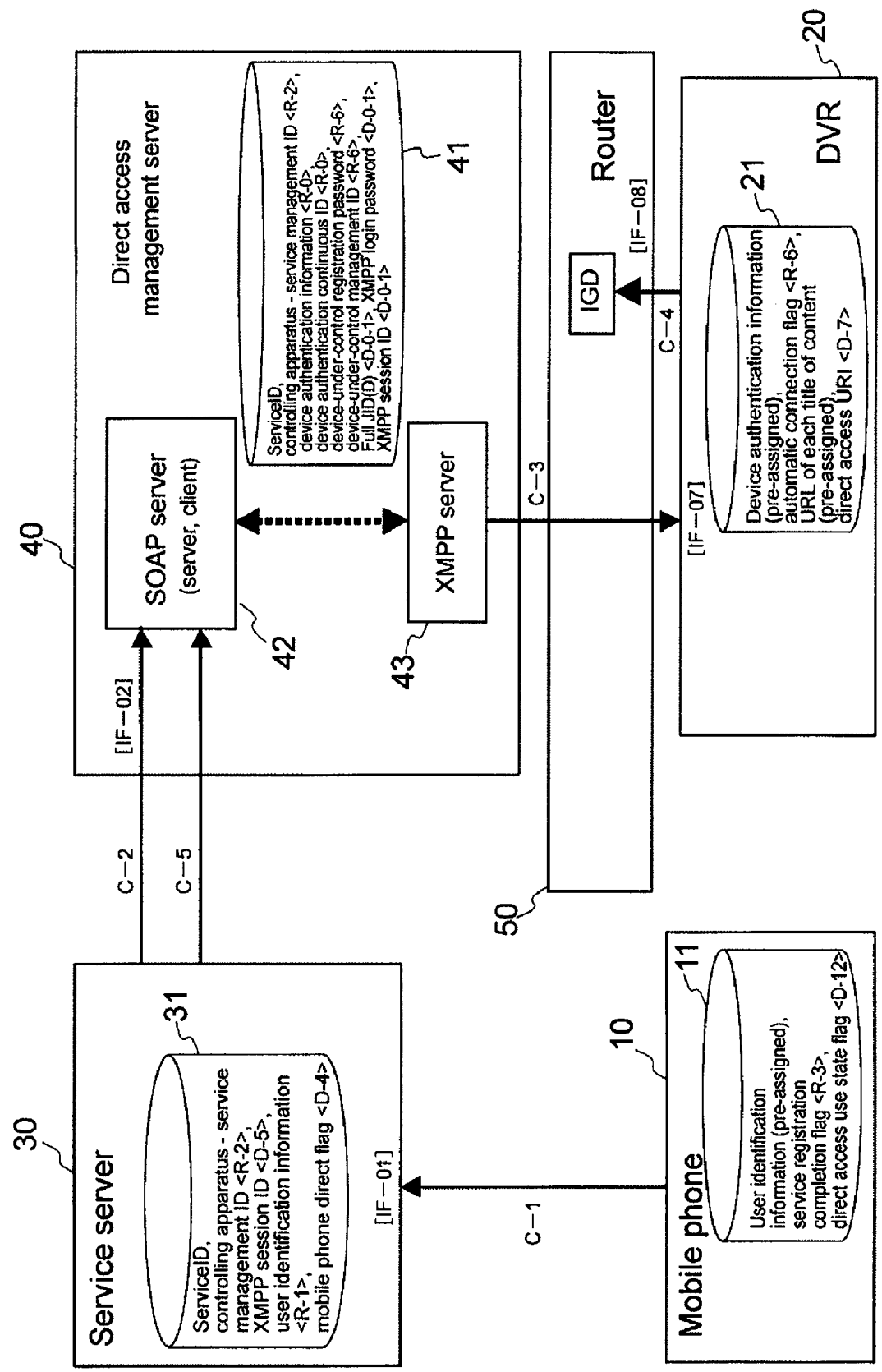
FIG. 20 is a sequence chart showing a flow of information upon completion of direct access in the network system shown in FIG. 1.
Figure 21:
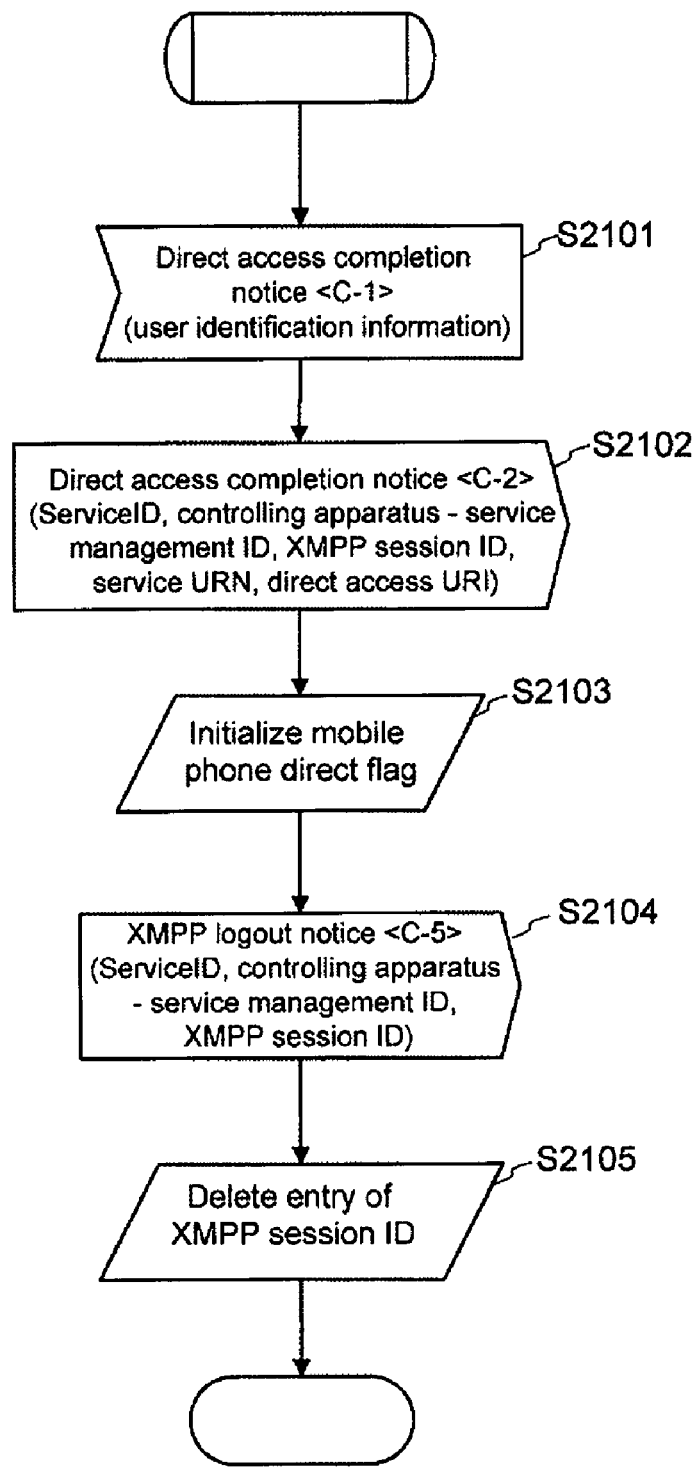
FIG. 21 is a flow chart showing an operation of the service server upon completion of direct access.
Figure 22:
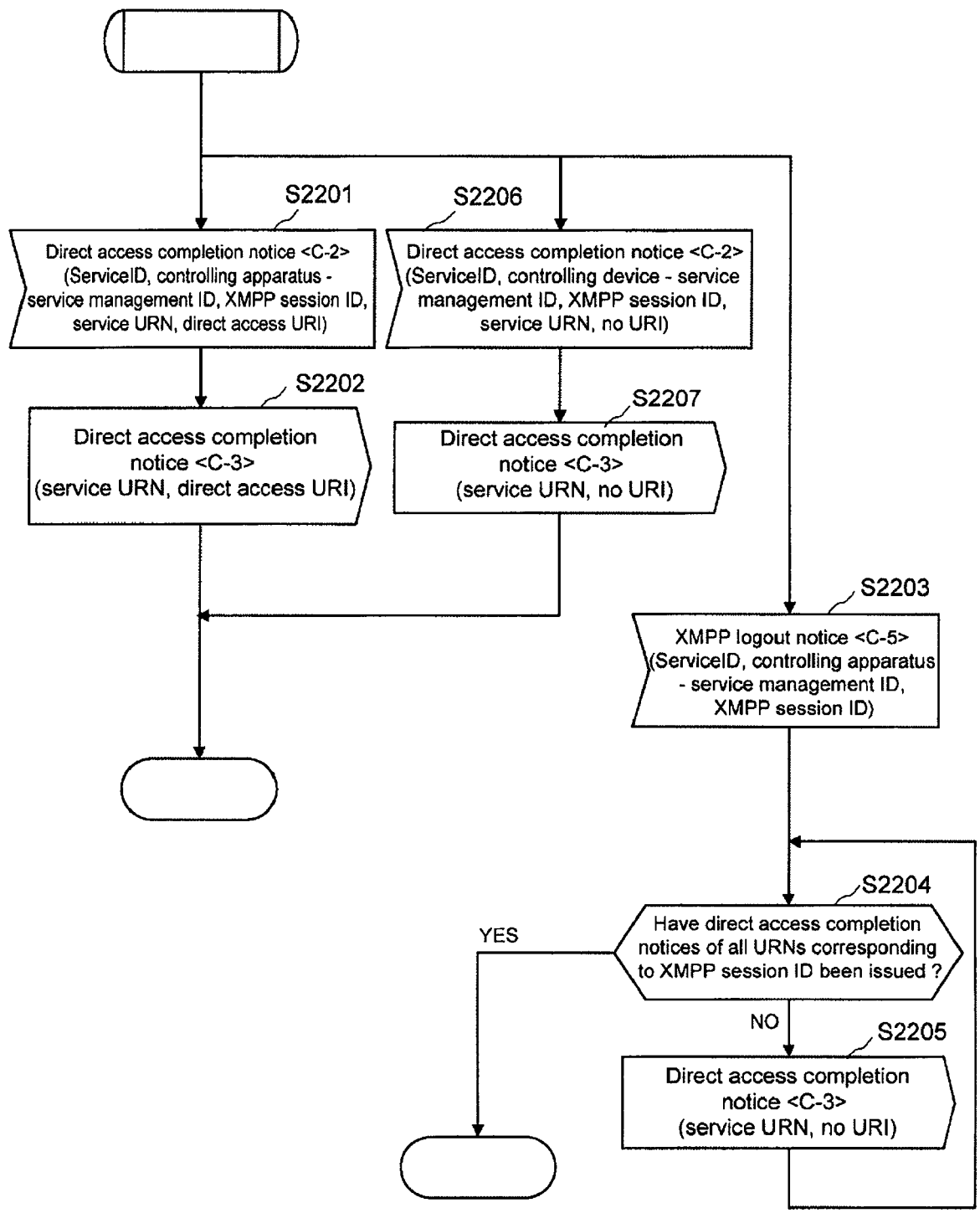
FIG. 22 is a flow chart showing an operation of the direct access management server upon completion of direct access.

After the foregoing processes have been completed, a process of completing the direct access of the service server 30, the direct access management server 40, and the DVR 20 is performed. Next, this process will be described. FIG. 20 is a sequence chart showing a flow of information upon completion of the direct access. FIG. 21 is a flow chart showing an operation of the service server 30 upon completion of the direct access. FIG. 22 is a flow chart showing an operation of the direct access management server 40 upon completion of the direct access. FIG. 23 is a flow chart showing an operation of the DVR 20 upon completion of the direct access.

When the service server 30 receives a direct access completion notice <C-1> containing user identification information from the mobile phone 10 (FIG. 21, step S2101), the service server 30 transmits a direct access completion notice <C-2> containing a ServiceID, a controlling apparatus-service management ID, an XMPP session ID, a service URN, and a direct access URI to the direct access management server 40 (FIG. 21, step S2102).

When the direct access management server 40 receives the direct access completion notice <C-2> (FIG. 22, step S2201), the direct access management server 40 transmits a direct access completion notice <C-3> that contains a service URN and a direct access URI to the DVR 20 (FIG. 22, step S2202). At this point, when the direct access completion notice <C-2> does not designate a direct access URI (FIG. 22, step S2206), the direct access management server 40 transmits a direct access completion notice <C-3> containing only a service URN to the DVR 20 (FIG. 22, step S2207).

When the DVR 20 receives the direct access completion notice <C-3> containing a service URN and a direct access URI (FIG. 23, step S2301), the DVR 20 closes a direct access port with the global IP address and the port number for the designated direct access URI <C-4> (FIG. 23, step S2302).

After the service server 30 has transmitted the direct access completion notice <C-2>, the service server 30 initializes the mobile phone direct flag (FIG. 21, step S2103). Thereafter, the service server 30 transmits an XMPP logout notice <C-5> containing a ServiceID, a controlling device-service management ID, and an XMPP session ID to the direct access management server 40 (FIG. 21, step S2104). Last, the service server 30 deletes the XMPP session ID entry (FIG. 21, step S2105).

When the direct access management server 40 receives the XMPP logout notice <C-5> containing the ServiceID, the controlling apparatus-service management ID, and the XMPP session ID (FIG. 22, step S2203), the direct access management server 40 determines whether or not the direct access completion notices for all service URNs corresponding to the XMPP session ID have been issued to the DVR 20 (FIG. 22, step S2204). When there is a service URN to be noticed for the direct access completion to the DVR 20, the direct access management server 40 transmits the direct access completion notice <C-3> containing only the service URN rather than the direct access URI to the DVR 20 (FIG. 22, step S2205). After the direct access management server 40 has issued all the notices, it waits until it receives the direct access completion notice <C-2> from the service server 30.

When the DVR 20 receives the direct access completion notice <C-3> that does not contain a direct access URI from the direct access management server 40 (FIG. 23, step S2303), the DVR 20 closes all ports for service URNs designated by the direct access completion notice <C-3> (FIG. 23, step S2304, step S2305).

When the foregoing process is executed, the direct access of the service server 30, the direct access management server 40, and the DVR 20 is completed.

In the foregoing, the structure and operation of the network system according to an embodiment of the present invention were described. However, the controlling apparatus may perform a part of the functions of the service server 30. For example, when the controlling apparatus (mobile phone 10) has the SOAP interface access function of the service server 30, the sequence of the direct access that starts with the XMPP login request can be directly performed between the controlling apparatus (mobile phone 10) and the direct access management server 40.

In addition, the function of the controlling apparatus and the function of the device-under-control may be integrated. In this case, when the controlling apparatus (mobile phone 10) accesses an XMPP session of the device-under-control (DVR 20), the controlling apparatus exchanges information necessary for the direct access through the XMPP session not using the SOAP server 42.

In addition, devices-under-control can directly access each other. In this case, they are correlated by the controlling apparatus.

In an embodiment of the present invention, since the service server 30 is disposed between the mobile phone 10, which is a controlling apparatus, and the direct access management server 40, the direct access management server 40 correlates a controlling apparatus-service management ID generated for the combination of the mobile phone 10 and the service server 30 with a device-under-control management ID and stores the resultant information. Instead, the controlling apparatus may directly communicate with the direct access management server 40 not through the service server 30. In this case, the direct access management server 40 generates a controlling apparatus management ID that identifies the controlling apparatus instead of the controlling apparatus-service management ID, correlates it with the device-under-control management ID, and stores the resultant information. Instead, the direct access management server 40 may generate the controlling apparatus management ID. Instead, when an ID that identifies the controlling apparatus can be open to the public, the ID may be used as a controlling apparatus management ID correlated with the device-under-control management ID. This applies to a device-under-control management ID. As long as an ID that identifies the device-under-control can be open to the public, the ID supplied by the device-under-control can be used as a device-under-control management ID correlated with a controlling apparatus management ID. Devices connected as a controlling apparatus and a device-under-control to the direct access management server 40 may have a portion that controls the other device and a portion that is controlled by the other device.

It should be understood by those skilled in the art that various modifications, combinations, sub-combinations and alternations may occur depending on design requirements and other factors insofar as they are within the scope of the appended claims or the equivalents thereof.

What is claimed is:

1. A server communicably linked to a device through a network, comprising:

designation means for designating a first time interval (T1) during which the device repeatedly reconnects the server, and a second time interval during which the device connects to the server for the first time, the first time interval and the second time interval are determined based on a number of times of a connection error between the server and the device, the first time interval being longer than the second time interval; and transmission means for transmitting information corresponding to the designated first time interval to the device while the server is being connected to the device, and for transmitting information corresponding to the designated second time interval to the device along with the information corresponding to the designated first time interval while the server is being connected to the device, wherein when a connection error between the server and the device occurs, the device periodically reconnects to the server during the first time interval according to new time interval T1−tr1+tr2, where T1 is the first time interval, tr1 is a random number assigned to the second time interval, and tr2 is a random number assigned to the first time interval.

2. The server as set forth in claim 1, wherein the transmission means transmits the information corresponding to the designated first time interval to the device while the device is establishing a communication session with the server.

3. The server as set forth in claim 1, wherein the transmission means transmits the information corresponding to the designated first time interval and the information corresponding to the designated second time interval to the device while the device is establishing a communication session with the server.

4. A reconnection control method of a server communicably linked to a device through a network and which controls reconnection of the device to the server, comprising:

designating a first time interval during which the device repeatedly reconnects the server, and designating a second time interval during which the device connects to the server for the first time, the first time interval and the second time interval being determined based on a number of times of a connection error between the server and the device, the first time interval being longer than the second time interval; and transmitting information corresponding to the designated first time interval to the device while the server is being connected to the device, and transmitting information corresponding to the designated second time interval to the device along with the information corresponding to the designated first time interval while the server is being connected to the device, wherein when a connection error between the server and the device occurs, the device periodically reconnects to the server during the first time interval according to new time interval $T1-tr1+tr2$, where $T1$ is the first time interval, $tr1$ is a random number assigned to the second time interval, and $tr2$ is a random number assigned to the first time interval.

5. A computer readable storage medium encoded with a computer readable program configured to cause an information processing apparatus to execute a method which causes a computer to function as a server, the server being communicably linked to a device through a network, and which controls reconnection of the device to the server, the method comprising:

designating a first time interval during which the device repeatedly reconnects the server, and designating a second time interval during which the device connects to the server for the first time, the first time interval and the second time interval being determined based on a number of times of a connection error between the server and the device, the first time interval being longer than the second time interval; and transmitting information corresponding to the designated first time interval to the device while the server is being connected to the device, and transmitting information corresponding to the designated second time interval to the device along with the information corresponding to the designated first time interval while the server is being connected to the device, wherein when a connection error between the server and the device occurs, the device periodically reconnects to the server during the first time interval according to new time interval $T1-tr1+tr2$, where $T1$ is the first time interval, $tr1$ is a random number assigned to the second time interval, and $tr2$ is a random number assigned to the first time interval.

6. A device communicably linked to a server through a network, comprising:

reception means for receiving information corresponding to a first time interval ($T1$) during which the device repeatedly reconnects the server from the server while the device is being connected to the server, and for receiving information corresponding to a second time interval during which the device connects to the server for the first time, the first time interval and the second time interval being determined based on a number of times of a connection error between the server and the device, the first time interval being longer than the second time interval;

a memory configured to store the information corresponding to the received first time interval;

determination means for determining a predetermined time period using a random number; and reconnection execution means for repeatedly reconnecting the device to the server at the predetermined time period within the first time interval, wherein the predetermined time period is $T1-tr1+tr2$, where $T1$ is the first time interval, $tr1$ is a random number assigned to the second time interval, and $tr2$ is a random number assigned to the first time interval.

7. The device as set forth in claim 6, wherein the memory pre-stores predetermined information corresponding to the first time interval before the device receives the information corresponding to the first time interval from the server for the first time.

8. The device as set forth in claim 6, wherein, the reception means receives information corresponding to a second time interval when the device connects the server for the first time, the memory stores the information corresponding to the received second time interval along with the information corresponding to the received first time interval, and the reconnection execution means reconnects the device to the server for the first time based on the information corresponding to the stored second time interval.

9. A reconnection method of a device communicably linked to a server through a network, comprising:

receiving information corresponding to a first time interval during which the device repeatedly reconnects the server from the server while the device is being connected to the server, and receiving information corresponding to a second time interval during which the device connects to the server for the first time, the first time interval and the second time interval being determined based on a number of times of a connection error between the server and the device, the first time interval being longer than the second time interval;

storing information corresponding to the received first time interval;

determining a predetermined time period using a random number; and repeatedly reconnecting the device to the server at the predetermined time period within the first time interval, wherein the predetermined time period is $T1-tr1+tr2$, where $T1$ is the first time interval, $tr1$ is a random number assigned to the second time interval, and $tr2$ is a random number assigned to the first time interval.

10. A computer readable storage medium encoded with a computer readable program configured to cause an information processing apparatus to execute a method which causes a computer to function as a device communicably linked to a server through a network and which is reconnected to the server, the method comprising:

receiving information corresponding to a first time interval during which the device repeatedly reconnects the server from the server while the device is being connected to the server, and receiving information corresponding to a second time interval during which the device connects to the server for the first time, the first time interval and the second time interval being determined based on a number of times of a connection error between the server and the device, the first time interval being longer than the second time interval;

storing the information corresponding to the received first time interval;

determining a predetermined time period using a random number; and repeatedly reconnecting the device to the server at the predetermined time period within the first time interval, wherein the predetermined time period is $T1-tr1+tr2$, where $T1$ is the first time interval, $tr1$ is a random number assigned to the second time interval, and $tr2$ is a random number assigned to the first time interval.

11. A server communicably linked to a device through a network, comprising:

a designation section which designates a first time interval during which the device repeatedly reconnects the server, and which designates a second time interval during which the device connects to the server for the first time, the first time interval and the second time interval are determined based on a number of times of a connection error between the server and the device, the first time interval being longer than the second time interval; and a transmission section which transmits information corresponding to the designated first time interval to the device while the server is being connected to the device, and which transmits information corresponding to the designated second time interval to the device along with the information corresponding to the designated first time interval while the server is being connected to the device, wherein when a connection error between the server and the device occurs, the device periodically reconnects to the server during the first time interval according to new time interval $T1-tr1+tr2$, where $T1$ is the first time interval, $tr1$ is a random number assigned to the second time interval, and $tr2$ is a random number assigned to the first time interval.

12. A device communicably linked to a server through a network, comprising:

a reception section which receives information corresponding to a first time interval during which the device repeatedly reconnects the server from the server while the device is being connected to the server, and which receives information corresponding to a second time interval during which the device connects to the server for the first time, the first time interval and the second time interval being determined based on a number of times of a connection error between the server and the device, the first time interval being longer than the second time interval;

a storage section which stores the information corresponding to the received first time interval;

determination means for determining a predetermined time period using a random number; and a reconnection execution section which repeatedly reconnects the device to the server at the predetermined time period within the first time interval, wherein the predetermined time period is $T1-tr1+tr2$, where $T1$ is the first time interval, $tr1$ is a random number assigned to the second time interval, and $tr2$ is a random number assigned to the first time interval.

* * * * *